US008930099B2

(12) United States Patent  
Inagawa et al.

(10) Patent No.: US 8,930,099 B2  
(45) Date of Patent: Jan. 6, 2015

(54) CONTROL APPARATUS FOR AUTOMATIC TRANSMISSION

(75) Inventors: Yasushi Inagawa, Wako (JP); Shintaro Kameda, Wako (JP); Atsuhiro Saeki, Wako (JP); Takahiro Matsuda, Wako (JP); Hidekazu Araki, Wako (JP); Hiroyuki Okuda, Wako (JP); Yuji Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 167 days.

(21) Appl. No.: 13/510,533

(22) PCT Filed: Nov. 19, 2010

(86) PCT No.: PCT/JP2010/070701  
§ 371 (c)(1),  
(2), (4) Date: May 17, 2012

(87) PCT Pub. No.: WO2011/068043  
PCT Pub. Date: Jun. 9, 2011

(65) Prior Publication Data  
US 2012/0232764 A1    Sep. 13, 2012

(30) Foreign Application Priority Data

Dec. 4, 2009 (JP) .................................. 2009-276104  
Dec. 4, 2009 (JP) .................................. 2009-276105  
Feb. 8, 2010 (JP) .................................. 2010-025017  
Feb. 8, 2010 (JP) .................................. 2010-025019  
Apr. 19, 2010 (JP) .................................. 2010-095695

(51) Int. Cl.  
*G06F 7/00* (2006.01)  
*G06F 17/00* (2006.01)  
(Continued)

(52) U.S. Cl.  
CPC .............. *F02D 29/02* (2013.01); *F16G 61/061* (2013.01); *F16H 63/502* (2013.01);  
(Continued)

(58) Field of Classification Search  
USPC .............. 701/51, 54, 55, 84, 59, 67; 477/107, 477/109, 110, 155, 34, 39, 168; 123/339.11, 350, 361  
See application file for complete search history.

(56) References Cited

U.S. PATENT DOCUMENTS 5,558,597 A    9/1996  Oba et al.  
5,980,426 A   11/1999  Kamada et al.  
(Continued)

FOREIGN PATENT DOCUMENTS

JP    07-035231 A    2/1995  
JP    09-269057 A    10/1997  
(Continued)

*Primary Examiner* — Tuan C. To  
*Assistant Examiner* — Isaac Smith  
(74) *Attorney, Agent, or Firm* — Squire Patton Boggs (US) LLP

(57) ABSTRACT

In a control apparatus for an automatic transmission, it is configured to calculate a change amount (ΔNC estimation value) of an output rotational speed of the transmission (S10); calculate an average (I phase initial average G) of the change amount of the output rotational speed over a predetermined period of an initial inertia (I) phase of shifting; calculate an average (after-shift average G) of a vehicle acceleration after the completion of the shifting, assuming that the change amount of the output rotational speed indicates the vehicle acceleration G; calculate a difference (I phase initial G) between the average of the change amount of the output rotational speed and the average of the vehicle acceleration; incrementally and decrementally correct the desired value of the transmission torque of the frictional engaging element such that the calculated difference falls within a predetermined range; and control supply of hydraulic pressure to the frictional engaging element such that it becomes the corrected desired value (S14 to S20). With this, since the vehicle acceleration at shifting is estimated and evaluated and based thereon, variation in the transmission torque of the frictional engaging element, etc., is learned, it becomes possible to fully exploit the potential of the frictional engaging element, thereby improving a feel given to the vehicle occupant(s) at shifting.

26 Claims, 37 Drawing Sheets

(51) Int. Cl.
*G06F 19/00* (2011.01)
*F02D 29/02* (2006.01)
*F16H 63/50* (2006.01)
*F16H 59/48* (2006.01)
*F16H 61/00* (2006.01)

(52) U.S. Cl.
CPC ....... *F16H 59/48* (2013.01); *F16H 2061/0087* (2013.01)
USPC .............. 701/54; 701/59; 701/67; 477/34; 477/168

(56) References Cited

U.S. PATENT DOCUMENTS

| | | | |
|---|---|---|---|
| 6,328,673 | B1 | 12/2001 | Monowa et al. |
| 6,411,878 | B2 * | 6/2002 | Hanawa et al. ................ 701/51 |
| 6,478,716 | B2 * | 11/2002 | Onimaru et al. ............. 477/118 |
| 6,889,130 | B2 * | 5/2005 | Saitou et al. ................... 701/51 |
| 6,941,210 | B2 * | 9/2005 | Kondo et al. ................... 701/54 |
| 7,318,789 | B2 * | 1/2008 | Saitou et al. ................. 477/143 |
| 7,444,225 | B2 * | 10/2008 | Ito .................................. 701/84 |
| 7,563,196 | B2 * | 7/2009 | Yamada et al. .............. 477/110 |
| 2002/0091035 | A1 | 7/2002 | Monowa et al. |
| 2003/0224906 | A1 | 12/2003 | Monowa et al. |
| 2005/0000305 | A1 | 1/2005 | Yamada et al. |
| 2005/0221956 | A1 | 10/2005 | Saitou et al. |
| 2007/0173375 | A1 * | 7/2007 | Heber et al. ................. 477/170 |
| 2008/0039284 | A1 | 2/2008 | Asami et al. |

FOREIGN PATENT DOCUMENTS

| | | |
|---|---|---|
| JP | 09-303542 A | 11/1997 |
| JP | 11201273 A * | 7/1999 |
| JP | 2001-165290 A | 6/2001 |
| JP | 2002-340660 A | 11/2002 |
| JP | 2005-282810 A | 10/2005 |
| JP | 2008-045567 A | 2/2008 |

* cited by examiner $Q = \int T_C \cdot \Delta \omega \, dt$

Tc: CLUTCH TORQUE  Δω:ROTATION DIFFERENCE
Q/A (CALORIFIC VALUE PER UNIT AREA) [J/cm2] = Q/(2 * NUMBER OF PLATES * FACING AREA(1 SURFACE))

FIG.34
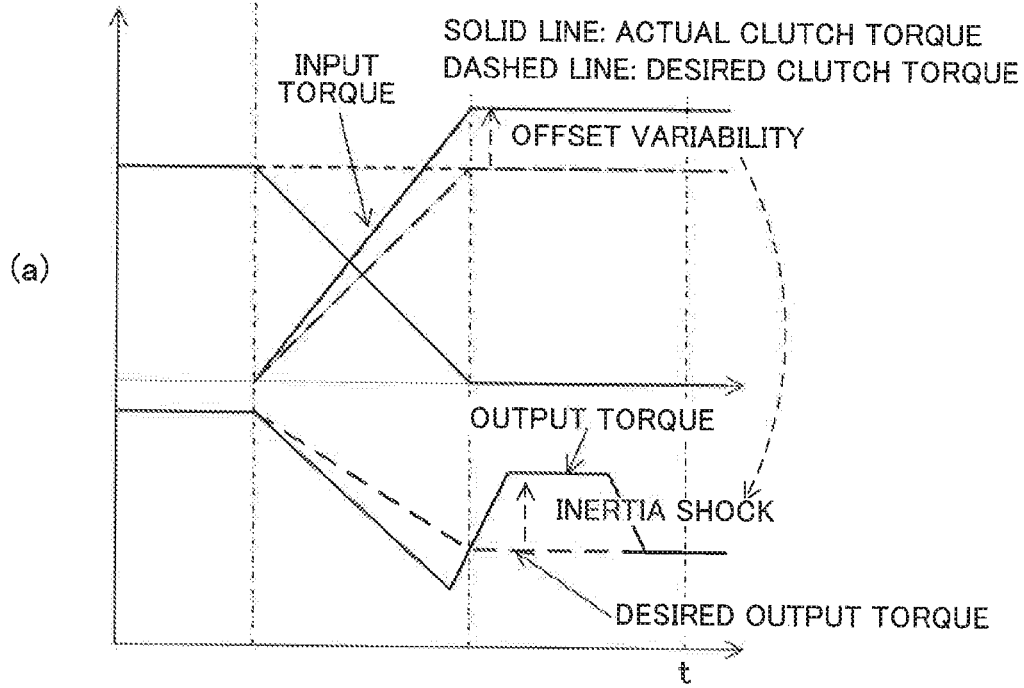
(a)
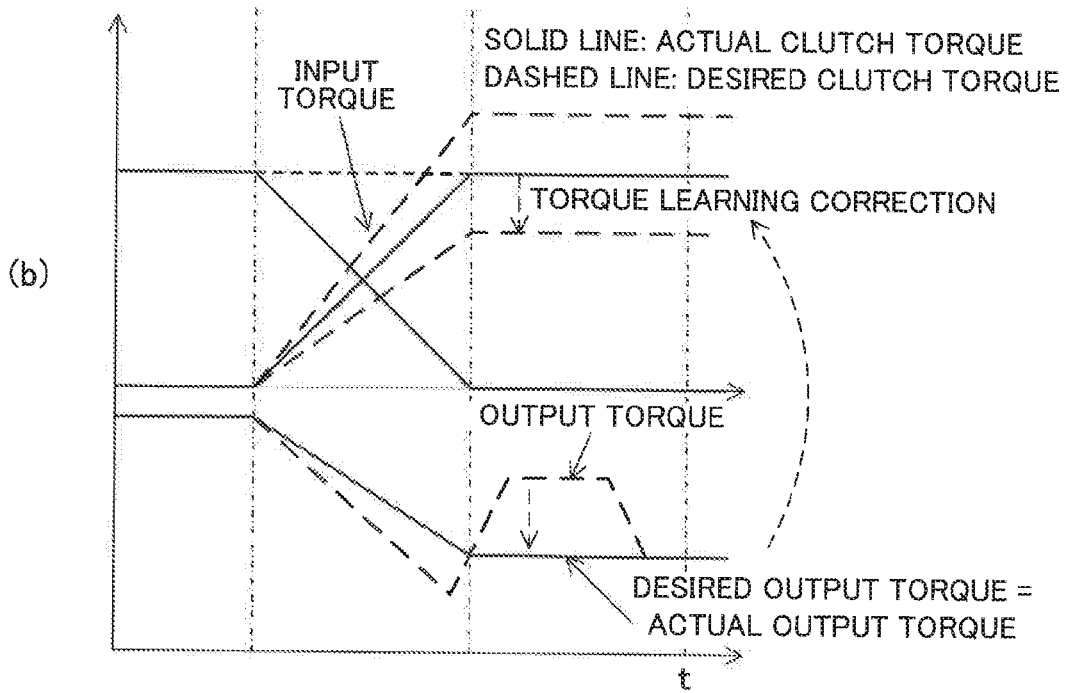
(b)

(AT INITIAL LEARNING)

CONTROL APPARATUS FOR AUTOMATIC TRANSMISSION

REFERENCE TO RELATED APPLICATION

This application is a National Stage entry of International Application No. PCT/JP2010/070701, filed Nov. 19, 2010, which claims priority to Japanese Patent Application No. JP2009-276104, filed Dec. 4, 2009, Japanese Patent Application No. JP2009-278105, filed Dec. 4, 2009, Japanese Patent Application JP2010-025017, filed Feb. 8, 2010, Japanese Patent Application JP2010-025019, filed Feb. 8, 2010, and Japanese Patent Application JP2010-095695 filed Apr. 19, 2010 the disclosure of the prior applications are incorporated in their entirety by reference.

TECHNICAL FIELD

This invention relates to a control apparatus for an automatic transmission, particularly to an apparatus adapted to estimate and evaluate vehicle acceleration at shifting (gear change) and based thereon, learn variance in transmission torque of a frictional engaging element and the like.

BACKGROUND ART

In a Patent Reference 1 below, for an automatic transmission control apparatus equipped with a plurality of gears and hydraulic clutches (frictional engaging elements) and configured to supply and discharge operating oil to and from the hydraulic clutch to shift, there is proposed a technique to improve the rise characteristic of hydraulic pressure (pressure of the operating oil) at shifting.

PRIOR ART REFERENCE

Patent Reference

Patent Reference 1: Japanese Laid-Open Patent Application 2001-165290

SUMMARY OF INVENTION

Problems to be Solved by the Invention

In the technique of the Patent Reference 1, the operation of the hydraulic clutch (frictional engaging element) is controlled through a linear solenoid in accordance with a control command value stored beforehand in an Electronic Control Unit (ECU). In order to calculate the control command value, it is necessary to take into consideration a friction coefficient of the hydraulic clutch, the manufacturing variance and the degree of degradation of the hydraulic clutch and linear solenoid, etc. In other words, the control command value should be determined so that the expected property is not greatly affected under any circumstances.

Consequently, the manufacturing variance, the degree of degradation, etc., are cared too much and it prevents the potential of the hydraulic clutch, etc., from being fully exploited, so that the vehicle occupant(s) can not necessarily have satisfactory feel upon gear change.

The object of this invention is therefore to overcome this problem by providing a control apparatus for an automatic transmission that estimates and evaluates vehicle acceleration at shifting and based thereon, learns variance in transmission torque of a frictional engaging element and the like, thereby fully exploiting the potential of the frictional engaging element to improve a feel at shifting.

Means for Solving the Problems

In order to achieve the object, as recited in claim 1, this invention is configured to have an apparatus for controlling an automatic transmission that changes speed of an output of an engine mounted on a vehicle through a frictional engaging element, characterized by: input rotational speed detecting means for detecting an input rotational speed of the automatic transmission; output rotational speed detecting means for detecting an output rotational speed of the automatic transmission; output rotational speed change amount calculating means for calculating a change amount of the output rotational speed; output rotational speed change amount average calculating means for calculating an average of the change amount of the output rotational speed over a predetermined period of an initial inertia phase of shifting; vehicle acceleration average calculating means for determining completion of the shifting based on a ratio of the input rotational speed to the output rotational speed and calculating an average of a vehicle acceleration after the completion of the shifting based on the change amount of the output rotational speed, assuming that the change amount of the output rotational speed indicates the vehicle acceleration; difference calculating means for calculating a difference between the average of the change amount of the output rotational speed and the average of the vehicle acceleration; learning value calculating means for calculating a learning value used for incrementally and decrementally correcting a desired value of transmission torque of the frictional engaging element such that the calculated difference fails within a predetermined range; incrementally and decrementally correcting means for incrementally and decrementally correcting the desired value of the transmission torque of the frictional engaging element with the calculated learning value; and hydraulic supply control means for controlling supply of hydraulic pressure to the frictional engaging element such that it becomes the corrected desired value of the transmission torque.

It should be noted that, in the foregoing, the "incrementally and decrementally correcting means" may be configured to incrementally and decrementally correct hydraulic pressure to be supplied to the frictional engaging element, in place of the "transmission torque," so that the calculated difference falls within the predetermined range. Specifically, the "transmission torque" is used to mean equivalent to the "hydraulic supply" in the foregoing.

As described below, the apparatus according to claim 2, further includes engine torque down demand calculating means for calculating a torque down demand of the engine based on the corrected desired value of the transmission torque; and engine torque decreasing means for decreasing a torque of the engine in accordance with the calculated torque down demand.

As described below, in the apparatus according to claim 3, the engine torque down demand calculating means calculates the torque down demand of the engine when a shifting time exceeds a desired shifting time by a predetermined value or more.

As described below, in the apparatus according to claim 4, the incrementally and decrementally correcting means corrects the desired value of the transmission torque of the frictional engaging element such that the calculated difference falls within the predetermined range when the vehicle is under a predetermined running condition.

As described below, the apparatus according to claim 5 includes input torque calculating means for calculating an input torque to be inputted to the automatic transmission; vehicle weight estimating means for estimating weight of the vehicle based on at least the input torque before the shifting, the input torque after the shifting and the change amount of the output rotational speed; and learning value correcting means for correcting the learning value using the estimated vehicle weight.

As described below, in the apparatus according to claim 6, the learning value correcting means prohibits learning when the estimated vehicle weight exceeds a threshold value.

As described below, in the apparatus according to claim 7, the vehicle weight estimating means estimates the vehicle weight based on the input torques before and after the shifting and the change amount of the output rotational speed on a presumption that running resistance acting on the vehicle does not change during the shifting.

As described below, the apparatus according to claim 8 includes calorific value calculating means for calculating a calorific value of the frictional engaging element at the shifting; second learning value correcting means for correcting the learning value so as to decrementally correct at least the engine torque, of the engine torque and the transmission torque, when the calculated calorific value of the frictional engaging element at the shifting exceeds a threshold value; and engine torque decreasing means for decreasing the engine torque such that it becomes the decrementally-corrected engine torque.

As described below, in the apparatus according to claim 9, the second learning value correcting means incrementally corrects the transmission torque when a correction amount of the decrementally-corrected engine torque exceeds a limit value.

As described below, in the apparatus according to claim 10, the second learning value correcting means decrementally corrects the engine torque when the shifting time exceeds the desired shifting time by the predetermined value or more.

As described below, in the apparatus according to claim 11, the learning value calculating means calculates the learning value by correcting a basic learning value retrieved from characteristics set with each lattice point of a predetermined operation parameter with a correction coefficient calculated based on a value positioned other than the lattice points of the predetermined parameter.

As described below, in the apparatus according to claim 12, the learning value calculating means calculates the correction coefficient based on a result of comparison of the calculated difference with a threshold value.

As described below, in the apparatus according to claim 13, the learning value calculating means corrects the correction coefficient using a temperature of operating oil.

As described below, the apparatus according to claim 14 includes operation elapsed time estimating means for estimating an operation elapsed time of the automatic transmission, wherein the learning value calculating means replaces the learning value in accordance with the estimated operation elapsed time.

As described below, the apparatus according to claim 15 includes rough road running determining means for determining whether the vehicle is running on a rough road by comparing the change amount of the output rotational speed of the automatic transmission with a threshold value, wherein the learning value calculating means prohibits calculation of the learning value when the vehicle is determined to be running on the rough road.

As described below, in the apparatus according to claim 16, the learning value calculating means prohibits calculation of the learning value when the difference between the average of the change amount of the output rotational speed and the average of the vehicle acceleration is out of a permissible range applied when it is assumed that the desired value of the transmission torque of the frictional engaging element is incrementally and decrementally corrected with the calculated learning value.

Effects of the Invention

In an apparatus for controlling an automatic transmission according to claim 1, it is configured to calculate an average of the change amount of the output rotational speed over a predetermined period of an initial inertia phase of shifting; determine completion of the shifting based on a ratio of the input rotational speed to the output rotational speed and calculate an average of a vehicle acceleration after the completion of the shifting based on the change amount of the output rotational speed, assuming that the change amount of the output rotational speed indicates the vehicle acceleration; calculate a difference between the average of the change amount of the output rotational speed and the average of the vehicle acceleration; calculate a learning value used for incrementally and decrementally correcting a desired value of transmission torque of the frictional engaging element such that the calculated difference fails within a predetermined range; incrementally and decrementally correct the desired value of the transmission torque of the frictional engaging element with the calculated learning value; and control supply of hydraulic pressure to the frictional engaging element such that it becomes the corrected desired value of the transmission torque. With this, since the vehicle acceleration at shifting is estimated and evaluated and based thereon, variation in the transmission torque of the frictional engaging element is learned, it becomes possible to fully exploit the potential of the frictional engaging element, thereby improving a feel given to the vehicle occupant(s) at shifting.

In the apparatus according to claim 2, it is configured to calculate a torque down demand of the engine based on the corrected desired value of the transmission torque; and decrease a torque of the engine in accordance with the calculated torque down demand. With this, when the shifting time is likely to be increased due to the control described in claim 1, the engine torque can be decreased so that the shifting time converges to the desired shifting time, whereby it becomes possible to prevent a feel at shifting from getting worse, i.e., getting sluggish for example, while suppressing increase in a calorific value of the frictional engaging element, thereby enhancing the durability.

In the apparatus according to claim 3, it is configured to calculate the torque down demand of the engine when a shifting time exceeds a desired shifting time by a predetermined value or more. With this, in addition to the effects mentioned for claim 2, it becomes possible to converge the shifting time to the desired shifting time more reliably.

In the apparatus according to claim 4, it is configured to correct the desired value of the transmission torque of the frictional engaging element such that the calculated difference falls within the predetermined range when the vehicle is under a predetermined running condition. With this, in addition to the above effects, it becomes possible to allow the increasing and decreasing correction, i.e., the learning only when the vehicle operation is under a predetermined running condition, thereby making the configuration simple.

In the apparatus according to claim 5, it is configured to calculate an input torque to be inputted to the automatic transmission; estimate weight of the vehicle based on at least the input torque before the shifting, the input torque after the shifting and the change amount of the output rotational speed; and correct the learning value using the estimated vehicle weight. With this, in addition to the above effects, it becomes possible to prevent the vehicle acceleration from being influenced by the vehicle weight, which may lead to an incorrect learning value, so that the leaning value can converge to a stable one. Further, since the vehicle weight is estimated using the same parameters as those for calculating the transmission torque of the frictional engaging element, etc., it can be easily estimated.

In the apparatus according to claim 6, it is configured to prohibit learning when the estimated vehicle weight exceeds a threshold value. With this, in addition to the above effects, it becomes possible to prohibit the learning when the vehicle weight is too influential, thereby avoiding improper learning.

In the apparatus according to claim 7, it is configured to estimate the vehicle weight based on the input torques before and after the shifting and the change amount of the output rotational speed on a presumption that running resistance acting on the vehicle does not change during the shifting. With this, in addition to the above effects, the vehicle weight can be estimated without any influence of the running resistance and the gradient of road.

In the apparatus according to claim 8, it is configured to calculate a calorific value of the frictional engaging element at the shifting; correct the learning value so as to decrementally correct at least the engine torque, of the engine torque and the transmission torque, when the calculated calorific value of the frictional engaging element at the shifting exceeds a threshold value; and decrease the engine torque such that it becomes the decrementally-corrected engine torque. With this, in addition to the above effects, it becomes possible to enhance also the durability of the frictional engaging element.

in the apparatus according to claim 9, it is configured to incrementally correct the transmission torque when a correction amount of the decrementally-corrected engine torque exceeds a limit value. With this, in addition to the above effects, even when the engine torque is decrementally corrected by, for example, retarding the ignition timing, it does not damage the engine.

In the apparatus according to claim 10, it is configured to decrementally corrects the engine torque when the shifting time exceeds the desired shifting time by the predetermined value or more. With this, in addition to the above effects, when the shifting time is likely to be increased due to the control for eliminating variation in the clutch torque by regulating the vehicle acceleration at shifting, the engine torque is decreased, thereby converging the shifting time to the desired shifting time.

In the apparatus according to claim 11, it is configured to calculate the learning value by correcting a basic learning value retrieved from characteristics set with each lattice point of a predetermined operation parameter with a correction coefficient calculated based on a value positioned other than the lattice points of the predetermined parameter. With this, in addition to the above effects, even when a value specified by the operation parameters is positioned other than the lattice points, a difference in the learning value between such a case and a case where a specified value is positioned at one of the lattice points will not cause an uncomfortable feel to the operator, thereby optimizing a feel at shifting within a short period of time.

In the apparatus according to claim 12, it is configured to calculate the correction coefficient based on a result of comparison of the calculated difference with a threshold value. With this, in addition to the above effects, due to the appropriately-set threshold value, the calculated difference can reliably fall within the predetermined range.

In the apparatus according to claim 13, it is configured to correct the correction coefficient using a temperature of operating oil. With this, since the oil temperature is also taken into account, in addition to the above effects, the learning value can be calculated more appropriately.

In the apparatus according to claim 14, it is configured to estimate an operation elapsed time of the automatic transmission; and replace the learning value in accordance with the estimated operation elapsed time. With this, it becomes possible to increase the correction amount in the case of short operation elapsed time of the transmission while decreasing it in the case of long one, so that the learning can be appropriately carried out, i.e., variance can be effectively absorbed, in accordance with the operation elapsed time of the transmission, i.e., depending on whether the variance is attributed to the manufacturing variance that arose in manufacturing processes or age deterioration.

To be specific, the product size tolerance of the frictional engaging element before shipping is set with a large margin so as to prevent the revving of the engine speed or lack of torque at shifting. Also, since the characteristics of the frictional engaging element are not fully stabilized during the early stage, a property to follow the desired control value in this stage is less satisfactory than that in the stable stage that comes after the early stage. Therefore, by setting the correction amount to be relatively large, it becomes possible to effectively absorb the variance. After the early stage, by setting the correction amount to be relatively small, the variance can be effectively absorbed as well, thereby achieving the stable and accurate correction.

In the apparatus according to claim 15, it is configured to determine whether the vehicle is running on a rough road by comparing the change amount of the output rotational speed of the automatic transmission with a threshold value; and prohibit calculation of the learning value when the vehicle is determined to be running on the rough road. With this, in addition to the above effects, it becomes possible to prevent incorrect learning.

In the apparatus according to claim 16, it is configured to prohibit calculation of the learning value when the difference between the average of the change amount of the output rotational speed and the average of the vehicle acceleration is out of a permissible range applied when it is assumed that the desired value of the transmission torque of the frictional engaging element is incrementally and decrementally corrected with the calculated learning value. With this, since, for example, it is determined whether the difference between the present value and preceding value of the evaluation value is out of the permissible range during shifting, in addition to the above effects, it becomes possible to prevent incorrect learning during shifting more reliably.

BRIEF DESCRIPTION OF DRAWINGS

FIG. 34 is a set of time charts showing comparison of the case where the process of the FIG. 32 flowchart is conducted with the case where it is not conducted.

DESCRIPTION OF EMBODIMENTS

Embodiments for carrying out a control apparatus for an automatic transmission according to the present invention will now be explained with reference to the attached drawings.

First Embodiment

Figure 1:
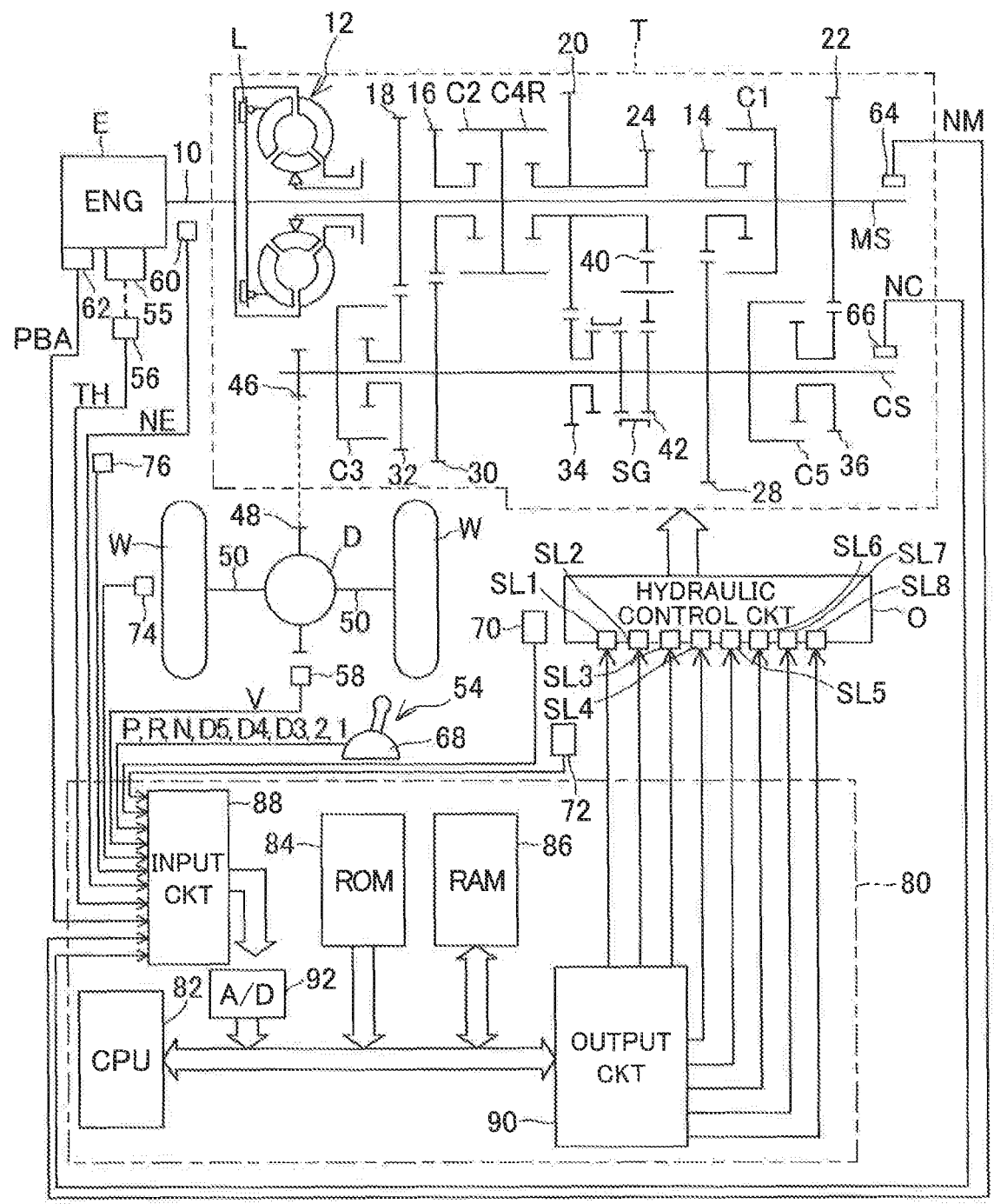
FIG. 1 is an overall view schematically showing a control apparatus for an automatic transmission according to a first embodiment of this invention.

FIG. 1 is an overall view schematically showing a control apparatus for an automatic transmission according to a first embodiment of this invention.

Symbol T indicates the automatic transmission (hereinafter called the "transmission"). The transmission T is mounted on a vehicle (not shown) and comprises a parallel-axis type transmission having distinct gear ratios including five forward speeds and one reverse speed.

The transmission T is equipped with a main shaft (input shaft) MS connected to an output shaft 10 connected to the crankshaft of an engine (internal combustion engine) E through a torque converter 12 having a lockup mechanism L, and with a countershaft (output shaft) CS connected to the main shaft MS through a plurality of gear trains. The engine E comprises a spark-ignition, gasoline engine having a plurality of cylinders.

The main shaft MS is provided with a main 1st-speed gear 14, main 2nd-speed gear 16, main 3rd-speed gear 18, main 4th-speed gear 20, main 5th-speed gear 22 and main reverse gear 24.

The countershaft CS is provided with a counter 1st-speed gear 28 to be meshed with the main 1st-speed gear 14, a counter 2nd-speed gear 30 to be meshed with the main 2nd-speed gear 16, a counter 3rd-speed gear 32 to be meshed with the main 3rd-speed gear 18, a counter 4th-speed gear 34 to be meshed with the main 4th-speed gear 20, a counter 5th-speed gear 36 to be meshed with the main 5th speed gear 22, and a counter reverse gear 42 to be meshed with the main reverse gear 24 via a reverse idle gear 40.

With the above configuration, when the main 1st-speed gear 14 that is supported on the main shaft MS to be rotatable relative thereto is coupled with the main shaft MS through a 1st-speed hydraulic clutch (frictional engaging element; the same for hydraulic clutches described below) C1, the first speed (gear ratio; speed) is established.

When the main 2nd-speed gear 16 that is supported on the main shaft MS to be rotatable relative thereto is coupled with the main shaft MS through a 2nd-speed hydraulic clutch C2, the second speed (gear ratio; speed) is established. When the counter 3rd-speed gear 32 that is supported on the countershaft CS to be rotatable relative thereto is coupled with the countershaft CS through a 3rd-speed hydraulic clutch C3, the third speed (gear ratio; speed) is established.

When the main 4th-speed gear 20 that is supported on the main shaft MS to be rotatable relative thereto is coupled with the main shaft MS through a 4th-reverse hydraulic clutch C4R under the condition where the counter 4th-speed gear 34 that is supported on the countershaft CS to be rotatable relative thereto is in engagement with the countershaft CS through a selector gear SG, the fourth speed (gear ratio; speed) is established.

When the counter 5th-speed gear 36 that is supported on the countershaft. CS to be rotatable relative thereto is coupled with the countershaft CS through a 5th-speed hydraulic clutch CS, the fifth speed (gear ratio; speed) is established.

Further, when the main reverse gear 24 that is supported on the main shaft MS to be rotatable relative thereto is coupled with the main shaft MS through the 4th-reverse hydraulic clutch C4R under the condition where the counter reverse gear 42 that is supported on the countershaft CS to be rotatable relative thereto is in engagement with the countershaft CS through the selector gear SG, the reverse position is established.

The rotation of the countershaft CS is transmitted via a final drive gear 46 and final driven gear 48 to a differential D, and then via right and left drive shafts 50, 50 to driven wheels W, W of the vehicle (not shown) on which the engine E and transmission T are mounted.

A shift lever 54 is provided near the floor of the operator's seat (not shown) of the vehicle to be manipulated by the operator to select one from among eight ranges or positions of P, R, N, D5, D4, D3, 2 and 1.

A throttle valve (not shown) installed in an air intake pipe (not shown) of the engine E is connected to a DBW (Drive-By-Wire) mechanism 55. Specifically, the throttle valve has no mechanical connection with an accelerator pedal (not shown) and is driven by an actuator (not shown) such as an electric motor.

A throttle opening sensor 56 is installed near the actuator of the DBW mechanism 55 to produce an output or signal indicative of a throttle opening TH by using a rotating amount of the actuator. A vehicle speed sensor 58 is installed near the final driven gear 48 and produces an output or signal indicative of a vehicle speed V once every rotation of the final driven gear 48.

A crank angle sensor 60 is installed near a cam shaft (not shown) and produces a CYL signal at every predetermined crank angular position of a specific cylinder, a TLC signal at every predetermined crank angular position of each cylinder, and a CRK signal at every crank angular position (e.g., 15 degrees) defined by dividing the predetermined crank angles. A manifold absolute pressure sensor 62 is installed downstream of the throttle valve in the air intake pipe of the engine E and produces an output or signal proportional to manifold absolute pressure (engine load) PBA.

A first rotational speed sensor 64 is disposed near the main shaft MS to produce an output or signal indicative of a rotational speed NM of the main shaft MS (input rotational speed of the transmission T), while a second rotational speed sensor 66 is disposed near the countershaft CS to produce an output or signal indicative of a rotational speed NC of the countershaft CS (output rotational speed of the transmission T).

A shift lever position sensor 68 is installed near the shift lever 54 provided near the operator's seat and produces an output or signal corresponding to one of the foregoing eight positions (ranges) selected by the operator.

A temperature sensor 70 is provided near a reservoir of a hydraulic circuit O of the transmission T to produce an output or signal proportional to an oil temperature (temperature of the operating oil (Automatic Transmission Fluid)) TATF. A hydraulic pressure switch 72 is disposed at each oil passage connected to each clutch and produces an ON signal when the hydraulic pressure to be supplied to the associated clutch reaches a predetermined value.

A brake switch 74 installed near a brake pedal (not shown) at the operator's seat produces an ON signal in response to manipulation of the brake pedal by the operator, and an accelerator opening sensor 76 installed near the accelerator pedal (not shown) produces an output or signal corresponding to an accelerator opening or position (an amount of accelerator pedal depression) AP resulted by the operator's manipulation.

The outputs of the aforementioned sensors and the like are sent to an ECU (Electronic Control Unit) 80.

The ECU 80 has a microcomputer including a CPU 82, ROM 84, RAM 86, input circuit 88 and output circuit 90. The microcomputer is equipped with an A/D converter 92.

The outputs of the sensor 56, etc., are inputted through the input circuit 88 to the ECU 80, where analog outputs are converted to digital values through the A/D converter 92 while digital outputs are processed through a processing circuit (not shown) such as a waveform shaping circuit, and then the outputs are stored in the RAM 86.

The outputs of the vehicle speed sensor 58 and the CRK signals of the crank angle sensor 60 are counted by counters (not shown) to measure their time intervals so that the vehicle speed V and engine speed NE are detected. The outputs of the first rotational speed sensor 64 and second rotational speed sensor 66 are also counted to detect the input rotational speed. NM and output rotational speed NC of the transmission T.

The CPU 82 of the ECU 80 determines a desired gear to be shifted to or target gear (gear ratio) and energizes and deenergizes shift solenoids SL1 to SL5 located at the hydraulic circuit O through the output circuit 90 and a voltage supply circuit (not shown) to perform control of switching a clutch oil flow, while energizing and deenergizing linear solenoids SL6 to SL8 to control hydraulic supply to a hydraulic clutch Cn and the lockup mechanism L of the torque converter 12 that are related to shifting.

Further, the CPU 82 determines a fuel injection amount and ignition timing of the engine E, so that fuel of the determined fuel injection amount is supplied through an injector (not shown) and the air-fuel mixture composed of the injected fuel and intake air is ignited by an ignition device (not shown) at the determined ignition timing.

Next the operation of the apparatus according to this invention will be explained.

Figure 2:
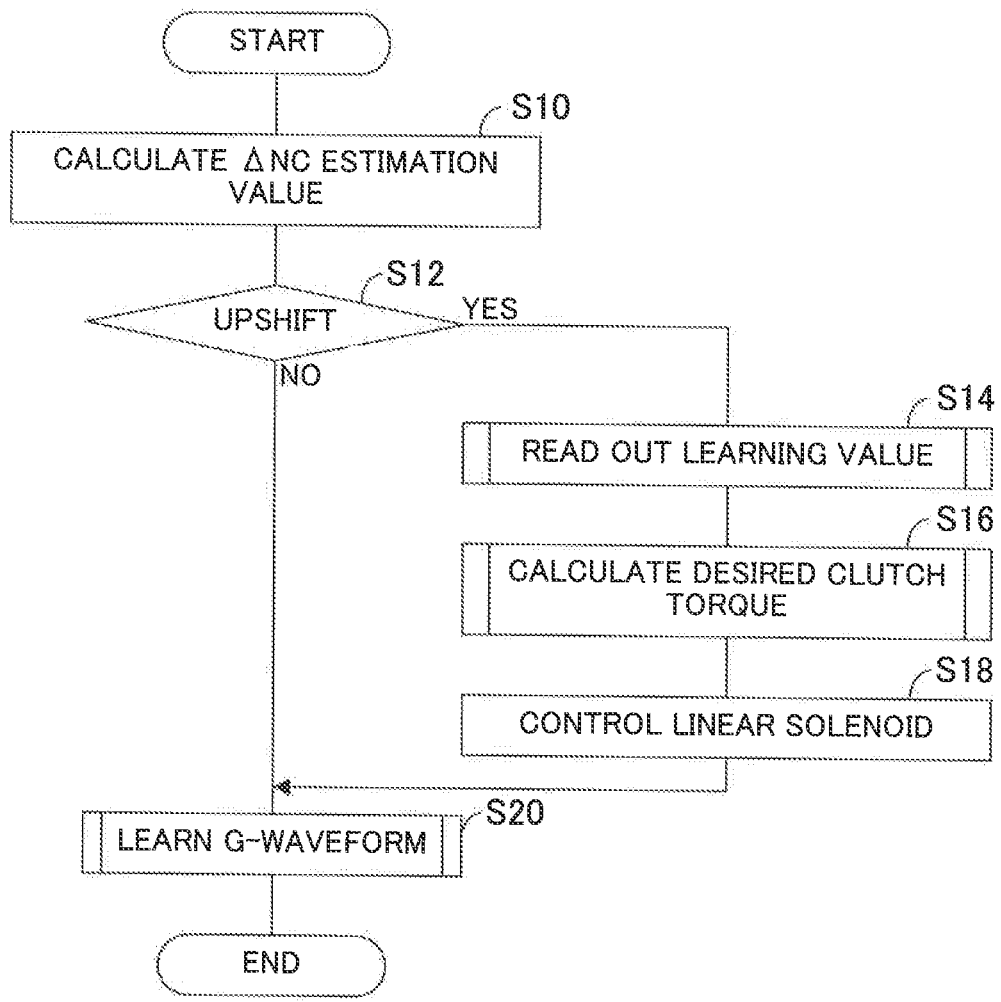
FIG. 2 is a flowchart showing the operation of the apparatus shown in FIG. 1.

FIG. 2 is a flowchart showing the process. The illustrated program is executed by the CPU 82 at predetermined time intervals.

The program begins at S10 in which a $\Delta NC$ estimation value is calculated.

The $\Delta NC$ estimation value means a difference obtained by subtracting a preceding NC (the rotational speed of the countershaft CS detected by the second rotational speed sensor 66 (the output rotational speed of the transmission T, i.e., vehicle speed V)) (in the preceding program loop) from a present NC (in the present program loop). The $\Delta NC$ estimation value is calculated using a waveform obtained by filtering the output of the second rotational speed sensor 66 through a low-pass filter to remove high-frequency noise.

Next the program proceeds to S12 in which it is determined whether it is an upshift, i.e., whether the gear position is shifted up from first to second, from second to third, or the like. Since this embodiment is configured to evaluate the upshift, the result of S12 becomes negative when, for example, it is a downshift, it was the upshift but already completed, or the gear position remains unchanged.

When the result in S12 is affirmative, the program proceeds to S14 in which a learning value is read out.

Figure 3:
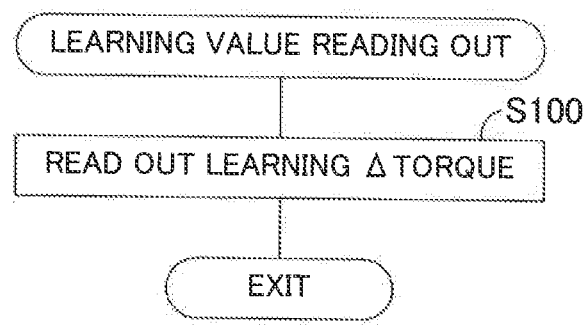
FIG. 3 is a subroutine flowchart showing a learning value read-out process of the FIG. 2 flowchart.

FIG. 3 is a subroutine flowchart showing the process. In S100, a learning $\Delta$ torque (learning value; a value, which is obtained through learning, used for incrementally and decrementally correcting a desired value of transmission torque of hydraulic clutch Cn for the desired gear) is read out by retrieving one from among learning $\Delta$ torque maps.

In this embodiment, the learning $\Delta$ torques are each calculated for respective gear positions and stored in the RAM 86 as mapped values (maps). Specifically, the learning $\Delta$ torque is calculated as the learning value in a learning value write-in process which will be explained later and written in corresponding one of the learning $\Delta$ torque maps on each lattice point defined with respect to the transmission torque and vehicle speed, such that it can be retrieved by these parameters.

In S100, from among the learning $\Delta$ torque maps, one map corresponding to the desired gear is selected and the learning $\Delta$ torque is retrieved (or read out) using the transmission torque of the concerned hydraulic clutch Cn and the vehicle speed V. The transmission torque of the hydraulic clutch Cn is calculated from the engine speed NE of the engine E, the load (e.g., manifold absolute pressure PBA) and a slip ratio ETR of the torque converter 12.

Returning to the explanation on the FIG. 2 flowchart, the program proceeds to S16 in which a desired clutch torque is calculated.

Figure 4:
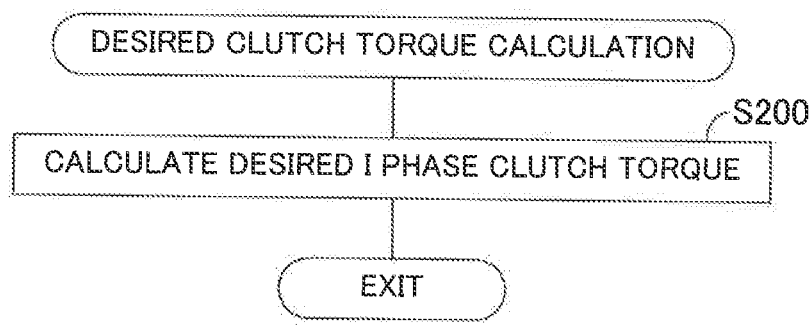
FIG. 4 is a subroutine flowchart showing a desired clutch torque calculation process of the FIG. 2 flowchart.

FIG. 4 is a subroutine flowchart showing the process. In S200, the desired clutch torque is calculated as a desired I (inertia) phase clutch torque. The desired I phase clutch torque is calculated by adding the learning $\Delta$ torque read out in S14 to the transmission torque of the hydraulic clutch Cn for the desired gear. The calculated value obtained in S200 is defined as the desired clutch torque in S16.

Returning to the explanation on the FIG. 2 flowchart, the program proceeds to S18 in which the linear solenoids SL6 to SL8 are energized and/or deenergized to control the hydraulic supply so that the I phase torque of the hydraulic clutch Cn for the desired gear converges to the desired clutch torque.

On the other hand, when the result in S12 is negative, the program proceeds to S20 in which a G-waveform is learned. Note that, in this specification, the letter of "G" represents the vehicle acceleration, more precisely, the vehicle acceleration in the longitudinal direction and the term of "G-waveform" means a waveform in that vehicle acceleration.

Figure 5:
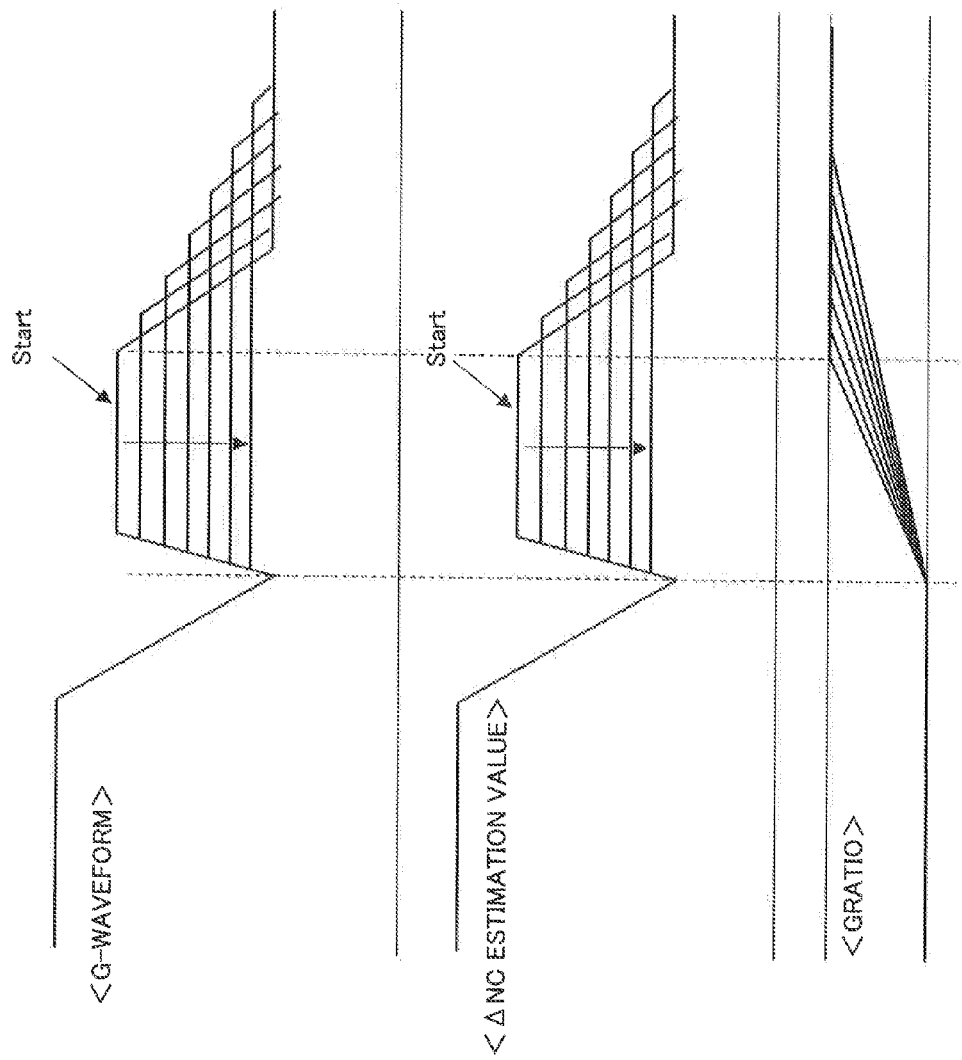
FIG. 5 is a set of waveform diagrams showing a G-waveform, ΔNC estimation value and the like described in the FIG. 2 flowchart, etc.
Figure 6:
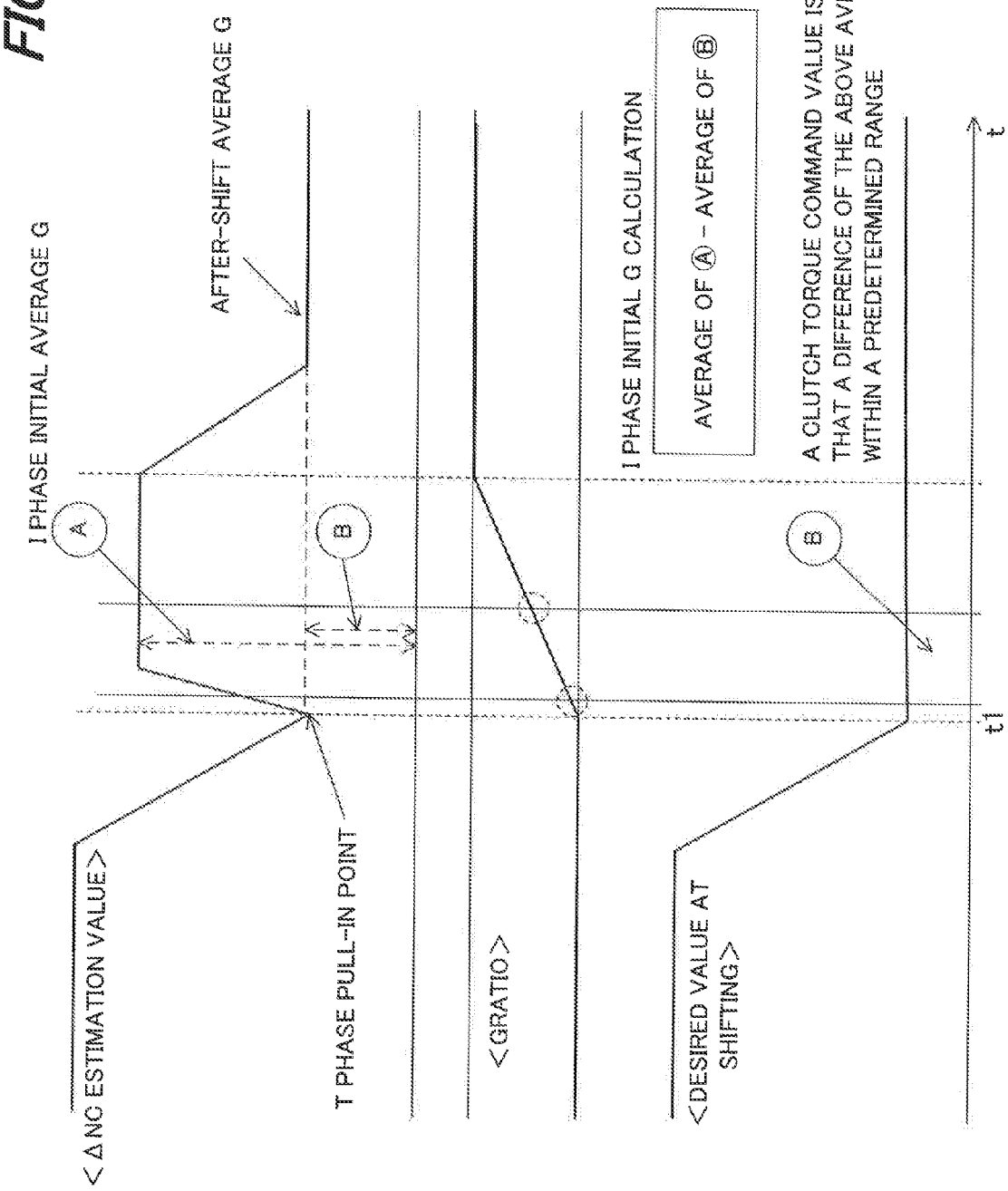
FIG. 6 is a set of waveform diagrams showing the ΔNC estimation value, etc., at shifting.

FIG. 5 is a set of waveform diagrams showing the G-waveform, $\Delta NC$ estimation value, etc., and FIG. 6 is a set of waveform diagrams showing the $\Delta NC$ estimation value, etc., at shifting.

As is clear from FIG. 5, since the waveform of the vehicle acceleration G and that of the $\Delta NC$ estimation value are equivalent, in this embodiment, the $\Delta NC$ estimation value can be regarded as indicating the vehicle acceleration G. Consequently, as shown in FIG. 6, the vehicle acceleration at shifting is estimated and evaluated from the $\Delta NC$ estimation value and based thereon, variance in the transmission torque of the frictional engaging element and the like are learned.

Figure 7:
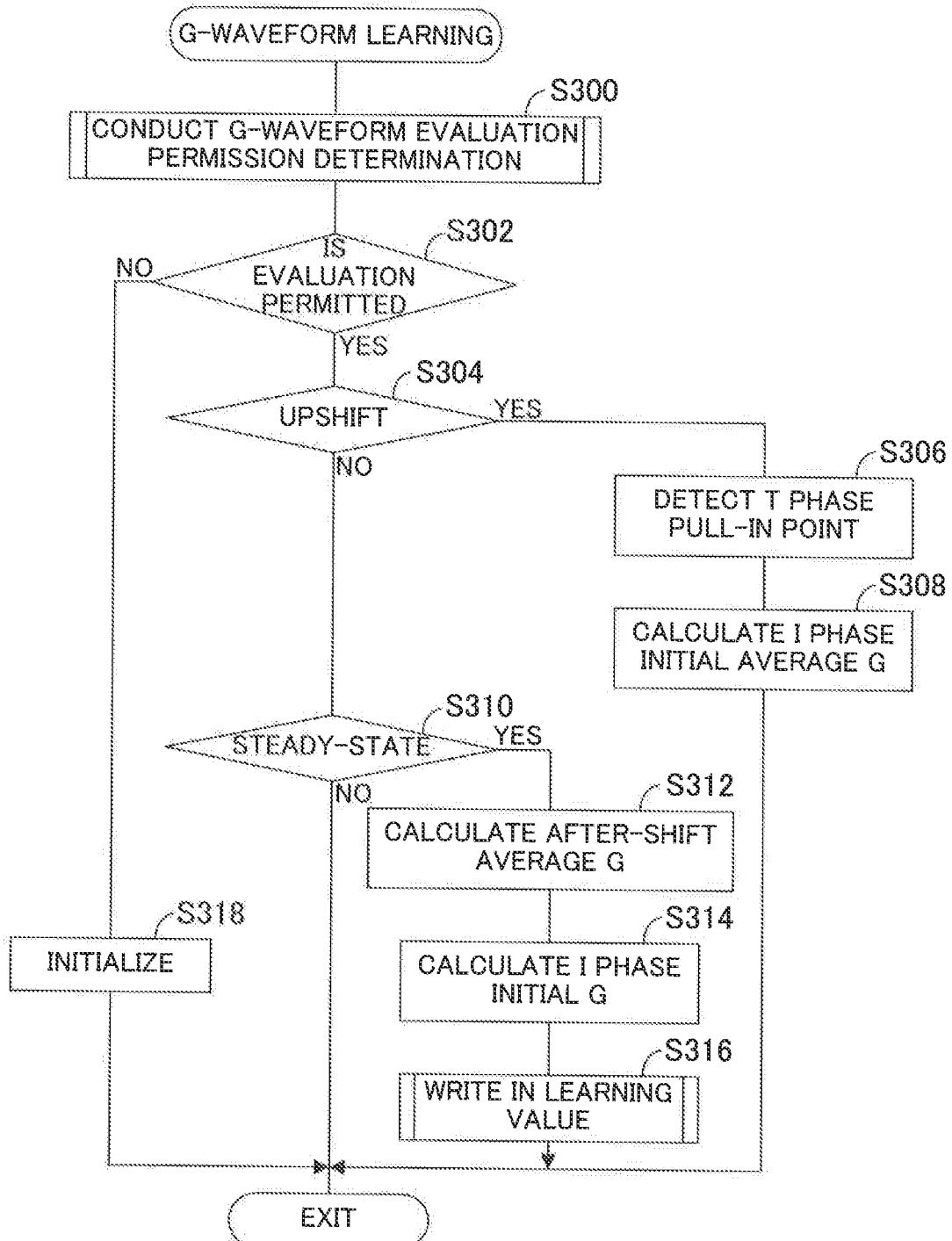
FIG. 7 is a subroutine flowchart showing a waveform learning process of the FIG. 2 flowchart.

FIG. 7 is a subroutine flowchart showing a G-waveform learning process of the FIG. 2 flowchart.

First in S300, a G-waveform evaluation permission determination process is conducted.

Figure 8:
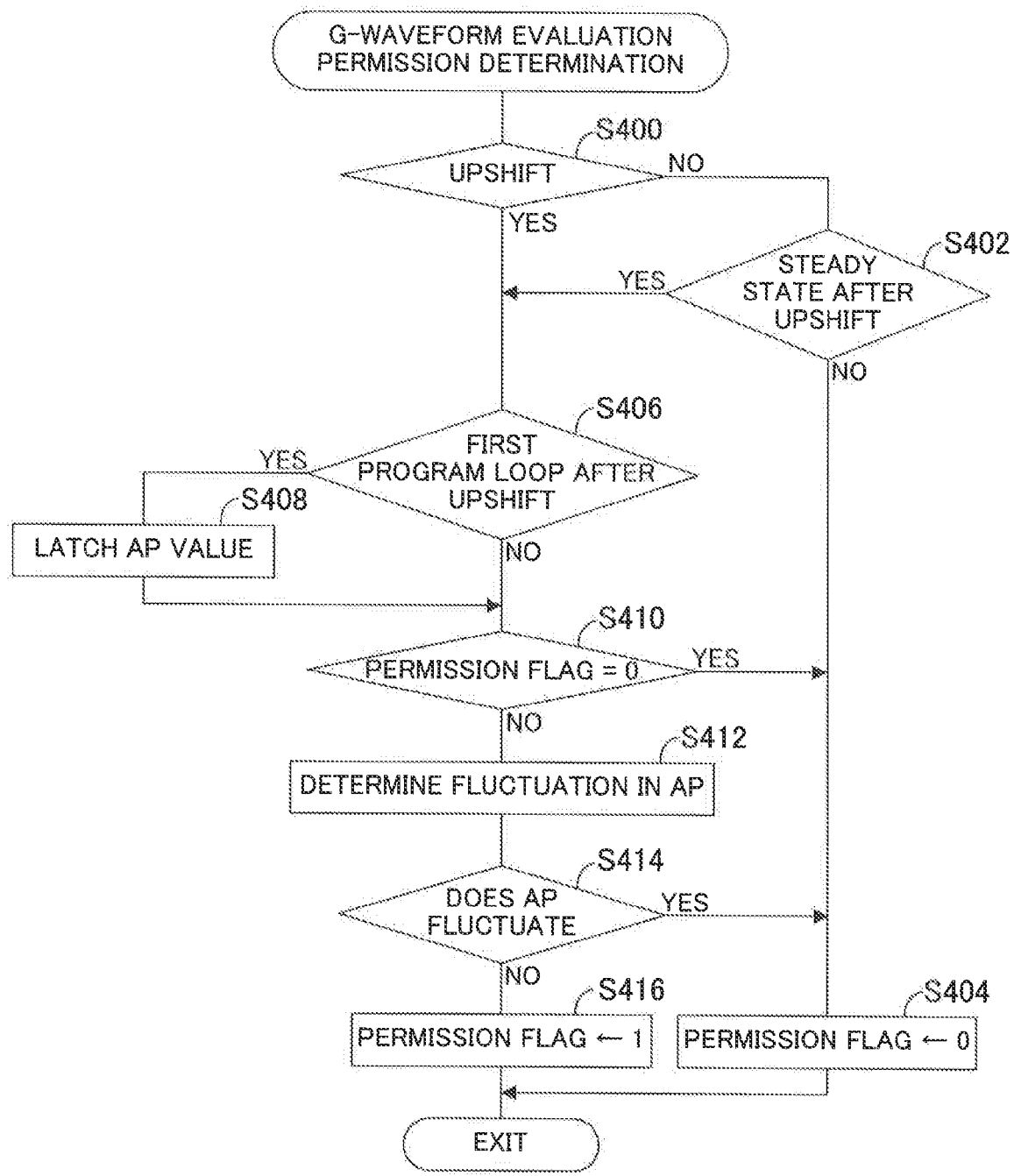
FIG. 8 is a subroutine flowchart showing a G-waveform evaluation permission determination process of the FIG. 7 flowchart.

FIG. 8 is a subroutine flowchart showing the process.

First in S400, it is determined whether it is the upshift. As mentioned above, since this embodiment is configured to evaluate the upshift, in the case of downshift or no shifting for instance, the result is negative and the program proceeds to S402 in which it is determined whether it is in the steady state after the upshift.

This determination is made because, when the vehicle running condition after the upshift is in the transient state, it is difficult to properly evaluate the G-waveform. Therefore, when the result in S402 is negative, the program proceeds to S404 in which the bit of a permission flag is reset to 0.

When the result in S400 or S402 is affirmative, the program proceeds to S406 in which it is determined whether it is the first program loop after the upshift, i.e., since the upshift was completed.

When the result in S406 is affirmative, the program proceeds to S408 in which a value of the accelerator opening AP is latched (or saved), while when the result is negative, the program proceeds to S410 in which it is determined whether the permission flag is 0 and when the result in S410 is affirmative, the program proceeds to S404.

On the other hand, when the result in S410 is negative, the program proceeds to S412 in which a process of determining fluctuation in the accelerator opening AP is conducted. This determination is made by comparing the accelerator opening AP detected by the accelerator opening sensor 76 with an appropriate threshold value and determining whether it exceeds the threshold value.

Next the program proceeds to S414 in which it is determined whether, in S412, the detected value is determined to exceed the threshold value. When the result in S414 is affirmative, it is determined that the accelerator opening AP fluctuates and the program proceeds to S404, while when the result is negative, the program proceeds to S416 in which the bit of the permission flag is set to 1.

Thus, when it is the upshift or when the vehicle running condition after the upshift is in the steady state, and also when the vehicle is under the running condition where the accelerator opening AP does not fluctuate, the upshift is evaluated from the G-waveform (more precisely, the ΔNC estimation value).

Returning to the explanation on the FIG. 7 flowchart, the program proceeds to S302 in which based on the bit of the permission flag it is determined whether the G-waveform evaluation is permitted. When the result in S302 is affirmative, the program proceeds to S304 in which it is determined whether it is the upshift.

When the result in S304 is affirmative, the program proceeds to S306 in which the pull-in point of T (torque) phase is detected. This is done by detecting a minimum value of the ΔNC estimation value as shown in FIG. 6.

Next the program proceeds to S308 in which an initial average G of the I phase following the T phase after the pull-in point was detected, is calculated from the ΔNC estimation value. The term of "initial" used above for the I phase indicates an interval or time period to be defined based on a GRATIO, from when the engaging operation with the hydraulic clutch Cn for the desired gear is started after the engagement with the hydraulic clutch Cn for a gear position of before shifting is released until when the engaging operation progresses to a predetermined condition. Note that, in FIGS. 5 and 6, the "GRATIO" represents a ratio of the input rotational speed NM to the output rotational speed NC of the transmission T, i.e., NC/NM, in other words, the shifting condition.

The I phase initial average G in S308 is calculated by obtaining the ΔNC estimation value indicated by A in a circle in FIG. 6 as the I phase initial average G, since the ΔNC estimation value is regarded as indicating the vehicle acceleration G. More specifically, the I phase initial average G is calculated by dividing an integral of the ΔNC estimation value over the above-mentioned interval by the integrated number.

On the other hand, when the result in S304 is negative, the program proceeds to S310 in which it is determined whether the vehicle running condition is in the steady state. When the result in S310 is affirmative, the program proceeds to S312 in which an after-shift average G (indicated by B in a circle FIG. 6), more precisely, an average G after the latest upshift (that made the determination in S304 affirmative) is completed, is calculated.

When the after-shift average G is calculated, the GRATIO representing the ratio of the input rotational speed NM to the output rotational speed NC of the transmission T is used to determine the completion of shifting, the ΔNC estimation value is regarded as indicating the vehicle acceleration G, and the ΔNC estimation value is used to obtain the after-shift average G in the same manner as the calculation of the I phase initial average G.

Next the program proceeds to S314 in which the I phase initial G is calculated. To be specific, the after-shift average G (vehicle acceleration average) indicated by B a circle in FIG. 6 calculated in S312 is subtracted from the I phase initial average G indicated by A in a circle calculated in S308 (i.e., the average of A in a circle–the average of B in a circle), thereby obtaining the I phase initial G.

Next the program proceeds to S316 in which the learning value is written in (stored). When the result in S302 is negative, the program proceeds to S318 in which the values obtained in S306, etc., are initialized (reset).

Figure 9:
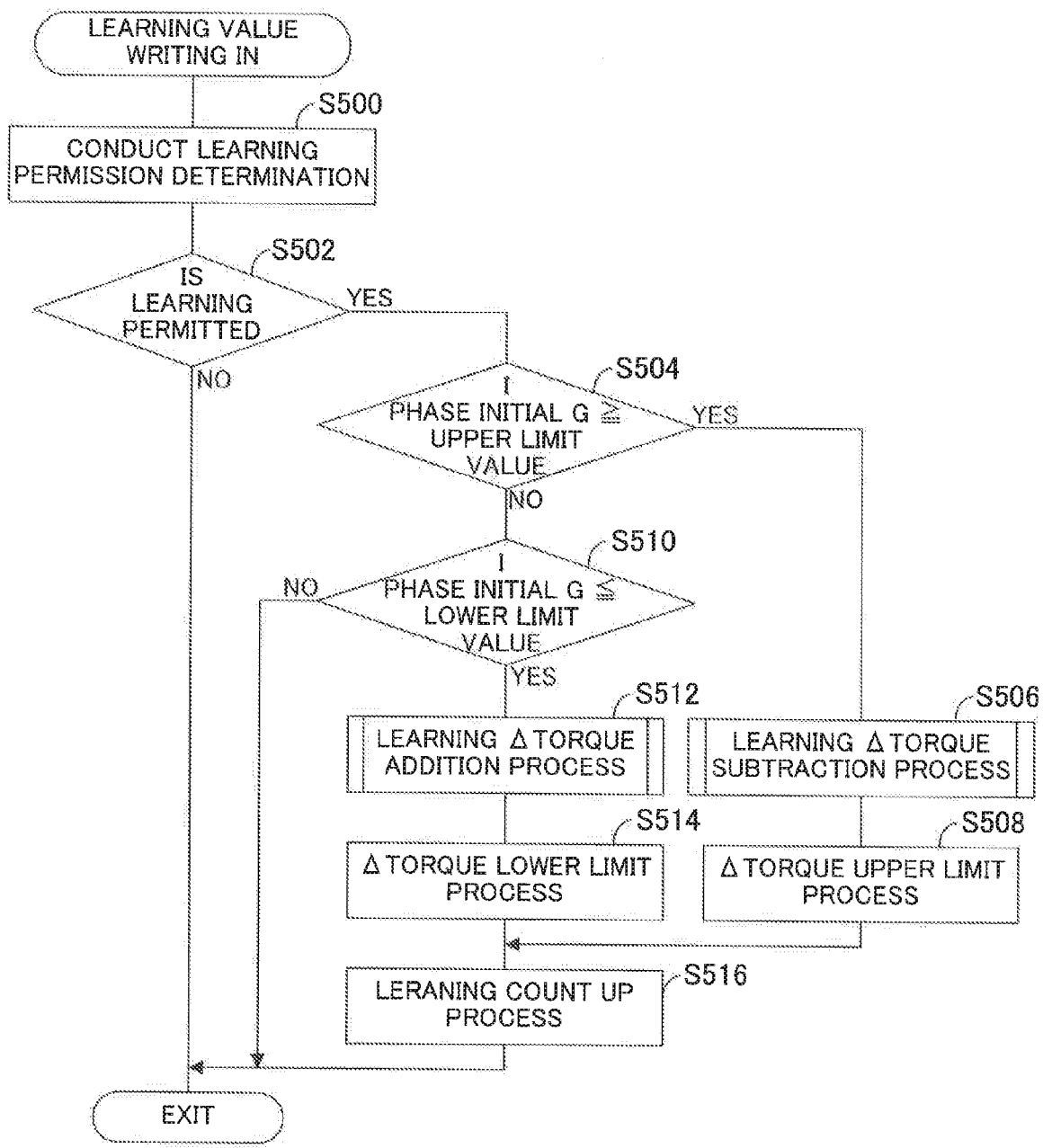
FIG. 9 is a subroutine flowchart showing a learning value write-in process of the FIG. 7 flowchart.

FIG. 9 is a subroutine flowchart showing a learning value write-in process conducted in S316.

In S500, a learning permission determination is conducted, i.e., it is determined whether the vehicle running is under a predetermined condition where the learning is permitted. Specifically, since the learning is permitted when the upshift is from the first to second or the second to third or the vehicle speed is at a predetermined low speed, it is determined whether the vehicle operation is under such a condition. The upshift is limited to the above changes because the limitation is necessary to carry out the appropriate learning to achieve the high quality shifting.

The program proceeds to S502 in which based on the determination in S500, it is determined whether the learning is permitted. When the result is affirmative, the program proceeds to S504 in which the I phase initial G is compared to an upper limit value of a threshold value (convergence threshold value).

When the result in S504 is affirmative, the program proceeds to S506 in which a learning Δ torque subtraction process is conducted, i.e., a learning Δ torque used for decrementally correcting the desired clutch torque is calculated.

Figure 10:
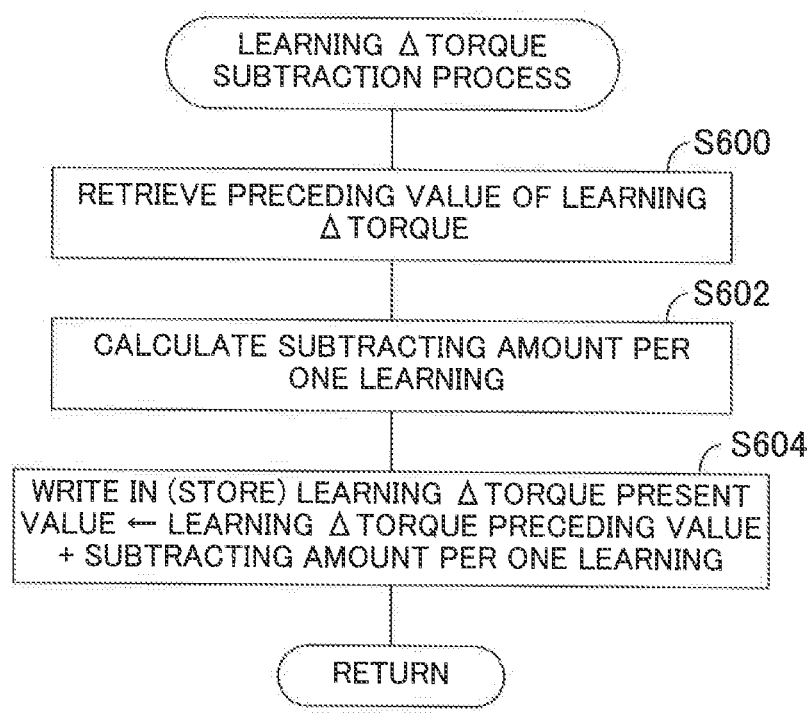
FIG. 10 is a subroutine flowchart showing a learning Δ torque (learning value) subtraction process of the FIG. 9 flowchart.

FIG. 10 is a subroutine flowchart showing the process.

In S600, a preceding value of the learning Δ torque is retrieved. This is done by, from among the learning Δ torque maps, selecting one corresponding to the desired gear and retrieving the preceding value (a value obtained in the preceding program loop of the FIG. 3 flowchart) in the selected map.

Figure 11:
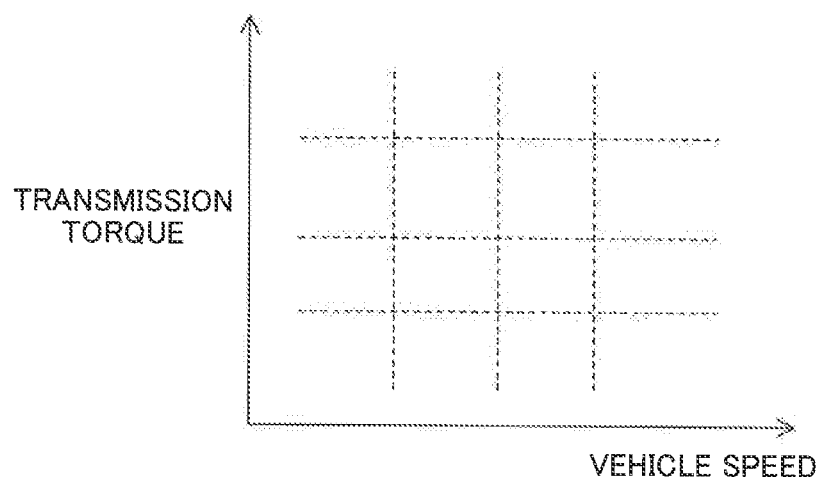
FIG. 11 is an explanatory view showing the characteristics of a learning Δ torque map used in the learning value write-in process of the FIG. 7 flowchart.

FIG. 11 is an explanatory view showing the characteristics of the map. The map like this is prepared in the RAM 86 separately for each gear position. Since the processing of S14 of the FIG. 3 flowchart is performed by reading out a value from the values (learning Δ torque) written in the selected map, the write-in process that is the preprocessing of S14 is also conducted after selecting one of the prepared maps corresponding to the desired gear.

Next the program proceeds to S602 in which a subtracting amount per one learning is calculated. The learning is conducted for correcting the manufacturing variance in the hydraulic clutch Cn. The product size tolerance of the hydraulic clutch Cn before shipping is set with a large margin so as to prevent the revving of the engine speed or lack of torque at shifting. The subtracting amount (or adding amount which will be described later) per one learning is obtained by dividing the size tolerance by a desired number of convergences.

The program proceeds to S604 in which the subtracting amount per one learning is added to the preceding value of the learning Δ torque to calculate an initial learning Δ torque present value (a value obtained in the present program loop of the FIG. 3 flowchart). Note that, since it is the subtracting process, the present value, preceding value, subtracting amount per one learning are to be all negative values.

In S604, at the same time, the transmission torque of the concerned hydraulic clutch Cn is calculated while the vehicle speed V is detected. The calculated present value is written (stored) in an appropriate area associated with a lattice point specified by the obtained transmission torque and vehicle speed V.

Returning to the explanation on the FIG. 9 flowchart, the program proceeds to S508 in which it is determined whether the calculated present value exceeds a Δ torque upper limit value and when it is determined to exceed, a process for limiting the present value to the upper limit value is conducted.

When the result in S504 is negative, the program proceeds to S510 in which it is determined whether the I phase initial G is equal to or less than a lower limit value and when the determination result is affirmative, the program proceeds to S512 in which the learning Δ torque used in a learning Δ torque addition process, i.e., used thr incrementally correcting the desired clutch torque, is calculated.

Figure 12:
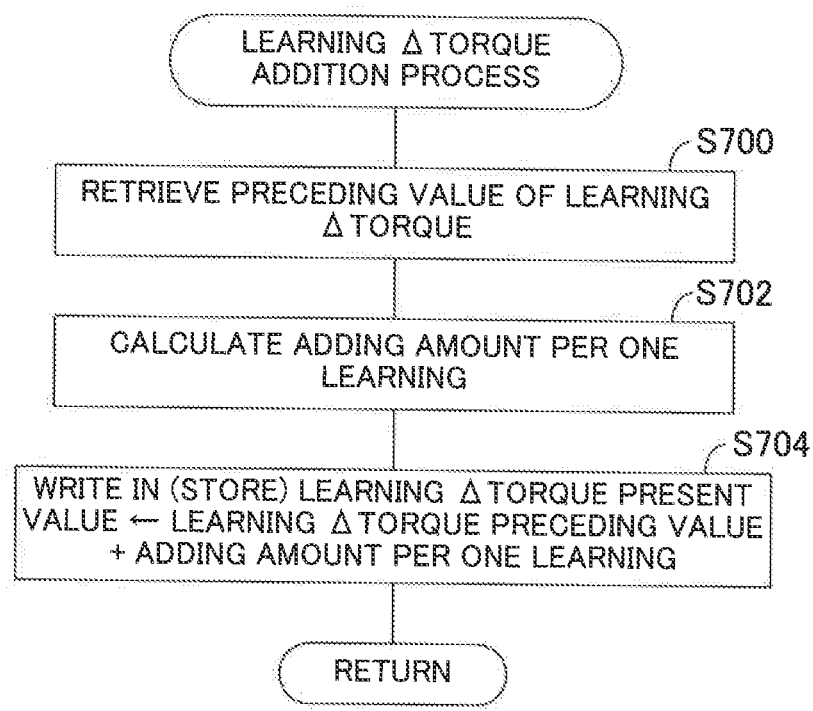
FIG. 12 is a subroutine flowchart showing a learning Δ torque (learning value) addition process of the FIG. 9 flowchart.

FIG. 12 is a subroutine flowchart showing the process.

In S700, the learning Δ torque map corresponding to the desired gear is selected and the preceding value of the learning Δ torque is retrieved. The program proceeds to S702 in which an adding amount per one learning is calculated in the same manner as the subtracting process.

Next the program proceeds to S704 in which the adding amount per one learning is added to the preceding value of the learning Δ torque to calculate the initial learning Δ torque present value. Since it is the addition process, the present value, preceding value, adding amount per one learning are to be all positive values.

At the same time, the transmission torque is calculated while the vehicle speed V is detected. The calculated present value is written (stored) in an appropriate area associated with a lattice point specified by the obtained transmission torque and vehicle speed V.

Returning to the explanation on the FIG. 9 flowchart, the program proceeds to S514 in which it is determined whether the calculated present value is less than a Δ torque lower limit value and when it is determined to be less than it, a process for limiting the present value to the lower limit value is conducted.

Then the program proceeds to S516 in which a learning count up process is conducted. Specifically, the number of times the learning Δ torque is calculated in S506 or S512 is counted and the counted number of times is stored in one of the maps prepared in the RAM 86 separately for each gear position to be retrievable using the transmission torque of the hydraulic clutch Cn and the vehicle speed V.

Thus, the learning value calculated in the process of the FIG. 9 flowchart is read out in S14 of the FIG. 2 flowchart; based on the value, the desired clutch torque is calculated in S16; and the operation of the linear solenoid SLn is controlled so as to establish the desired clutch torque in S18.

Owing to the foregoing configuration in the first embodiment, since a first and second predetermined values (threshold values) used in S504 and S510 are appropriately set, the desired value (clutch torque command value) of the transmission torque of the frictional engaging element is incrementally and decrementally corrected so that the calculated difference (I phase initial G) falls within a predetermined range as shown in FIG. 6, and the hydraulic pressure to be supplied to the frictional engaging element (hydraulic clutch Cn) can be controlled so as to establish the transmission torque desired value that has been incrementally and decreasing corrected. Consequently, as indicated by arrows in FIG. 5, the vehicle acceleration G (and the ΔNC estimation value) in the inertia (I) phase at shifting can be decreased.

In other words, since the vehicle acceleration G at shifting is estimated and evaluated from the ΔNC estimation value and based thereon, the variance in the transmission torque of the frictional engaging element is learned, it becomes possible to fully exploit the potential of the frictional engaging element, etc., thereby improving a feel given to the vehicle occupants) at shifting.

Second Embodiment

Figure 13:
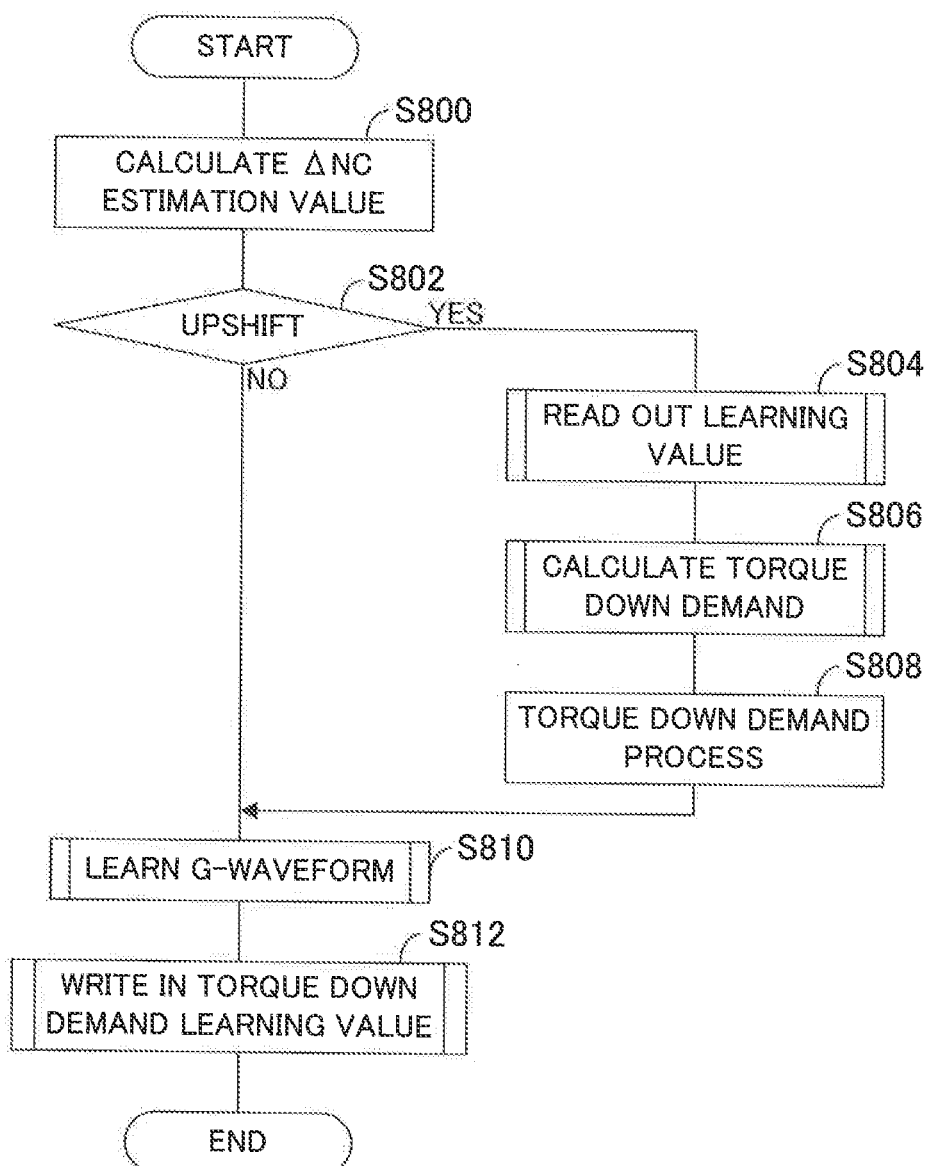
FIG. 13 is a flowchart similar to FIG. 2, but showing the operation of a control apparatus for an automatic transmission according to a second embodiment of this invention.

FIG. 13 is a flowchart similar to FIG. 2, but showing the operation of a control apparatus for an automatic transmission according to a second embodiment of this invention and FIGS. 14 to 17 are subroutine flowcharts thereof.

Figure 18:
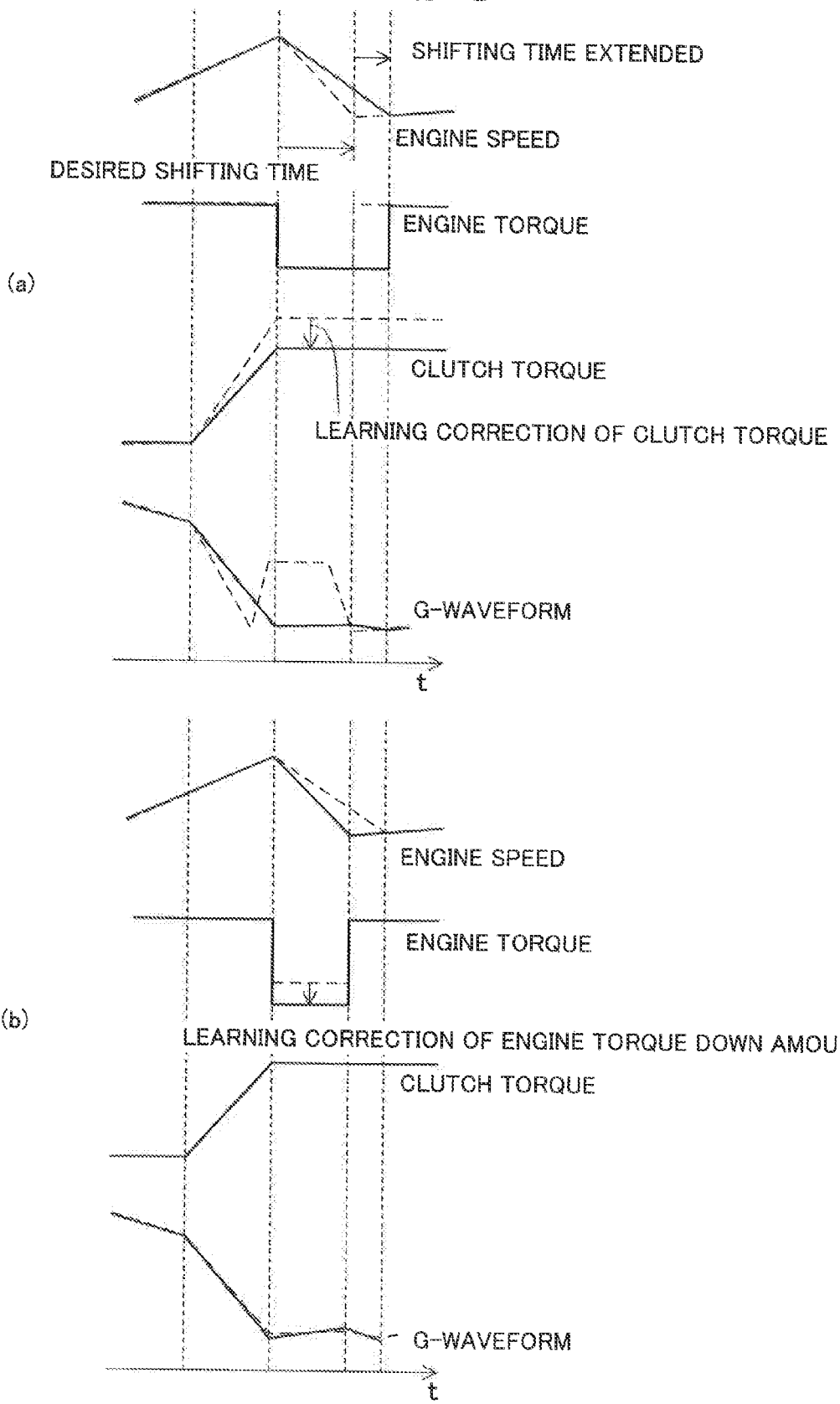
FIG. 18 is a set of time charts showing comparison of the process of the FIG. 13 flowchart in the second embodiment with the process of the FIG. 2 flowchart in the first embodiment.

Before making the explanation on the above figures, the explanation on the second embodiment will be made with reference to FIG. 18. FIG. 18($a$) is a time chart showing the process in the first embodiment and FIG. 18($b$) is a time chart showing that in the second embodiment.

Since the above-mentioned processes are performed in the first embodiment, the vehicle G-waveform can be made flat as shown at the bottom of FIG. 18($a$), so that a feel to be given to the vehicle occupant(s) at shifting can be improved. However, at the same time, as shown in the upper portion of the same figure, it may cause a longer shifting time, resulting in a worse feel, a sluggish feel at shifting.

Therefore, in the second embodiment, when the shifting time is likely to be increased, as shown in FIG. 18($b$), the engine torque is decreased to prevent the feel at shifting from getting worse, i.e., getting sluggish for example.

On the premise of the foregoing point, the explanation on the FIG. 13 flowchart is made. Similarly to the first embodiment, in S800, the ΔNC estimation value is calculated, and the program proceeds to S802 in which it is determined whether it is the upshift. When the result in S802 is affirmative, the program proceeds to S804 in which the leaning value is read out.

Figure 14:
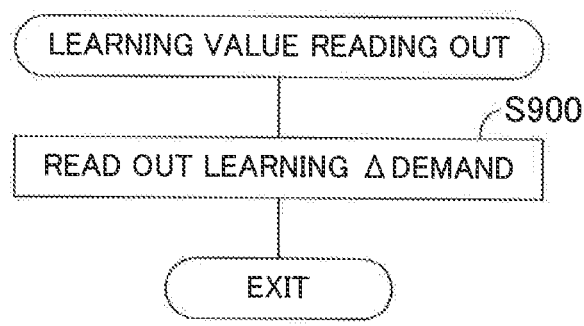
FIG. 14 is a subroutine flowchart showing a learning value read-out process of the FIG. 13 flowchart.

FIG. 14 is a subroutine flowchart showing the process. In S900, a learning Δ demand (described later) is read out.

Returning to the explanation on the FIG. 13 flowchart, the program proceeds to S806 in which a torque down demand is calculated.

Figure 15:
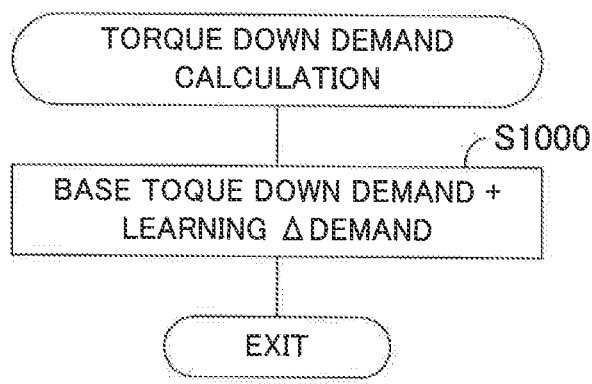
FIG. 15 is a subroutine flowchart showing a torque down demand calculation process of the FIG. 13 flowchart.

FIG. 15 is a subroutine, flowchart showing the process. In S1000, a base torque down demand is retrieved and the retrieved value is added to the learning Δ demand read out in S804 to calculate the torque down demand.

Again returning to the explanation on the FIG. 13 flowchart, the program proceeds to S808 in which torque of the engine E is decreased in accordance with the calculated torque down demand. Specifically, it is done by retarding the ignition timing or closing the throttle valve in the DBW mechanism 55 by an amount corresponding to the calculated torque down demand.

Next the program proceeds to S810 in which the G-waveform is learned. This is done through the same process as that explained with FIGS. 7 to 10 in the first embodiment, so the explanation thereof is omitted. Then the program proceeds to S812 in which a learning value of the torque down demand is written in.

Figure 16:
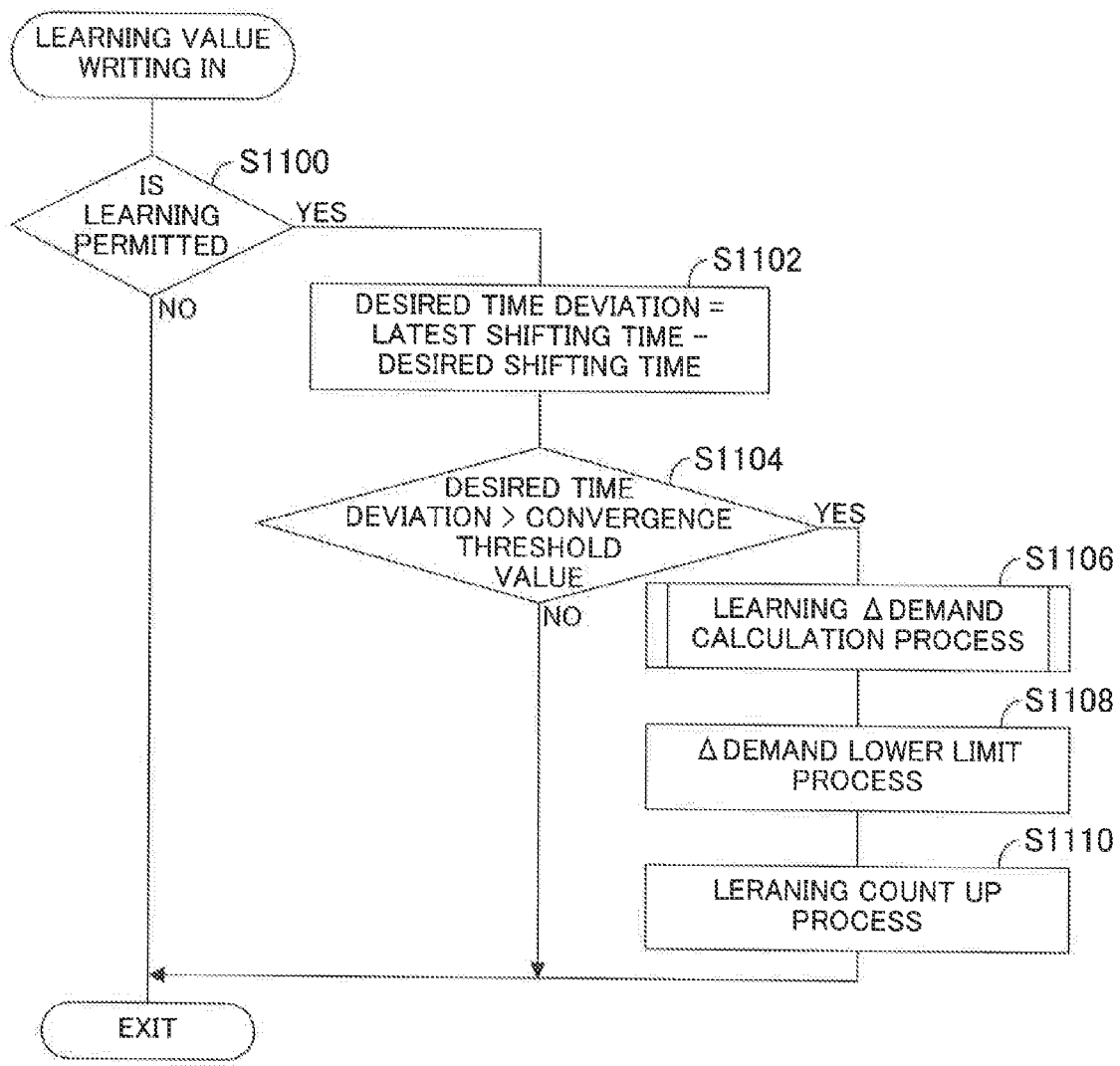
FIG. 16 is a subroutine flowchart showing a torque down demand learning value write-in process of the FIG. 13 flowchart.

FIG. 16 is a subroutine flowchart showing the process.

First, in S1100, it is determined whether the learning is permitted. Since this learning permission determination is the same as that in FIG. 9 in the first embodiment, the explanation thereof is omitted.

When the result in S1100 is negative, the remaining steps are skipped while when the result is affirmative, the program proceeds to S1102 in which a desired time deviation is calculated by subtracting a desired shifting time from a latest shifting time. The desired shifting time is a fixed value set in advance.

Next the program proceeds to S1104 in which it is determined whether the calculated desired time deviation exceeds a convergence threshold value. The convergence threshold value is also a fixed value set in advance. When the result in S1104 is negative, the remaining steps are skipped, while when the result is affirmative, the program proceeds to S1106 in which the learning Δ demand is calculated (and written in).

Figure 17:
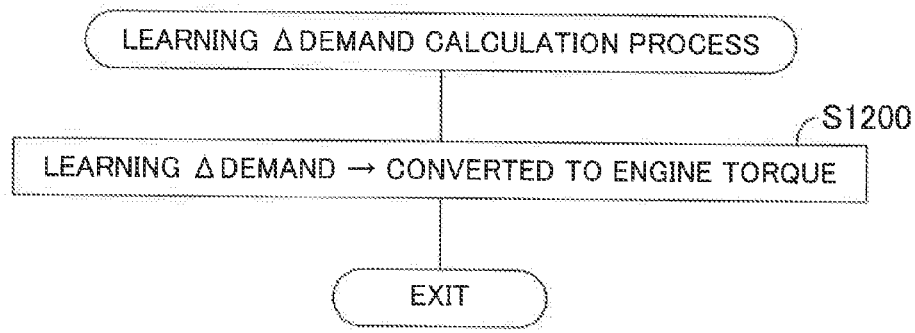
FIG. 17 is a subroutine flowchart showing a learning Δ demand calculation process of the FIG. 16 flowchart.

FIG. 17 is a subroutine flowchart showing the process.

In S1200, the learning Δ demand is calculated. Specifically, a value which is obtained through learning in processes of the second embodiment similar to the processes of S506 to S514, particularly of S506 to S508 of the first embodiment, and used for incrementally (and decrementally) correcting the desired value of the transmission torque of the hydraulic clutch Cn for the desired gear (learning Δ torque present value) is read out, and the obtained value is converted to torque of the engine E to calculate the learning Δ demand. At the same time, the obtained value is written in a corresponding map similar to that shown in FIG. 11 to be retrievable using the concerned hydraulic clutch Cn and the vehicle speed V.

Returning to the explanation on the FIG. 16 flowchart, the program proceeds to S1108 in which a lower limit process is conducted, and to S1110 in which, similarly to the first embodiment, the number of times of learning is counted and the counted number of times is stored to be retrievable using the transmission torque of the hydraulic clutch Cn for the desired gear and the vehicle speed V. The remaining configuration of the second embodiment is the same as that in the first embodiment, so it is not illustrated.

Since the second embodiment is configured as described in the foregoing, when the shifting time is likely to be increased due to the control described in the first embodiment, the engine torque is decreased so that the shifting time converges to the desired shifting time, whereby it becomes possible to prevent a feel at shifting from getting worse, i.e., getting sluggish for example.

Further, in the apparatus, when the shifting time exceeds the desired shifting time by a predetermined value or more, the torque down demand of the engine is calculated. With this, it becomes possible to converge the shifting time to the desired shifting time more reliably. The remaining configuration of the second embodiment is the same as that in the first embodiment.

As stated above, in the first and second embodiments, it is configured to have an apparatus (ECU 80) for controlling an automatic transmission T that changes speed of an output of an engine E mounted on a vehicle through a frictional engaging element (hydraulic clutch Cn), characterized by: input rotational speed detecting means (first rotational speed sensor 64, ECU 80) for detecting an input rotational speed NM of the automatic transmission; output rotational speed detecting means (second rotational speed sensor 66, ECU 80) for detecting an output rotational speed NC of the automatic transmission; output rotational speed change amount calculating means (S10, S800) for calculating a change amount (ΔNC estimation value) of the output rotational speed; output rotational speed change amount average calculating means (S20, S308, S810) for calculating an average (I phase initial average G) of the change amount of the output rotational speed over a predetermined period of an initial inertia (I) phase of shifting; vehicle acceleration average calculating means (S20, S312, S810) for determining completion of the shifting based on a ratio (GRATIO) of the input rotational speed NM to the output rotational speed NC and calculating an average (after-shift average G) of a vehicle acceleration after the completion of the shifting based on the change amount of the output rotational speed, assuming that the change amount (ΔNC estimation value) of the output rotational speed indicates the vehicle acceleration G; difference calculating means (S20, S314, S810) for calculating a difference (I phase initial G) between the average of the change amount of the output rotational speed and the average of the vehicle acceleration; learning value calculating means (S20, S316, S500 to S516, S810, S1100 to S1110) for calculating a learning value used for incrementally and decrementally correcting a desired value of transmission torque of the frictional engaging element such that the calculated difference falls within a predetermined range; incrementally and decrementally correcting means (S14 to S16) for incrementally and decrementally correcting the desired value of the transmission torque of the frictional engaging element with the calculated learning value; and hydraulic supply control means (S18) for controlling supply of hydraulic pressure to the frictional engaging element such that it becomes the corrected desired value of the transmission torque. With this, since the vehicle acceleration G at shifting is estimated and evaluated from the ΔNC estimation value and based thereon, variation in the transmission torque of the frictional engaging element is learned, it becomes possible to fully exploit the potential of the frictional engaging element (hydraulic clutch Cn), etc., thereby improving a feel given to the vehicle occupant(s) at shifting.

In other words, the threshold values used in S504 and S510 are appropriately set, such that the learning value used for incrementally and decrementally correcting the desired value (clutch torque command value) of the transmission torque of the frictional engaging element (hydraulic clutch Cn) so that the calculated difference (I phase initial G) falls within the predetermined range as shown in FIG. 6, is calculated; the desired value of the transmission torque of the frictional engaging element is incrementally and decrementally corrected with the learning value; and the hydraulic pressure to be supplied to the frictional engaging element is controlled so as to establish the transmission torque desired value that has been incrementally and decreasing corrected. With this, since the vehicle acceleration G at shifting is estimated and evaluated from the ΔNC estimation value and based thereon, variation in the transmission torque of the frictional engaging element is learned, it becomes possible to fully exploit the potential of the frictional engaging element, etc., thereby improving a feel given to the vehicle occupant(s) at shifting.

It should be noted that, in the foregoing, the "incrementally and decrementally correcting means" can be configured to incrementally and decrementally correct the hydraulic pressure to be supplied to the frictional engaging element so that the calculated difference falls within the predetermined range. Specifically, the "transmission torque" is used to mean equivalent to the "hydraulic supply" in the foregoing.

Further, in the second embodiment, the apparatus further includes engine torque down demand calculating means (S812, S1100 to S1110, S804 to S806) for calculating a torque down demand of the engine E based on the corrected desired value of the transmission torque; and engine torque decreasing means (S808) for decreasing a torque of the engine E in accordance with the calculated torque down demand. With this, when the shifting time is likely to be increased due to the control described in the first embodiment, the engine torque can be decreased so that the shifting time converges to the desired shifting time, whereby it becomes possible to prevent a feel at shifting from getting worse, i.e., getting sluggish for example.

Further, in the second embodiment, the engine torque down demand calculating means calculates the torque down demand of the engine when a shifting time exceeds a desired shifting time by a predetermined value (convergence threshold value) or more (S1102, S1104). With this, it becomes possible to converge the shifting time to the desired shifting time more reliably.

Further, in the first and second embodiments, the incrementally and decrementally correcting means corrects the desired value of the transmission torque of the frictional engaging element such that the calculated difference falls within the predetermined range when the vehicle is under a predetermined running condition (S20, S316, S500 to S514, S810). With this, in addition to the above effects, it becomes possible to allow the increasing and decreasing correction, i.e., the learning only when the vehicle operation is under a predetermined running condition, thereby making the configuration simple.

Third Embodiment

Next a control apparatus for an automatic transmission according to a third embodiment of this invention, more exactly, the operation thereof will be explained.

The explanation is made with focus on the points of difference from the first embodiment. In the third embodiment, vehicle weight is estimated and a learning value is corrected based on the estimated vehicle weight.

Figure 19:
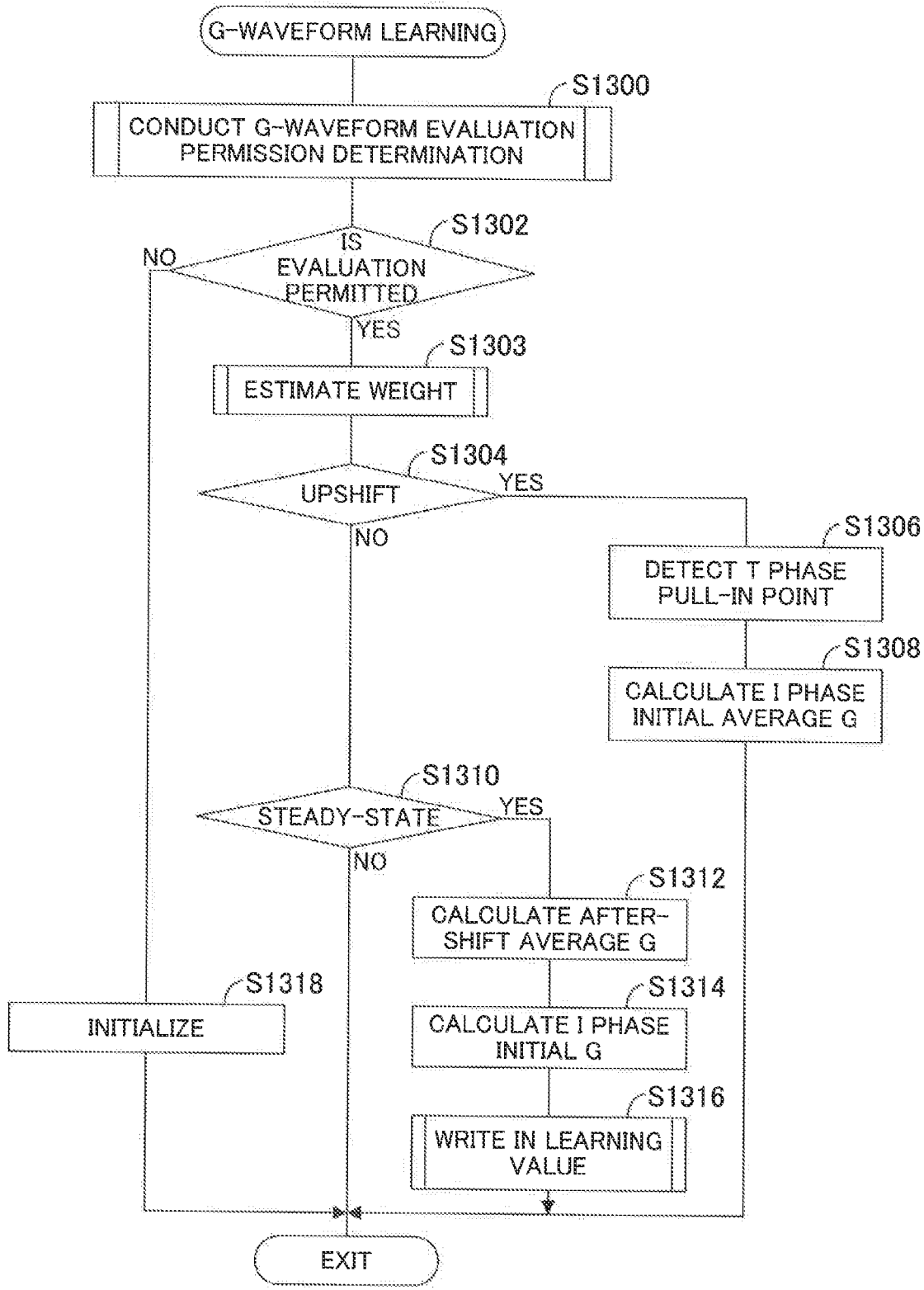
FIG. 19 is a subroutine flowchart showing the operation of a control apparatus for an automatic transmission according to a third embodiment of this invention, more exactly, showing a G-waveform learning process thereof.

FIG. 19 is a subroutine flowchart showing a G-waveform learning process according to the third embodiment, in the same process as the FIG. 2 flowchart in the first embodiment.

The program begins at S1300 in which a G-waveform evaluation permission determination, process is conducted similarly to the first embodiment. The program proceeds to S1302 in which it is determined whether the G-waveform evaluation is permitted and when the result is affirmative, the program proceeds to S1303 in which weight estimation, i.e., vehicle weight estimation is conducted.

Figure 20:
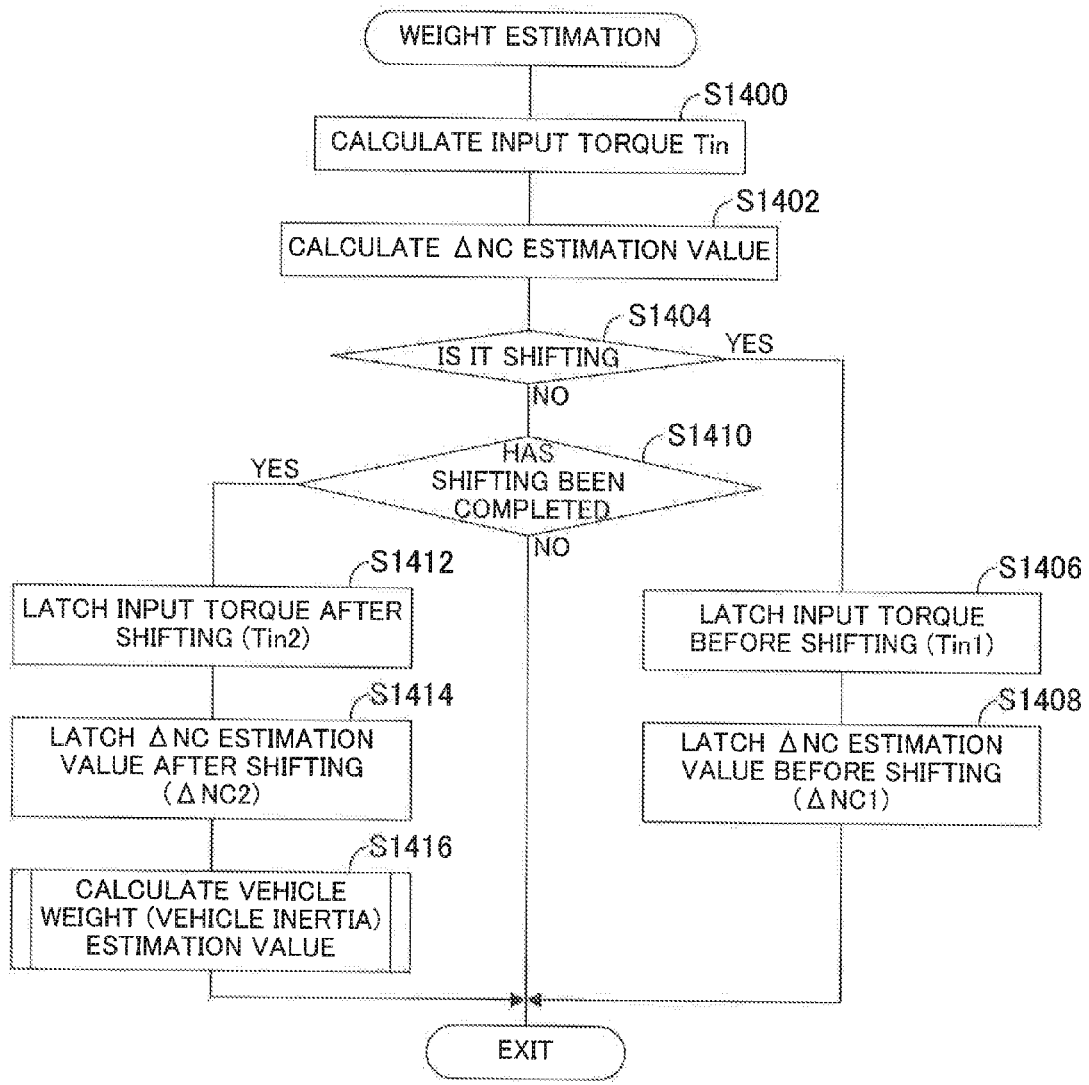
FIG. 20 is a subroutine flowchart showing a vehicle weight estimation process of the FIG. 19 flowchart.

FIG. 20 is a subroutine flowchart showing the process.

In S1400, an input torque Tin to be inputted from the engine E to the transmission T is calculated.

Similarly to the transmission torque of the hydraulic clutch en calculated in the same manner as in the first embodiment, the input torque Tin is calculated from the engine speed NE of the engine E, the load and the slip ratio ETR of the torque converter 12. Note that the input torque Tin is calculated by obtaining its moving average over a predetermined time period. Next the program proceeds to S1402 in which $\Delta NC$ estimation value is calculated in the same manner as in the first embodiment.

Before making the subsequent explanation on the FIG. 20 flowchart, a vehicle weight estimation process in this embodiment is explained with reference to FIG. 21.

Figure 21:
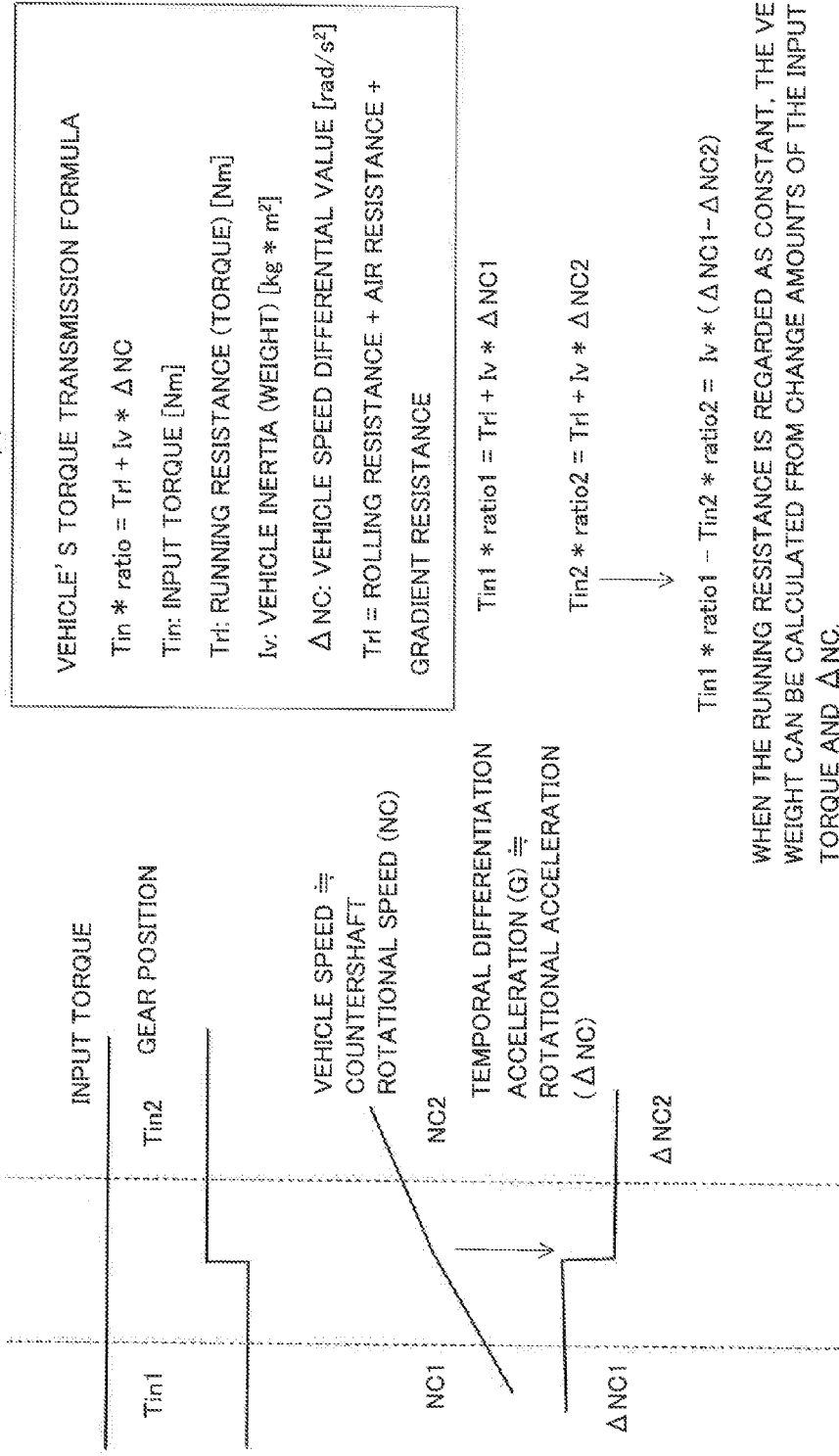
FIG. 21 is a set of explanatory views for explaining the vehicle weight estimation process of the FIG. 20 flowchart.

When the vehicle is shifted (e.g., when it is shifted up) as shown in FIG. 21(a), vehicle's torque transmission formulas can be expressed as shown in FIG. 21(b). Values before shifting is suffixed with 1 and that after shifting with 2. For instance, the $\Delta NC$ estimation value is represented by "$\Delta NC1$," etc., in FIG. 21.

Here, when assuming that the gradient of a road is low and change in vehicle speed is small during shifting, it leads to the presumption that running resistance is constant and as shown at the bottom of FIG. 21(b), the vehicle weight can be estimated from change amounts of the input torque and $\Delta NC$ ($\Delta NC$ estimation value).

Further, even in the case where the input torque Tin1 before shifting and the input torque Tin2 after shifting are the same, since a difference between ratios of gear positions (gear ratios) (common ratio) is reflected in the output torque, vehicle's inertia Iv can be obtained and based thereon, the vehicle weight can be calculated.

Returning to the FIG. 20 flowchart, the program proceeds to S1404 in which it is determined whether shifting is in progress based on change in a shift signal to be produced in response to a request by the operator. When the result in S1404 is affirmative, the program proceeds to S1406 in which a value of the input torque before shifting (Tin1) is latched (or saved), and to S1408 in which the $\Delta NC$ estimation value before shifting ($\Delta NC1$) is latched.

On the other hand, when the result in S1404 is negative, the program proceeds to S1410 in which it is determined whether the shifting has been completed based on the GRATIO. When the result in S1410 is negative, the remaining steps are skipped while when the result is affirmative, the program proceeds to S1412 in which a value of the input torque after shifting (Tin2) is latched (or saved).

Next the program proceeds to S1414 in which the $\Delta NC$ estimation value after shifting ($\Delta NC2$) is latched (or saved), and to S1416 in which a vehicle weight (vehicle inertia) estimation value is calculated (i.e., the vehicle weight is estimated).

Figure 22:
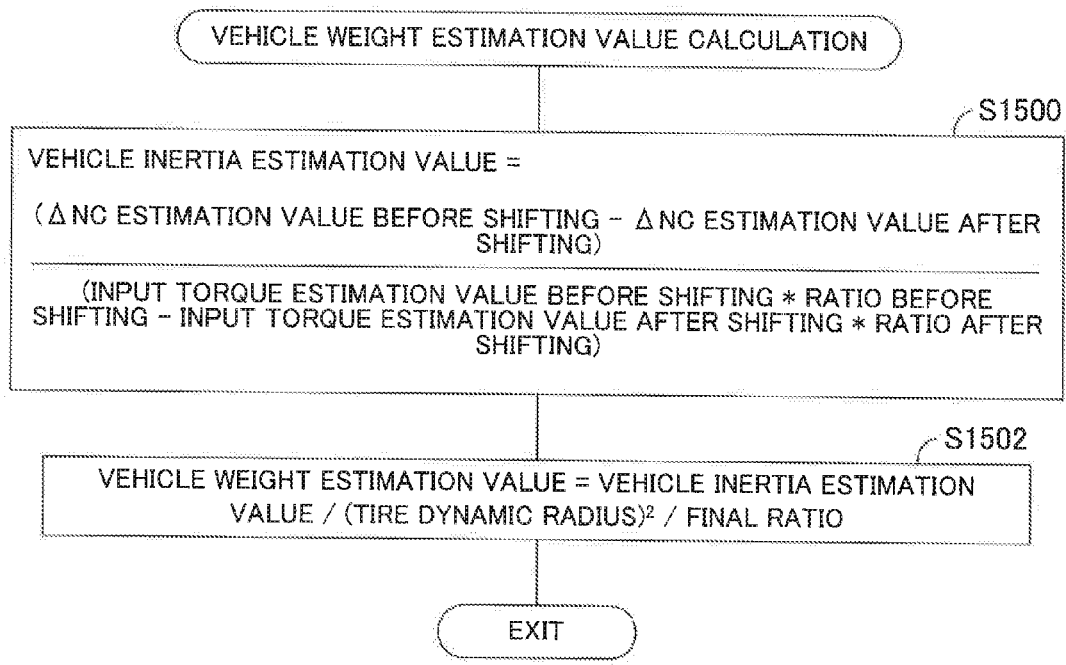
FIG. 22 is a subroutine flowchart showing a vehicle weight (vehicle inertia) estimation value calculation process of the FIG. 20 flowchart.

FIG. 22 is a subroutine flowchart showing the process.

In S1500, the vehicle inertia estimation value is calculated in accordance with the shown equation. The equation is obtained by transforming the equation at the bottom of FIG. 21(b). The vehicle inertia estimation value is calculated as a converted value of inertia at the countershaft CS.

Next the program proceeds to S1502 in which a vehicle weight estimation value is calculated (i.e., the vehicle weight is estimated) by dividing the vehicle inertia estimation value by the square of dynamic radius of the driven wheel (tire) W and dividing the thus-obtained quotient by a deceleration ratio corresponding to a final ratio (final deceleration ratio).

Returning to the FIG. 19 flowchart, after processing the steps of S1304 to S1314 similarly to the first embodiment, the program proceeds to S1316 in which the learning value is written in. When the result in S1302 is negative, the program proceeds to S1318 in which the learning value is initialized.

Figure 23:
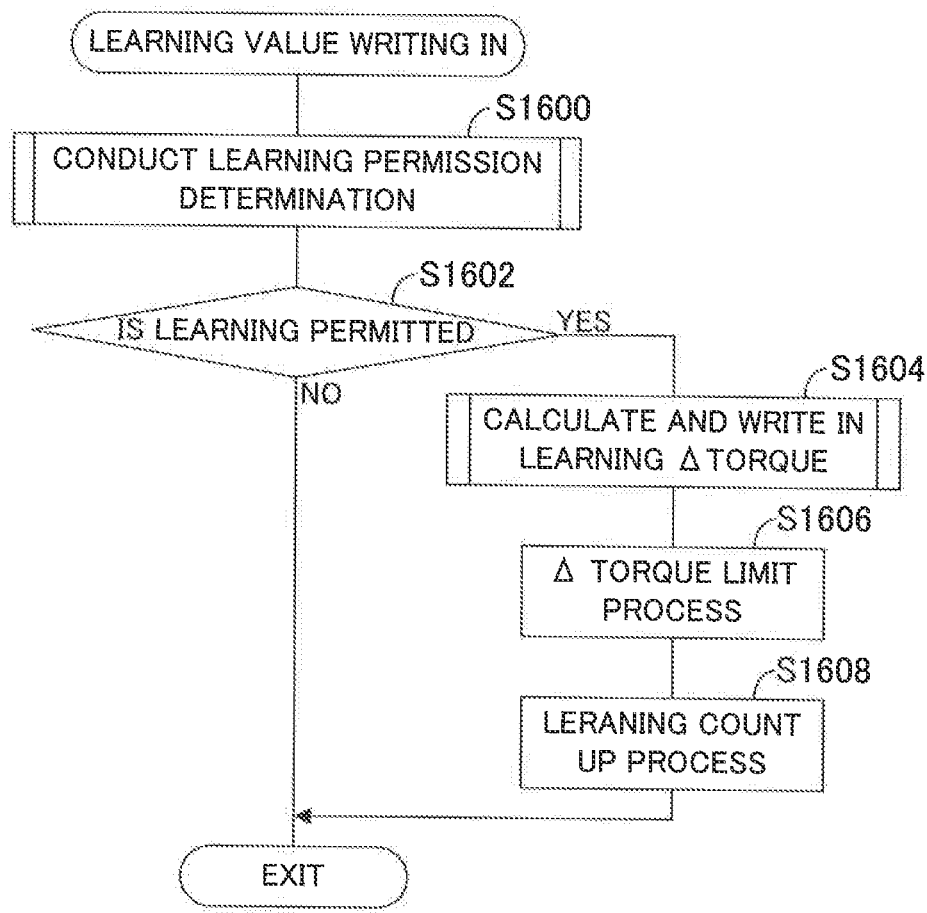
FIG. 23 is a subroutine flowchart showing a learning value write-in process of the FIG. 19 flowchart.

FIG. 23 is a subroutine flowchart showing a learning value write-in process.

In S1600, a learning permission determination process is conducted, i.e., it is determined whether the vehicle is under a condition where the learning is permitted.

Figure 24:
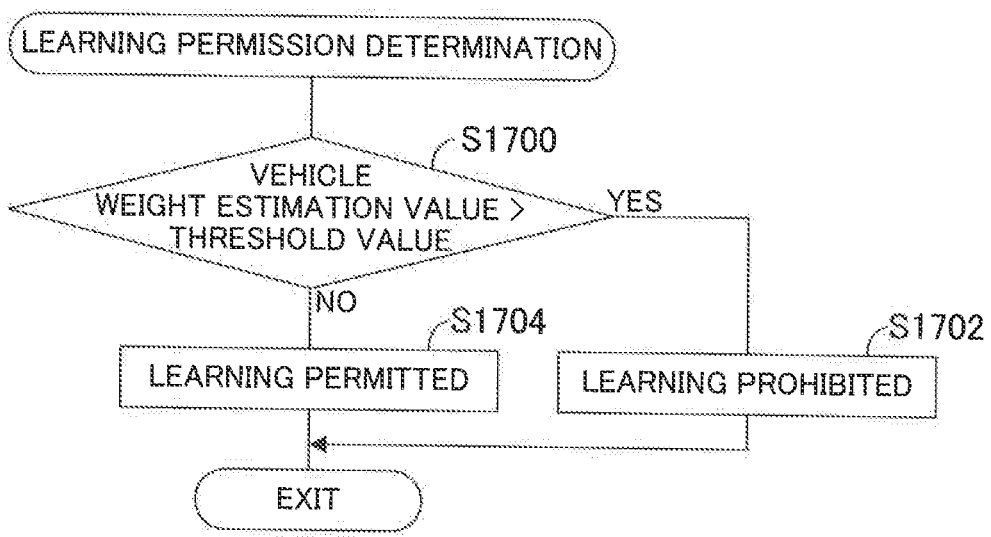
FIG. 24 is a subroutine flowchart showing a learning permission determination process of the FIG. 23 flowchart.

FIG. 24 is a subroutine flowchart showing the process.

In S1700, it is determined whether the calculated vehicle weight estimation value exceeds a threshold value. When the result in S1700 is affirmative, the program proceeds to S1702 in which the learning is prohibited while when the result is negative, the program proceeds to S1704 in which the learning is permitted.

Returning to the FIG. 23 flowchart, the program proceeds to S1602 in which it is determined whether the learning has been permitted based on the determination in S1600 and when the result is affirmative, the program proceeds to S1604 in which the aforementioned learning $\Delta$ torque is calculated and written in.

Figure 25:
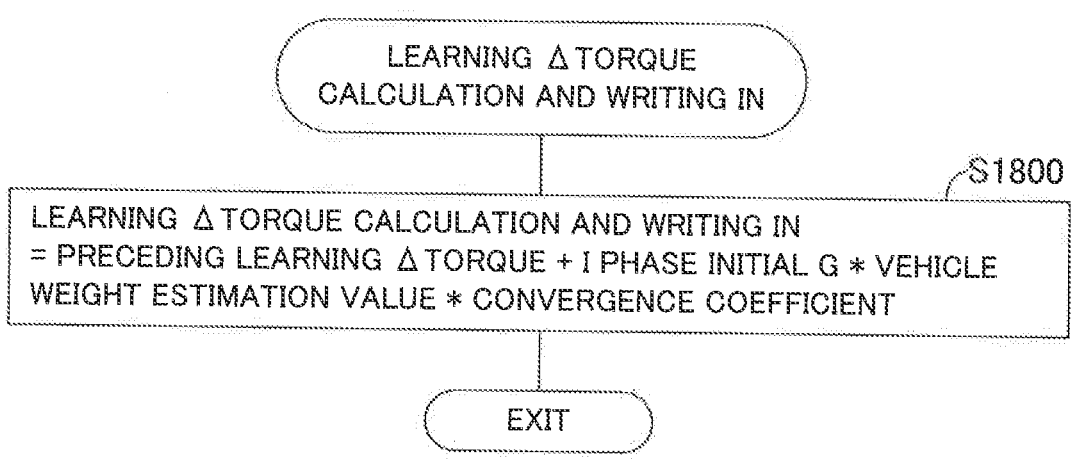
FIG. 25 is a subroutine flowchart showing a learning Δ torque calculation and write-in process of the FIG. 23 flowchart.

FIG. 25 is a subroutine flowchart showing the process.

In S1800, the learning $\Delta$ torque is calculated in accordance with the shown equation. Specifically, the (present) learning $\Delta$ torque is calculated by adding a product obtained by multiplying the I phase initial G calculated in S1314, the vehicle weight estimation value calculated in S1502 and a convergence coefficient to the preceding learning $\Delta$ torque. In other words, the learning value is corrected with the estimated vehicle weight.

The convergence coefficient is appropriately set through integral control so that variance in the output or evaluation decreases to converge the learning value to a stable one and so that sharp change in a shifting feel caused by the learning does not arise, thereby preventing the operator from having an uncomfortable feel in the course of convergence.

As mentioned in the foregoing, the calculated learning Δ torque is written (stored) in the learning Δ torque map (as shown in FIG. 11) prepared in the RAM 86 separately for each gear position to be retrievable using the transmission torque of the hydraulic clutch Cn and the vehicle speed V.

Returning to the FIG. 23 flowchart, the program proceeds to S1606 in which a Δ torque limit process is conducted, and to S1608 in which the number of times the learning Δ torque is calculated is counted and the counted number of times is written (stored) in the map prepared in the RAM 86 to be retrievable using the transmission torque of the hydraulic clutch Cn and the vehicle speed V. The remaining configuration of the third embodiment is the same as that in the first embodiment, so it is not illustrated.

As stated above, in the third embodiment, it is configured to have an apparatus (ECU 80) for controlling an automatic transmission T that changes speed of an output of an engine E mounted on a vehicle through a frictional engaging element (hydraulic clutch Cn), characterized by: input rotational speed detecting means (first rotational speed sensor 64, ECU 80) for detecting an input rotational speed NM of the automatic transmission; output rotational speed detecting means (second rotational speed sensor 66, ECU 80) for detecting an output rotational speed NC of the automatic transmission; output rotational speed change amount calculating means (S10) for calculating a change amount (ΔNC estimation value) of the output rotational speed; output rotational speed change amount average calculating means (S20, S308, S1308) for calculating an average (I phase initial average G) of the change amount of the output rotational speed over a predetermined period of an initial inertia (I) phase of shifting; vehicle acceleration average calculating means (S20, S312, S1312) for determining completion of the shifting based on a ratio (GRATIO) of the input rotational speed NM to the output rotational speed NC and calculating an average (after-shift average G) of a vehicle acceleration after the completion of the shifting based on the change amount of the output rotational speed, assuming that the change amount (ΔNC estimation value) of the output rotational speed indicates the vehicle acceleration G; difference calculating means (S20, S314, S1314) for calculating a difference (I phase initial G) between the average of the change amount of the output rotational speed and the average of the vehicle acceleration; learning value calculating means (S20, S316, S500 to S516, S1316, S1606 to S1608) for calculating a learning value used for incrementally and decrementally correcting a desired value of transmission torque of the frictional engaging element such that the calculated difference falls within a predetermined range; incrementally and decrementally correcting means (S14 to S16) for incrementally and decrementally correcting the desired value of the transmission torque of the frictional engaging element with the calculated learning value; hydraulic supply control means (S18) for controlling supply of hydraulic pressure to the frictional engaging element such that it becomes the corrected desired value of the transmission torque; input torque calculating means (S20, S1303, S1400) for calculating an input torque Tin to be inputted to the automatic transmission; vehicle weight estimating means (S1404 to S1416, S1500, S1502) for estimating weight of the vehicle based on at least the input torque before the shifting, the input torque after the shifting and the change amount of the output rotational speed; and learning value correcting means (S1316, S1604, 1800) for correcting the learning value using the estimated vehicle weight. With this, similarly to the foregoing embodiments, it becomes possible to estimate and evaluate the vehicle acceleration at shifting and based thereon, learn variance in the transmission torque of the hydraulic clutch (frictional engaging element) Cn, etc., further reliably. Consequently, the potential of the frictional engaging element can be fully exploited, thereby improving a feel given to the vehicle occupant(s) at shifting.

Further, in the apparatus, since the learning value correcting means corrects the learning value using the estimated vehicle weight (S1316, S1604, 1800), it becomes possible to prevent the vehicle acceleration from being influenced by the vehicle weight, which may lead to an incorrect learning value, so that the leaning value can converge to a stable one.

Further, in the apparatus, since the vehicle weight is estimated using the same parameters as those for calculating the transmission torque of the hydraulic clutch (frictional engaging element) Cn, etc., it can be easily estimated.

Further, in the apparatus, the learning value correcting means prohibits learning when the estimated vehicle weight exceeds a threshold value (S1316, S1600, S1700 to S1704). With this, in addition to the above effects, it becomes possible to prohibit the learning when the vehicle weight is too influential, thereby avoiding improper learning.

Further, in the apparatus, the vehicle weight estimating means estimates the vehicle weight based on the input torques Tin1, 2 before and after the shifting and the change amount (ΔNC estimation value; more exactly, ΔNC1, 2) of the output rotational speed on a presumption that running resistance acting on the vehicle does not change during the shifting (S1404 to S1416, S1500, S1502, FIG. 21). With this, in addition to the above effects, the vehicle weight can be estimated without any influence of the running resistance and the gradient of road.

Fourth Embodiment

Next a control apparatus for an automatic transmission according to a fourth embodiment of this invention, more exactly, the operation thereof will be explained.

The explanation is made with focus on the points of difference from the foregoing embodiments. In the fourth embodiment, a calorific value of the hydraulic clutch Cn is calculated and when the calculated calorific value exceeds a threshold value, the learning value is corrected so that the engine torque decreases.

Figure 26:
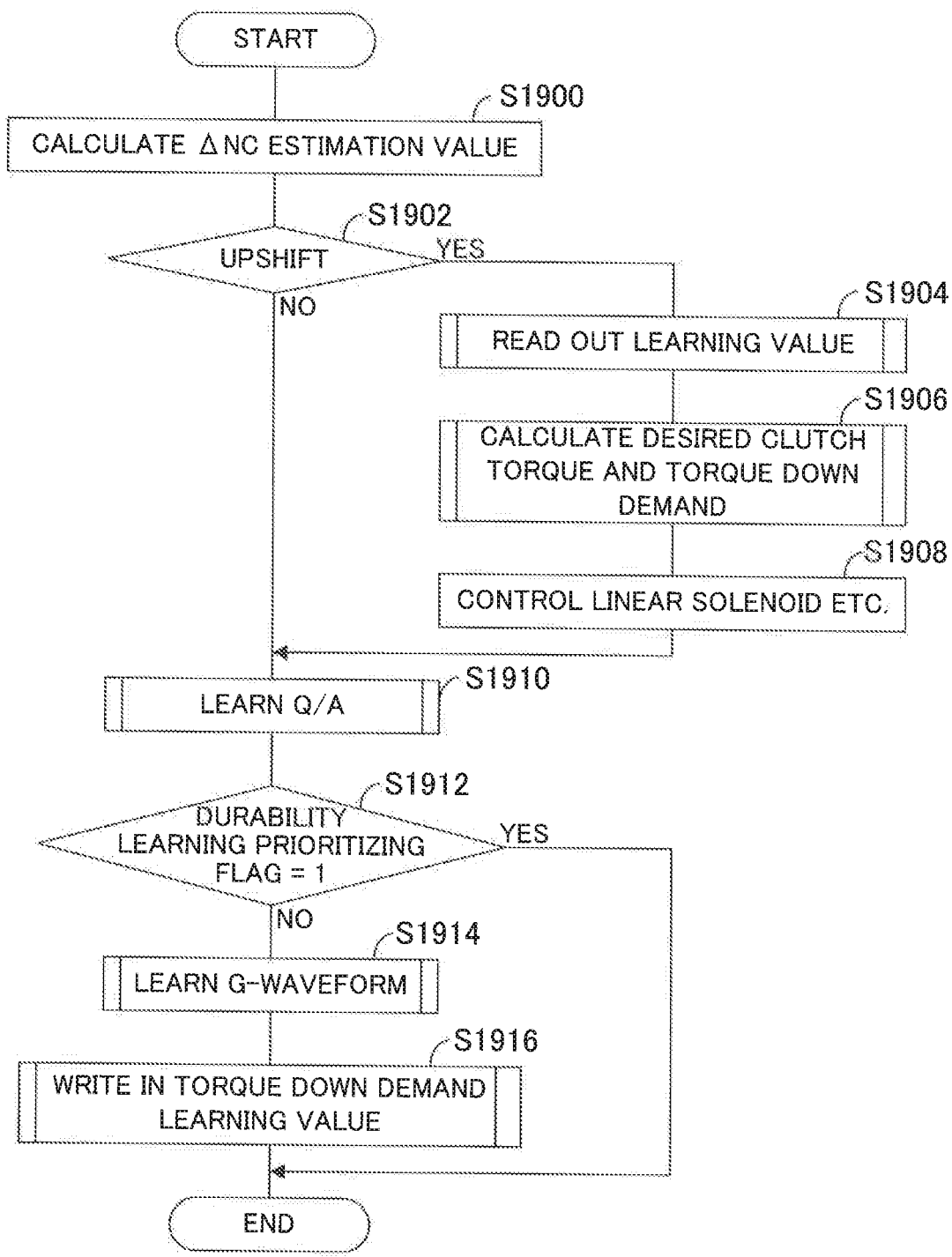
FIG. 26 is a subroutine flowchart showing the operation of a control apparatus for an automatic transmission according to a fourth embodiment of this invention.

FIG. 26 is a flowchart similar to FIG. 2, but showing the operation of a control apparatus for an automatic transmission according to the fourth embodiment.

The processing of S1900 to S1902 is conducted similarly to S10 to S12 of the FIG. 2 flowchart in the first embodiment. Then the program proceeds to S1904 in which the learning value is read out.

Figure 27:
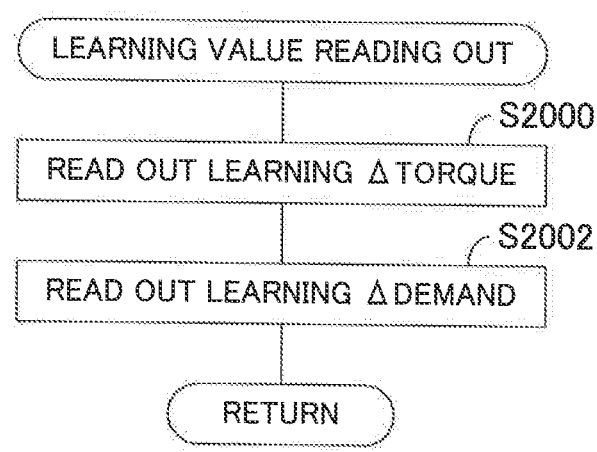
FIG. 27 is a subroutine flowchart showing a learning value read-out process of the FIG. 26 flowchart.

FIG. 27 is a subroutine flowchart showing the process. In S2000, the learning Δ torque is read out as explained in the first embodiment and in S2002, the learning Δ demand is read out as explained in the second embodiment.

Returning to the explanation on the FIG. 26 flowchart, the program proceeds to S1906 in which the desired clutch torque and torque down demand are calculated.

Figure 28:
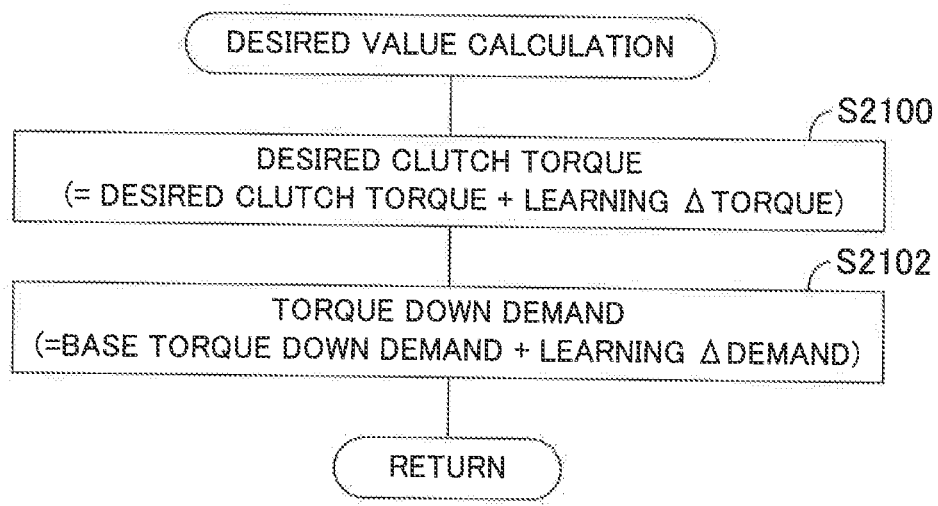
FIG. 28 is an explanatory view for explaining a process of calculating desired values such as a desired clutch torque, etc., of the FIG. 26 flowchart.

FIG. 28 is a subroutine flowchart showing the process. In S2100, the desired clutch torque is calculated. It is calculated by reading out the desired clutch torque and adding or subtracting the learning Δ torque read out in S2000 thereto or therefrom. Then the program proceeds to S2102 in which the torque down demand is calculated in the same manner as in the second embodiment.

Returning to the explanation on the FIG. 26 flowchart, after processing S1908, the program proceeds to S1910 in which a Q/A is learned. Also when the result in S1902 is negative, the program proceeds to the same step, i.e., S1910. The Q/A represents a calorific value Q/A of the hydraulic clutch Cn at shifting (i.e., a calorific value Q/A of the hydraulic clutch Cn for the desired gear) and it is learned in S1910.

Figure 29:
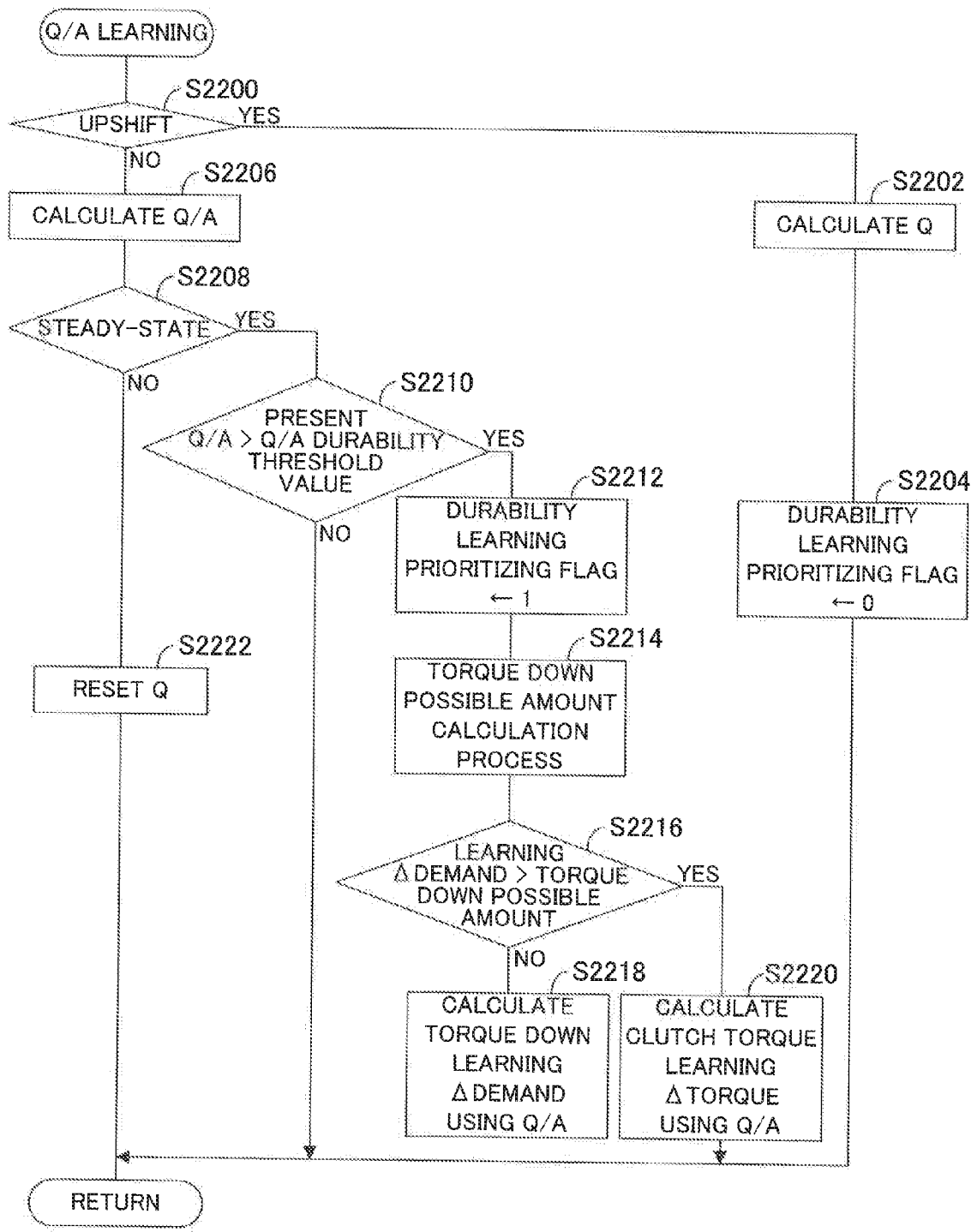
FIG. 29 is a subroutine flowchart showing a Q/A (calorific value) learning process of the FIG. 26 flowchart.

FIG. 29 is a subroutine flowchart showing the process.

In S2200, it is determined whether it is the upshift and when the result is affirmative, the program proceeds to S2202 in which energy Q generated due to clutch slippage at shifting is calculated.

Figure 30:
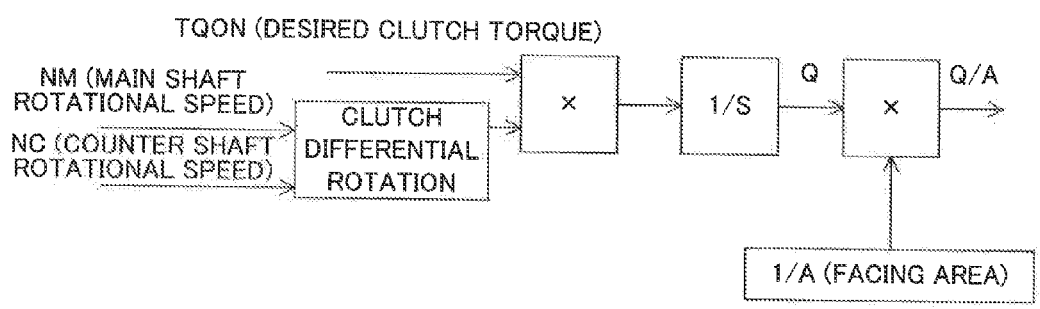
FIG. 30 is an explanatory view for explaining a process of calculating a Q/A (calorific value) of the FIG. 29 flowchart.

FIG. 30 is an explanatory view for explaining a process of calculating the calorific value Q/A. As illustrated, the energy Q is calculated by time-integrating a product obtained by multiplying a desired clutch torque TQON by a difference between the main shaft MS rotational speed NM and the countershaft CS rotational speed NC (clutch differential rotation).

Returning to the explanation on the FIG. 29 flowchart, the program proceeds to S2204 in which the bit of a durability learning prioritizing flag is reset to 0, whereafter the program is terminated. Thus, during the upshift, the foregoing process is executed at predetermined time intervals.

On the other hand, when the result in S2200 is negative and it is determined that the shifting has been completed, the program proceeds to S2206 in which the calorific value Q/A is calculated. Specifically, as shown in FIG. 30, the calculated energy Q is divided by a facing area of the concerned hydraulic clutch Cn to calculate the calorific value Q/A of the same hydraulic clutch Cn. The division using the facing area A may be carried out with every calculation in S2202.

Next the program proceeds to S2208 in which it is determined whether it is in the steady state after the upshift and when the result is affirmative, the program proceeds to S2210 in which it is determined whether the Q/A calculated at the latest shifting exceeds a Q/A durability threshold value. When the result in S2210 is negative, since it means that the concerned hydraulic clutch Cn has no problem, the remaining steps are skipped.

When the result in S2210 is affirmative, the program proceeds to S2212 in which the kit of the durability learning prioritizing flag is set to 1 and to S2214 in which a torque down possible amount is calculated by obtaining a difference between an engine torque down limit value and a present torque down value.

Before making the subsequent explanation on the FIG. 29 flowchart, the operation of the apparatus according to the fourth embodiment is explained with reference to FIG. 31. Since the durability of the hydraulic clutch Cn is not taken into consideration in conventional techniques and it is disadvantageous, this embodiment is configured so that the calorific value Q/A of the hydraulic clutch Cn at shifting is calculated and compared to the Q/A durability threshold value, and when it exceeds the threshold value, as shown in FIG. 31($a$), the learning $\Delta$ demand is decrementally corrected so as to decrease the torque of the engine E.

Consequently, as is clear from the GRATIO (indicating the shifting condition with the ratio of the input rotational speed NM to the output rotational speed NC of the transmission T. i.e., NC/NM), the shifting time is shortened so that the calorific value Q/A is decreased, thereby enabling to enhance the durability of the hydraulic clutch Cn.

On the other hand, since the decrease of torque of the engine E has its limit (torque down possible amount) that corresponds to, for example, a retard limit value applied in the case where the engine torque is decreased by regulating the ignition timing, when the learning $\Delta$ demand is equal to or less than the torque down possible amount (limit), the engine torque is decreased, while when the learning $\Delta$ demand exceeds it, the desired clutch torque, i.e., the learning $\Delta$ torque is incrementally corrected.

Figure 31:
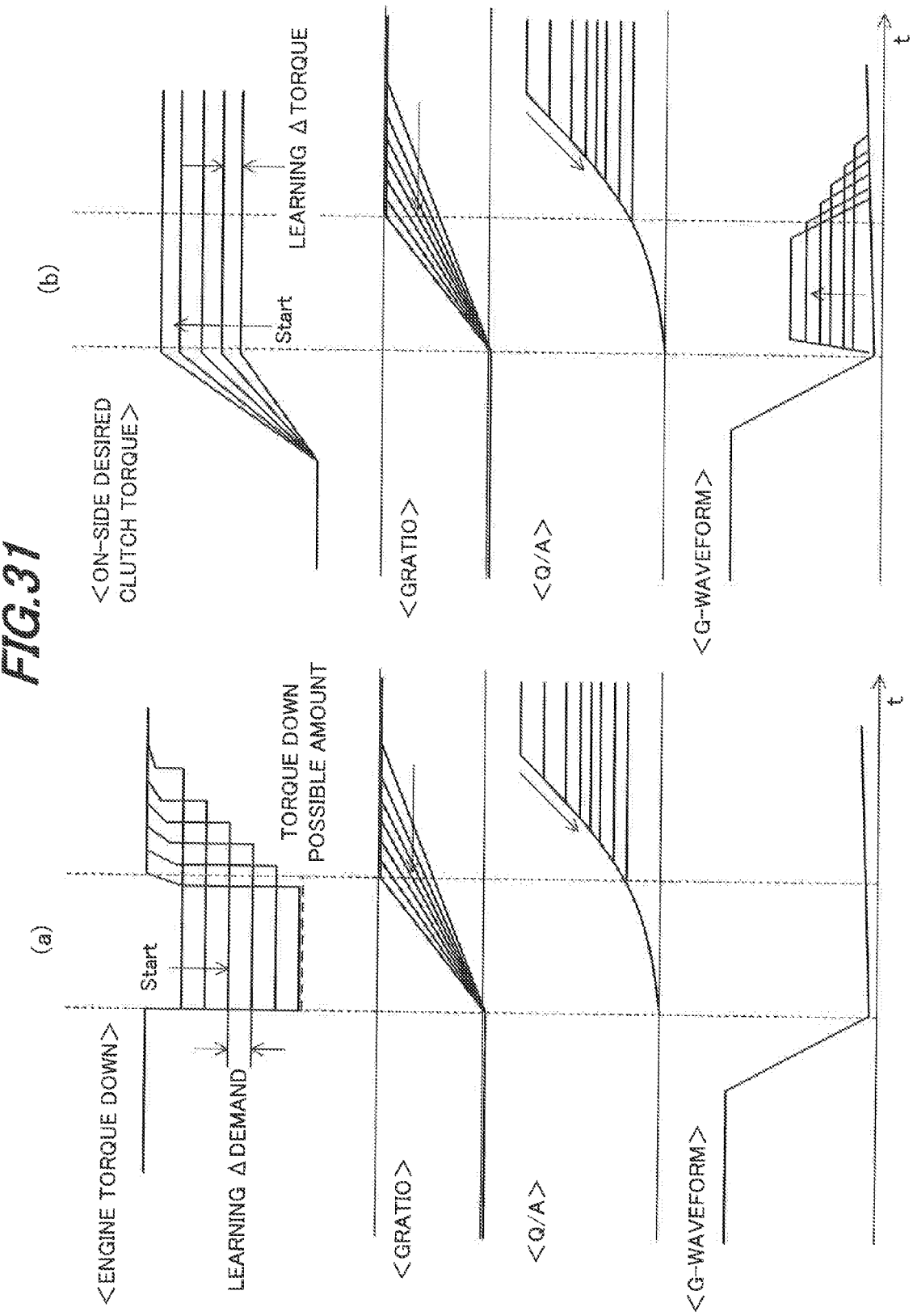
FIG. 31 is a time chart for explaining the operation of the apparatus according to the fourth embodiment shown in the FIG. 26 flowchart.

As a result, as shown in FIG. 31($b$), the gear ratio time depending on the GRATIO is shortened accordingly, so that the calorific value Q/A, is decreased, thereby enabling to enhance the durability of the hydraulic, clutch Cn.

Returning to the explanation on the FIG. 29 flowchart, the program proceeds to S2216 in which it is determined whether the learning $\Delta$ demand exceeds the torque down possible amount and when the result is negative, the program proceeds to S2218 in which the learning $\Delta$ demand is calculated. This calculation is made by decrementally correcting the learning $\Delta$ demand by a predetermined amount every time the result in S2216 is negative, as shown in FIG. 31($a$).

When the result in S2216 is affirmative, the program proceeds to S2220 in which the learning $\Delta$ torque is calculated. This calculation is made by incrementally correcting the learning $\Delta$ torque by a predetermined amount every time the result in S2216 is affirmative, as shown in FIG. 31($b$).

When the result in S2208 is negative, the program proceeds to S2222 in which the value of calculated energy Q is reset (to 0).

Returning to the FIG. 26 flowchart, the program proceeds to S1912 in which it is determined whether the bit of the durability learning prioritizing flag is 1. When the result in S1912 is affirmative, the remaining steps are skipped, while when the result is negative, the program proceeds to S1914 in which the G-waveform is learned in the same manner as in the first embodiment.

Then the program proceeds to S1916 in which the torque down demand learning value is written in, i.e., the learning $\Delta$ demand is calculated and written in. This processing is done in the same manner as that described with FIG. 16 in the second embodiment.

In the FIG. 26 flowchart, the step of S1908 corresponds to the processing to control the hydraulic pressure of the hydraulic clutch (frictional engaging element) Cn such that it becomes the desired clutch torque (desired value of transmission torque) that has been incrementally and decrementally corrected, and the processing to decrease the torque of the engine E such that it becomes the decrementally-corrected value.

Further, the operation to be conducted when the result in S1912 is negative, corresponds to the processing to calculate the learning value to be used for incrementally and decrementally correcting the desired clutch torque (desired value of transmission torque) of the hydraulic clutch (frictional engaging element) Cn so that the calculated difference (I phase initial G) falls within the predetermined range (that is defined by the threshold values).

In contrast, when the result in S1912 is affirmative, since the program skips S1914 and the remaining steps, only the process of the FIG. 29 flowchart is performed. This case corresponds to conducting a learning correction process (S1910, S2210 to S2220, S1904) to correct the learning $\Delta$ demand (learning value) so as to decrementally correct at least the engine torque, of the engine torque and the transmission torque, when the calculated calorific value Q/A (Q/A durability) of the hydraulic clutch Cn at shifting exceeds the threshold value.

The remaining configuration of the fourth embodiment is the same as those in the foregoing embodiments, so it is not illustrated.

As stated above, in the fourth embodiment, it is configured to have an apparatus (ECU 80) for controlling an automatic transmission T that changes speed of an output of an engine E mounted on a vehicle through a frictional engaging element (hydraulic clutch Cn), characterized by: input rotational speed detecting means (first rotational speed sensor 64, ECU 80) for detecting an input rotational speed NM of the automatic transmission; output rotational speed detecting means (second rotational speed sensor 66, ECU 80) for detecting an output rotational speed NC of the automatic transmission; output rotational speed change amount calculating means (S10, S1900) for calculating a change amount (ΔNC estimation value) of the output rotational speed; output rotational speed change amount average calculating means (S20, S308, S1914) for calculating an average (I phase initial average G) of the change amount of the output rotational speed over a predetermined period of an initial inertia (I) phase of shifting; vehicle acceleration average calculating means (S20, S312, S1914) for determining completion of the shifting based on a ratio (GRATIO) of the input rotational speed NM to the output rotational speed NC and calculating an average (after-shift average G) of a vehicle acceleration after the completion of the shifting based on the change amount of the output rotational speed, assuming that the change amount (ΔNC estimation value) of the output rotational speed indicates the vehicle acceleration G; difference calculating means (S20, S314, S1914) for calculating a difference (I phase initial G) between the average of the change amount of the output rotational speed and the average of the vehicle acceleration; learning value calculating means (S20, S316, S500 to S516, S1914) for calculating a learning value used for incrementally and decrementally correcting a desired value of transmission torque of the frictional engaging element such that the calculated difference falls within a predetermined range; incrementally and decrementally correcting means (S14 to S16, S1904 to S1906) for incrementally and decrementally correcting the desired value of the transmission torque of the frictional engaging element with the calculated learning value; hydraulic supply control means (S18, S1908) for controlling supply of hydraulic pressure to the frictional engaging element such that it becomes the corrected desired value of the transmission torque; calorific value calculating means (S1910, S2206) for calculating a calorific value Q/A of the frictional engaging element at the shifting; second learning value correcting means (S1910, S2210 to S2220, S1904) for correcting the learning value so as to decrementally correct at least the engine torque, of the engine torque and the transmission torque, when the calculated calorific value of the frictional engaging element at the shifting exceeds a threshold value; and engine torque decreasing means (S18, S1908) for decreasing the engine torque such that it becomes the decrementally-corrected engine torque. With this, similarly to the foregoing embodiments, since the vehicle acceleration at shifting is estimated and evaluated and based thereon, variance in the transmission torque of the hydraulic clutch (frictional engaging element) Cn, etc., is more accurately learned, it becomes possible to fully exploit the potential of the hydraulic clutch, thereby improving a feel given to the vehicle occupant(s) at shifting.

Meanwhile, when the calorific value Q/A of the hydraulic clutch Cn at shifting exceeds the threshold value, since at least the torque of the engine E, of the torque of the engine E and the transmission torque (desired clutch torque), is decrementally corrected, it becomes possible to enhance also the durability of the hydraulic clutch Cn.

Further, in the apparatus, the second learning value correcting means incrementally corrects the transmission torque when a correction amount of the decrementally-corrected engine torque (learning Δ demand) exceeds a limit value (torque down possible amount) (S2216, S2220). With this, in addition to the above effects, even when the engine torque is decrementally corrected by, for example, retarding the ignition timing, it does not damage the engine.

Further, in the apparatus, the second learning value correcting means decrementally corrects the engine torque when the shifting time exceeds the desired shifting time by the predetermined value or more (S1916, S1102 to S1108). With this, when the shifting time is likely to be increased due to the control for eliminating variation in the clutch torque by regulating the vehicle acceleration G at shifting, the engine torque is decreased, thereby converging the shifting time to the desired shifting time.

Fifth Embodiment

Next a control apparatus for an automatic transmission according to a fifth embodiment of this invention, more exactly, the operation thereof will be explained.

The explanation is made with focus on the points of difference from the foregoing embodiments. In the fifth embodiment, the learning value is calculated by correcting a basic learning value retrieved using the characteristics set with each lattice point of predetermined operation parameters with a correction coefficient calculated based on a value positioned other than the lattice points.

Figure 32:
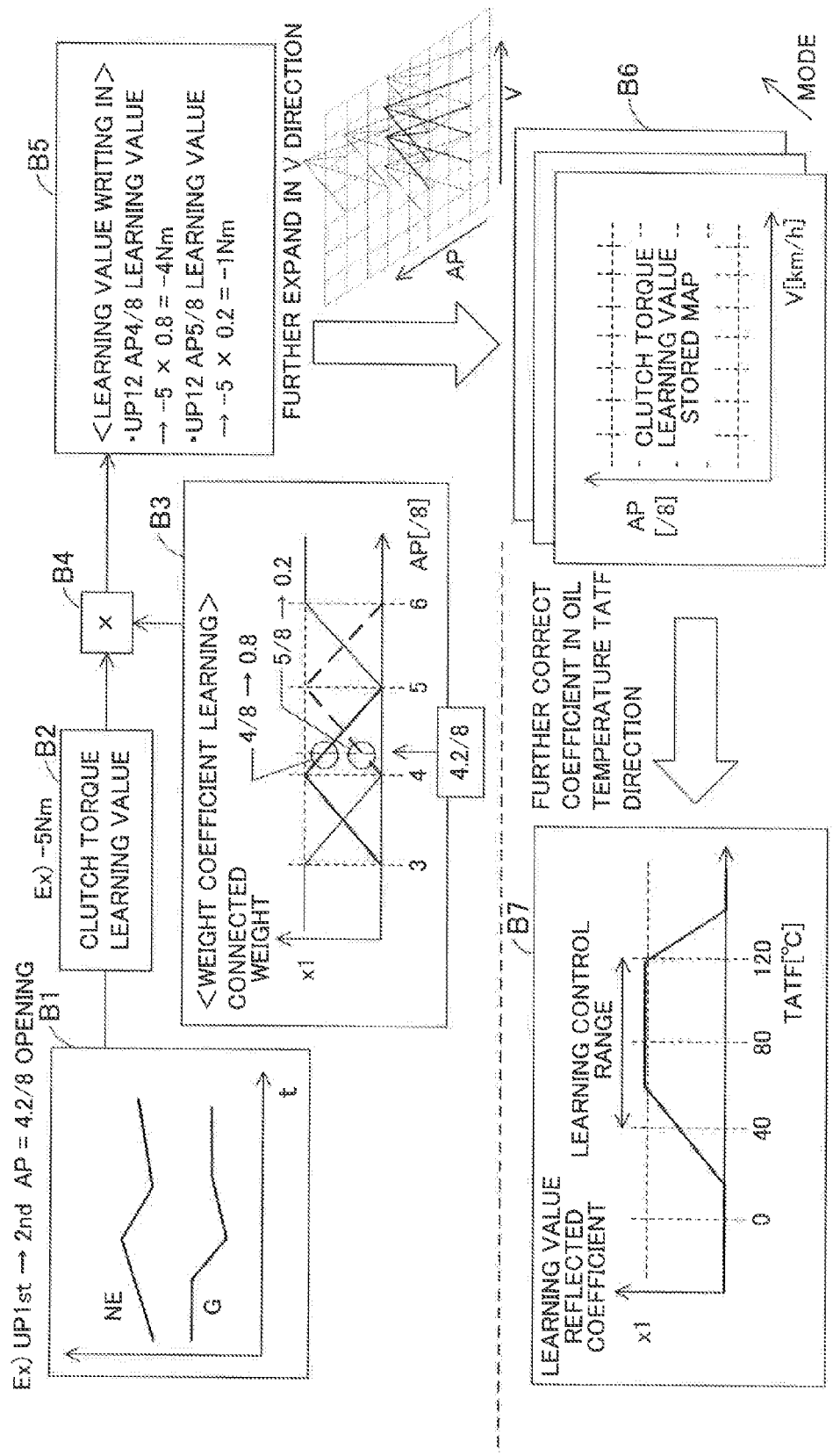
FIG. 32 is an explanatory view for explaining the operation of a control apparatus for an automatic transmission according to a fifth embodiment of this invention.

FIG. 32 is an explanatory view for explaining the operation of the apparatus according to the fifth embodiment, i.e., explaining a learning value calculation process thereof.

To be specific, in this process, as shown in FIG. 32, a torque (basic learning value) retrievably stored in the RAM 86 is retrieved using the operation parameters, i.e., the input torque of the transmission T, more exactly the accelerator opening AP and vehicle speed V, while the correction coefficient is calculated, and the retrieved value is incrementally and decrementally corrected with the calculated correction coefficient to calculate the learning value.

More specifically, the torque (basic learning value) retrieved using the characteristics set with each lattice point (indicated by Ln in FIG. 33) of the predetermined operation parameters containing the accelerator opening AP (the input torque of the transmission T) and the vehicle speed V is corrected with the correction efficient that is calculated based on a value positioned other than the lattice points of the same operation parameters so that the calculated I phase initial average G (difference) falls within the predetermined range (that is defined by the threshold values in the processing similar to that of S504 and S510), thereby calculating the learning value.

It should be noted that, although the accelerator opening AP is used instead of the transmission torque of the hydraulic clutch Cn as the operation parameter in the fifth embodiment, since the accelerator opening AP indicates the transmission torque of the hydraulic clutch Cn, they are substantially equivalent.

Explaining this in detail, when the gear position is shifted up from the first to second and the detected accelerator opening AP is 4.2/8 (assuming that the full-open position is 8) or thereabout as illustrated by B1 in FIG. 32, the clutch torque (basic learning value) retrieved in B2 is multiplied in B4 by a learning weight coefficient (correction coefficient) calculated in B3, and in B5, the thus-obtained learning value is written in.

Next, the vehicle speed V is also processed in the same manner and in B6, the obtained value is stored in a shifting shock clutch torque learning value storage map. Then in B7, a coefficient with respect to the oil temperature TATF is also calculated and the learning value is corrected with the calculated coefficient.

Figure 33:
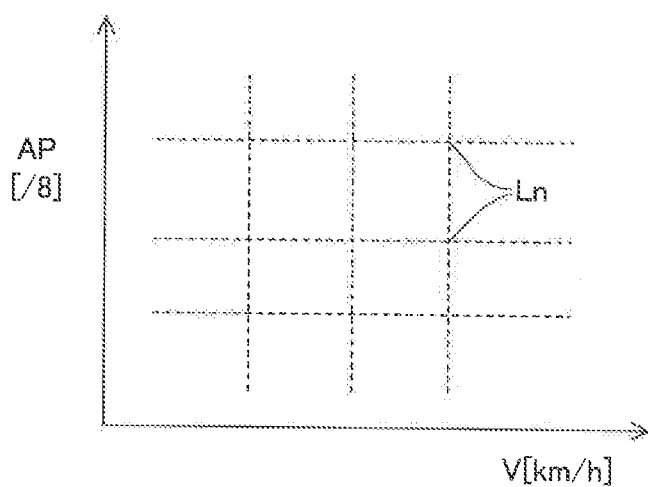
FIG. 33 is an explanatory view showing the characteristics of a learning value map used in the fifth embodiment (i.e., used in a process similar to the learning value write-in process of the FIG. 7 flowchart in the first embodiment), which is explained with FIG. 32.

In FIG. 32, the value (basic learning value) obtained in B2 is obtained by retrieving the characteristics shown in FIG. 33 and, as shown in B3, the characteristics are values set with respect to the accelerator opening AP (operation parameter) with the respective lattice points arranged at predetermined intervals, like . . . 3/8, 4/8, 5/8, 6/8, and so on. The value in B2 is one retrieved from the lattice point 3/8.

In the meantime, the detected value is not necessarily a value on one of the lattice points but often a value positioned somewhere between adjacent lattice points. In this case, if the value is simply interpolated, consequently a difference between the value and a learning value calculated based on a value positioned at one of the lattice points may cause an uncomfortable feel given to the operator, thereby increasing the shock at shifting.

To deal with it, this embodiment is configured such that the accelerator opening AP is set with a weight function that is given against change in the input torque and rotational difference, i.e., is determined taking into account, for example, the characteristics of variance in the hydraulic clutch transmission torque, etc., so as to calculate the correction coefficient. As illustrated, the weight function is composed of two kinds of triangular-shaped functions having the characteristics that a sum of values along the vertical axis is always 1.0.

Here, the above "taking into account the characteristics of variance" means that, when learning value correction is set for each lattice point based on a result of learning between adjacent lattices, the influence of a fact that conditions at the time the accelerator opening AP is actually measured are different is considered.

In the case where the detected accelerator opening AP is 4.2/8, correction coefficients obtained with respect to the two kinds of functions are going to be 0.8 and 0.2 when applied with the simple interpolation. The learning values (learning Δ torques) obtained by multiplying those correction coefficients by the basic learning value (−5 Nm) are going to be −4 Nm and −1 Nm. Note that, when taking the above-mentioned influence into account, the correction coefficients are to be set at positions that are slightly shifted from 0.8 and 0.2 (in this case, the sum is not going to be 1.0).

In B6, a result of the similar processing conducted with the vehicle speed V is stored. The characteristics shown in B6 are obtained by adding or subtracting the characteristics shown in FIG. 33 through the processing of S506 or S512 and enlarged between adjacent lattice points with respect to the accelerator opening AP and vehicle speed V. The characteristics shown in FIG. 33 and B6 are set for each hydraulic clutch Cn of the desired gear, i.e., for each gear MODE.

Next, in B7, when the oil temperature TATF is within a learning control range, a learning value reflected coefficient is obtained in accordance with the detected oil temperature TATF and the learning values (learning Δ torques) retrieved from the characteristics of B6 are multiplied by the obtained coefficient to be corrected.

The operation in the fifth embodiment is explained with reference to FIG. 32. Similarly to S506 and S512 of the FIG. 9 flowchart in the first embodiment, a value is calculated by retrieving mapped values in the map of B6 (more precisely, values corrected in B7) using the detected operation parameters (i.e., the accelerator opening AP and vehicle speed V) and written in the map shown in FIG. 33.

The remaining configuration of the fifth embodiment is the same as those in the foregoing embodiments, so it is not illustrated.

As stated above, in the fifth embodiment, it is configured to have an apparatus (ECU 80) for controlling an automatic transmission T that changes speed of an output of an engine E mounted on a vehicle through a frictional engaging element (hydraulic clutch Cn), characterized by: input rotational speed detecting means (first rotational speed sensor 64, ECU 80) for detecting an input rotational speed NM of the automatic transmission; output rotational speed detecting means (second rotational speed sensor 66, ECU 80) for detecting an output rotational speed NC of the automatic transmission; output rotational speed change amount calculating means (S10) for calculating a change amount (ΔNC estimation value) of the output rotational speed; output rotational speed change amount average calculating means (S20, S308) for calculating an average (I phase initial average G) of the change amount of the output rotational speed over a predetermined period of an initial inertia (I) phase of shifting; vehicle acceleration average calculating means (S20, S312) for determining completion of the shifting based on a ratio (GRATIO) of the input rotational speed NM to the output rotational speed NC and calculating an average (after-shift average G) of a vehicle acceleration after the completion of the shifting based on the change amount of the output rotational speed, assuming that the change amount (ΔNC estimation value) of the output rotational speed indicates the vehicle acceleration G; difference calculating means (S20, S314) for calculating a difference (I phase initial G) between the average of the change amount of the output rotational speed and the average of the vehicle acceleration; learning value calculating means (S20, S316, S500 to S516) for calculating a learning value used for incrementally and decrementally correcting a desired value of transmission torque of the frictional engaging element such that the calculated difference falls within a predetermined range; incrementally and decrementally correcting means (S14 to S16) for incrementally and decrementally correcting the desired value of the transmission torque of the frictional engaging element with the calculated learning value; and hydraulic supply control means (S18) for controlling supply of hydraulic pressure to the frictional engaging element such that it becomes the corrected desired value of the transmission torque, wherein the learning value calculating means calculates the learning value by correcting a basic learning value retrieved from characteristics set with each lattice point (Ln of FIG. 33) of a predetermined operation parameter (the input torque of the transmission T (accelerator opening AP) and the vehicle speed V) with a correction coefficient calculated based on a value positioned other than the lattice points of the predetermined parameter (B2 to B6). With this, similarly to the foregoing embodiments, since the vehicle acceleration at shifting is estimated and evaluated and variance in the transmission torque of the hydraulic clutch (frictional engaging element) Cn, etc., is learned based thereon, it becomes possible to fully exploit the potential of the hydraulic clutch Cn, thereby optimizing a feel given to the vehicle occupant(s) at shifting within a short period of time.

Further, the learning value is calculated by correcting the basic learning value retrieved from the characteristics set for each lattice point of the predetermined operation parameters by the correction coefficient calculated based on a value positioned other than the lattice points of the operation parameters. With this, even when a value specified by the operation parameters is positioned other than the lattice points, a difference in the learning value between such a case and a case where a specified value is positioned at one of the lattice points will not cause an uncomfortable feel to the operator, thereby optimizing a feel at shifting within a short period of time.

FIG. 34 is a set of time charts showing waveform evaluation learning of I phase initial stage. FIG. 34(a) shows a case where the process in this embodiment is not performed, while FIG. 34(b) shows a case where it is performed. As is clear from the comparison, whereas an offset variability causes shifting shock in FIG. 34(a), the offset variability is absorbed due to the waveform evaluation learning of I phase initial stage so that the shifting shock is mitigated in FIG. 34(b).

Thus, since the vehicle acceleration G at shifting is estimated and evaluated from the ΔNC estimation value and based thereon, variance in the transmission torque of the frictional engaging element and the like are learned, it becomes possible to fully exploit the potential of the frictional engaging element, etc., thereby improving a feel given to the vehicle occupant(s) at shifting.

Further, in the apparatus, the learning value calculating means calculates the correction coefficient based on a result of comparison of the calculated difference with a threshold value (B2 to B6). With this, in addition to the above effects, due to the appropriately-set threshold value, the calculated difference can reliably fall within the predetermined range.

Further, in the apparatus, the learning value calculating means corrects the correction coefficient using a temperature of operating oil (oil temperature TATF) (B7). With this, since the oil temperature TATF is also taken into account, in addition to the above effects, the learning value can be calculated more appropriately.

It should be noted that, in the foregoing, the accelerator opening AP is employed as the input torque of the transmission T to be used as the operation parameter, the throttle opening TH or the transmission torque of the hydraulic clutch Cn can instead be applied. The vehicle speed V also can be replaced by a rotational speed of another component, e.g., the output rotational speed of the transmission T.

It should also be noted that although the triangular-shaped weight function is used as the correction coefficient, a sigmoid function or the like can be utilized instead.

Sixth Embodiment

Next a control apparatus for an automatic transmission according to a sixth embodiment of this invention, more exactly, the operation thereof will be explained.

The explanation is made with focus on the points of difference from the foregoing embodiments. In the sixth embodiment, an operation elapsed time of the transmission T is estimated and a learning value is replaced in accordance with the estimated operation elapsed time.

Figure 35:
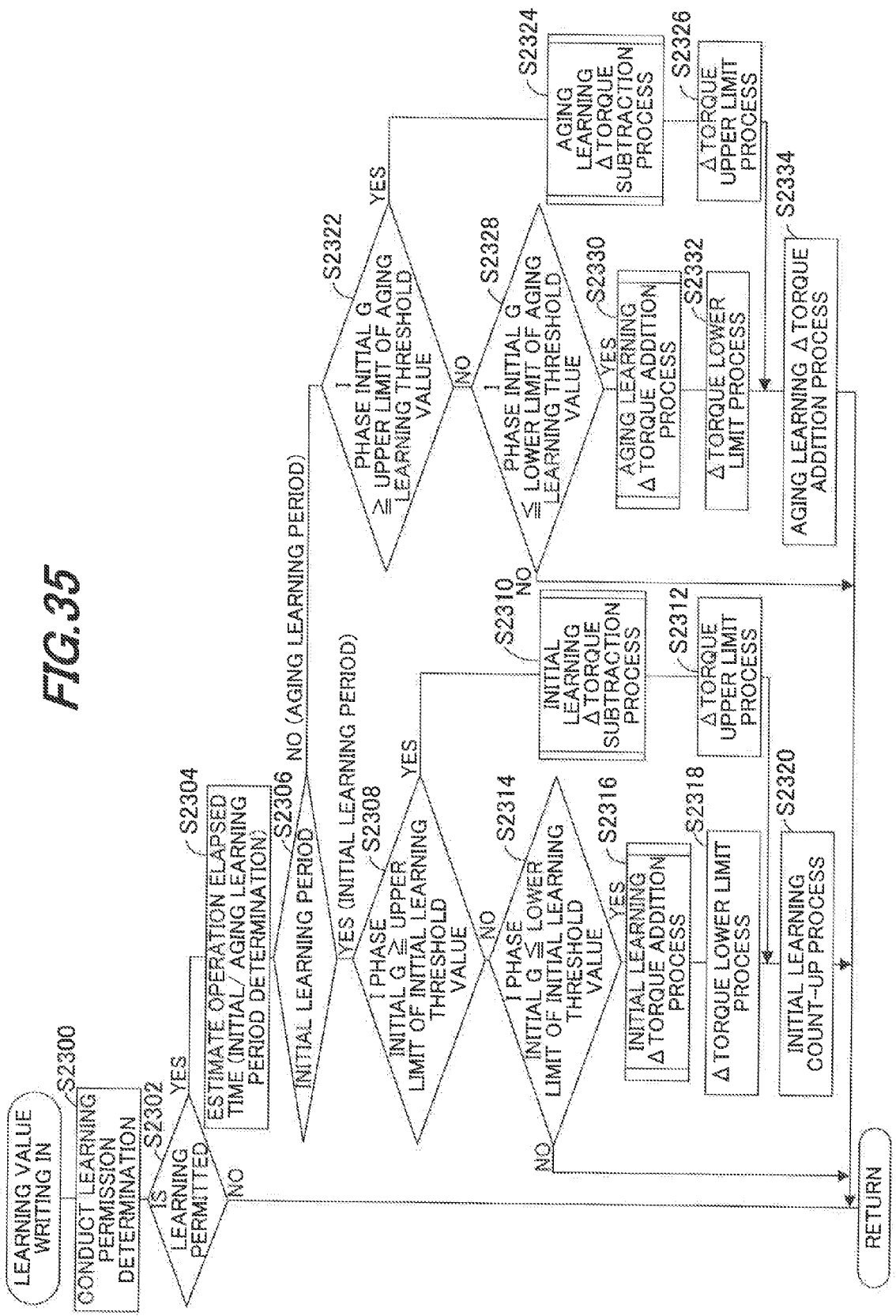
FIG. 35 is a subroutine flowchart showing the operation of a control apparatus for an automatic transmission according to a sixth embodiment of this invention, i.e., showing a learning value write-in process similar to FIG. 9 in the first embodiment.

FIG. 35 is a subroutine flowchart similarly to FIG. 9 in the first embodiment, but showing the operation of the apparatus according to the sixth embodiment.

Explaining this, in S2300, the learning permission determination is conducted in the same manner as in the first embodiment. The program proceeds to S2302 in which based on the determination in S2300, it is determined whether the learning is permitted and when the result is affirmative, the program proceeds to S2304 in which the operation elapsed time (total operation time of the transmission T) is estimated, which will be explained later.

Next the program proceeds to S2306 in which the estimated operation elapsed time is compared with an appropriately-set prescribed value to check as to whether the operation elapsed time is in an initial learning period (break-in period) (or in an aging learning period (a period in which age deterioration is starting) after that).

Figure 36:
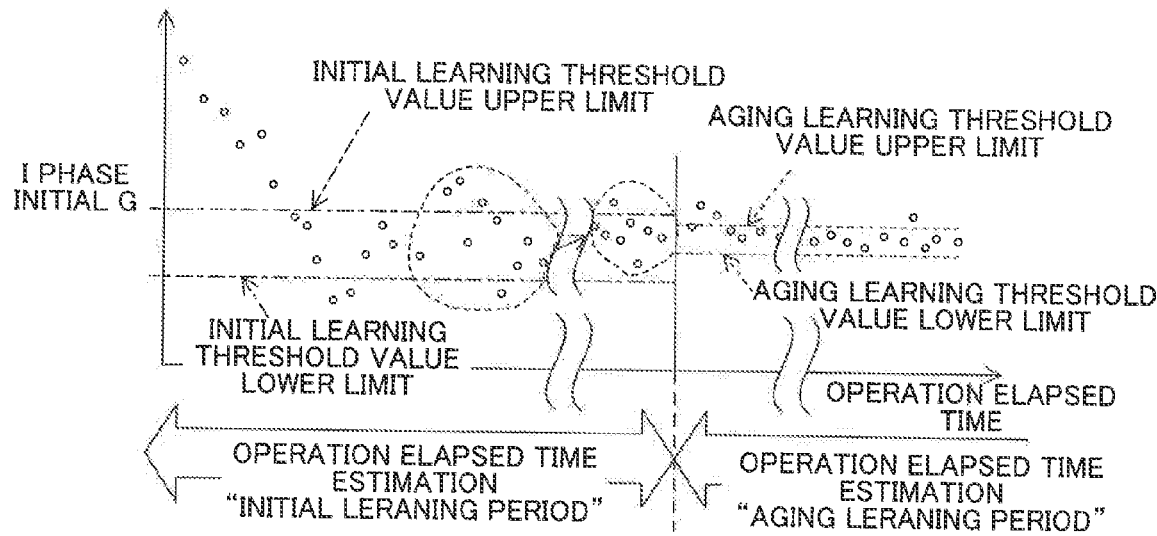
FIG. 36 is an explanatory view showing the characteristics of threshold values used in the FIG. 35 flowchart.

When the estimated operation elapsed time is less than the prescribed value, the result in S2306 is affirmative and the program proceeds to S2308 in which the I phase initial G is compared with an upper limit value of an initial learning threshold value (convergence threshold value). FIG. 36 is an explanatory view for explaining it.

As illustrated, the upper limit value (and a lower limit value explained later) of the threshold value is differentiated depending on the operation elapsed time. More specifically, a width of the threshold value (defined by the upper and lower limit values) is set relatively large when the operation elapsed time is short, which is indicated by the "initial learning threshold value," whilst it is set relatively small when the operation elapsed time is long, which is indicated by an "aging learning threshold value."

To be more specific, the initial learning threshold value is used for correcting the manufacturing variance (variance that arises in manufacturing processes). The product size tolerance of the hydraulic clutch Cn before shipping is set with a large margin so as to prevent the revving of the engine speed or lack of torque at shifting. Also, since the characteristics of the hydraulic clutch Cn, etc., are not fully stabilized during the early stage, a property to follow a desired control value in this stage is less satisfactory than that in a stable stage that comes after the early stage.

A learning correction amount (subtracting or adding amount) per one learning is obtained by dividing the size tolerance by a desired number of convergences similarly to the first embodiment, and at the same time, is set relatively large for the above reasons. Therefore, in order to avoid divergence in this case, the width of the threshold value defined by the upper and lower limit values is set relatively large.

In contrast, since the aging learning threshold value is used for correcting values in an aging learning period in the stable stage, the learning correction amount per one learning is calculated to be relatively small to achieve the stable and accurate correction. Therefore, the width between the upper and lower limit values of the threshold value is set relatively small accordingly.

Owing to the above configuration, variance can be appropriately absorbed in accordance with the operation elapsed time of the transmission T, i.e., depending on whether the variance is attributed to the manufacturing variance arose in manufacturing processes or age deterioration.

In the FIG. 35 flowchart, the program proceeds to S2308 in which it is determined whether the I phase initial G is equal to or greater than the upper limit value of the initial learning threshold value and when the result is affirmative, the program proceeds to S2310 in which an initial learning Δ torque subtraction process is conducted, i.e., the learning Δ torque used for decrementally correcting the desired clutch torque is calculated.

Figure 37:
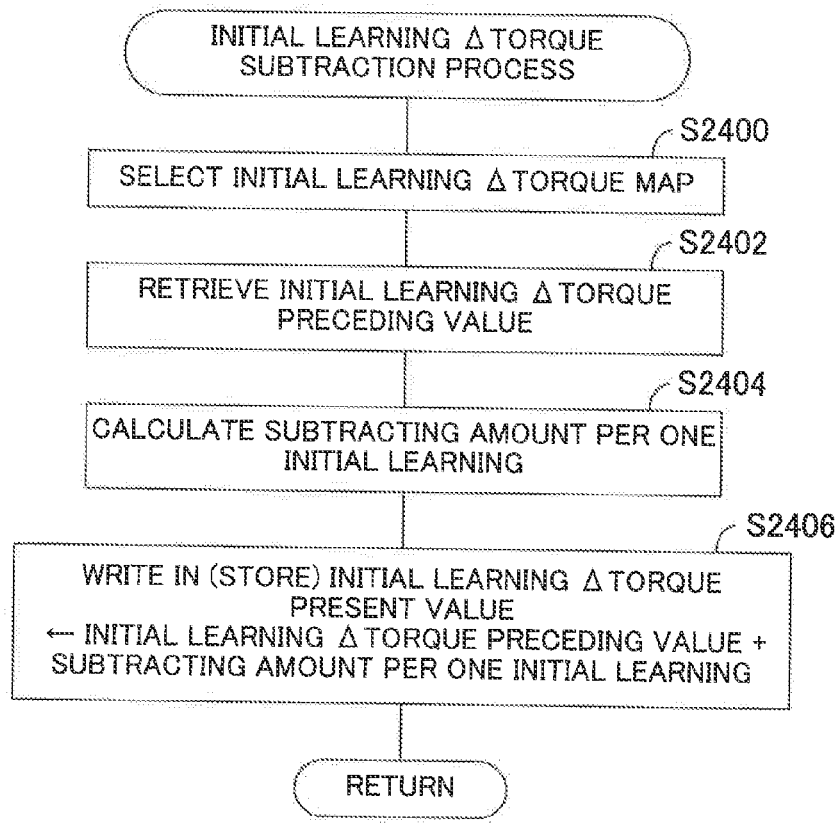
FIG. 37 is a subroutine flowchart showing an initial learning Δ torque subtraction process of the FIG. 35 flowchart.

FIG. 37 is a subroutine flowchart showing the process.

Figure 38:
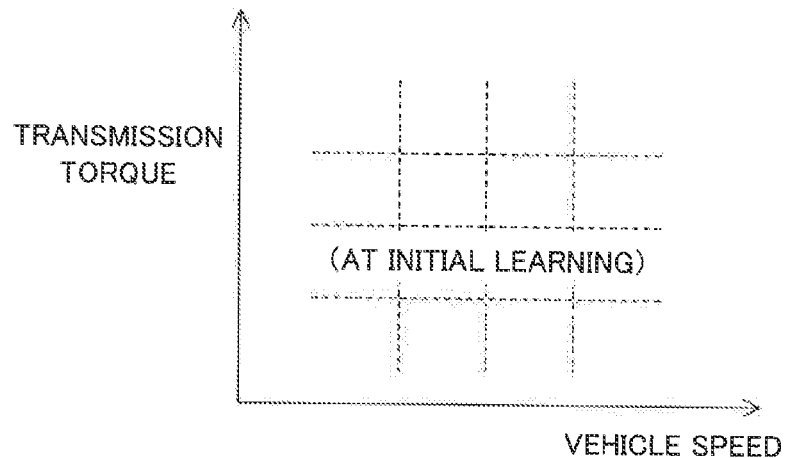
FIG. 38 is an explanatory view showing the characteristics of an initial learning Δ torque map used in the FIG. 37 flowchart.

First, in S2400, an initial learning Δ torque map corresponding to the desired gear is selected. FIG. 38 is an explanatory view for explaining the characteristics of the map. The map like this is prepared in the RAM 86 separately for each gear position.

Since the processing here similar to S14 of the FIG. 2 flowchart in the first embodiment is performed by reading out a value (learning Δ torque) written in the map (and an aging learning Δ torque map explained later), also when the write-in process that is the preprocessing of S14 is conducted, one of the prepared maps corresponding to the desired gear is selected.

Next the program proceeds to S2402 in which a preceding value of an initial learning Δ torque is retrieved and to S2404 in which a subtracting amount per one initial learning is calculated. As mentioned above, the subtracting amount per one learning in the initial learning period is calculated to be relatively large.

Next the program proceeds to S2406 in which the subtracting amount per one learning is added to the preceding value to calculate an initial learning Δ torque present value. At the same time, the transmission torque is calculated and the vehicle speed V is detected. The calculated present value is written (stored) in an appropriate area associated with a lattice point specified by the obtained transmission torque and vehicle speed V.

On the other hand, when the result in S2308 is negative in the FIG. 35 flowchart, the program proceeds to S2314 in which it is determined whether the I phase initial G is equal to or less than the lower limit value of the initial learning threshold value. When the result in S2314 is affirmative, the program proceeds to S2316 in which an initial learning Δ torque addition process is conducted, i.e., the learning Δ torque used for incrementally correcting the desired clutch torque is calculated.

Figure 39:
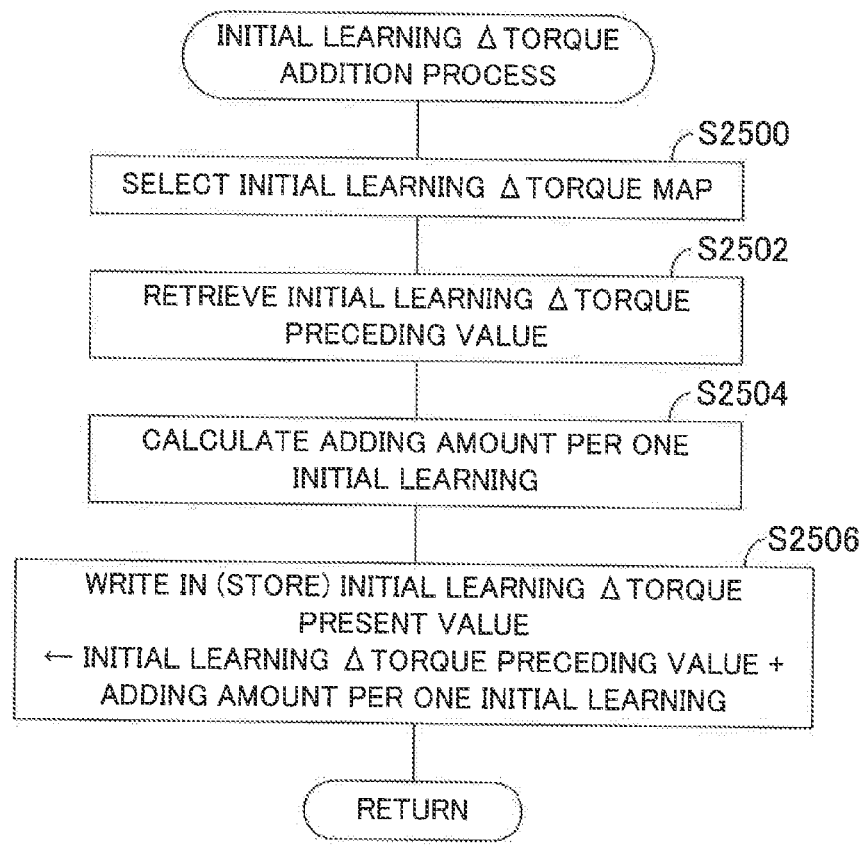
FIG. 39 is a subroutine flowchart showing an initial learning Δ torque addition process of the FIG. 35 flowchart.

FIG. 39 is a subroutine flowchart showing the process.

In S2500, the aforementioned initial learning Δ torque map corresponding to the desired gear is selected. The program proceeds to S2502 in which a preceding value of the initial learning Δ torque is retrieved similarly to S600 in FIG. 10, to S2504 in which an adding amount per one initial learning is calculated, and to S2506 in which the initial learning Δ torque present value is calculated. At the same time, the transmission torque is calculated and the vehicle speed V is detected. The calculated present value is written (stored) in an appropriate area associated with a lattice point specified by the obtained transmission torque and vehicle speed V.

Returning to the explanation on the FIG. 35 flowchart, the program proceeds to S2312 or S2318 in which, when the calculated present value is greater than the upper limit value or less than the lower limit value, a process to make the value fall within a range between the upper and lower limit values is conducted. Then the program proceeds to S2320 in which the learning count up process is conducted.

When the result in S2306 is negative, the program proceeds to S2322 in which it is determined whether the I phase initial G is equal to or greater than the upper limit value of the aging learning threshold value and when the result is affirmative, the program proceeds to S2324 in which an aging learning Δ torque subtraction process is conducted, i.e., the learning Δ torque used for decrementally correcting the desired clutch torque is calculated.

Figure 40:
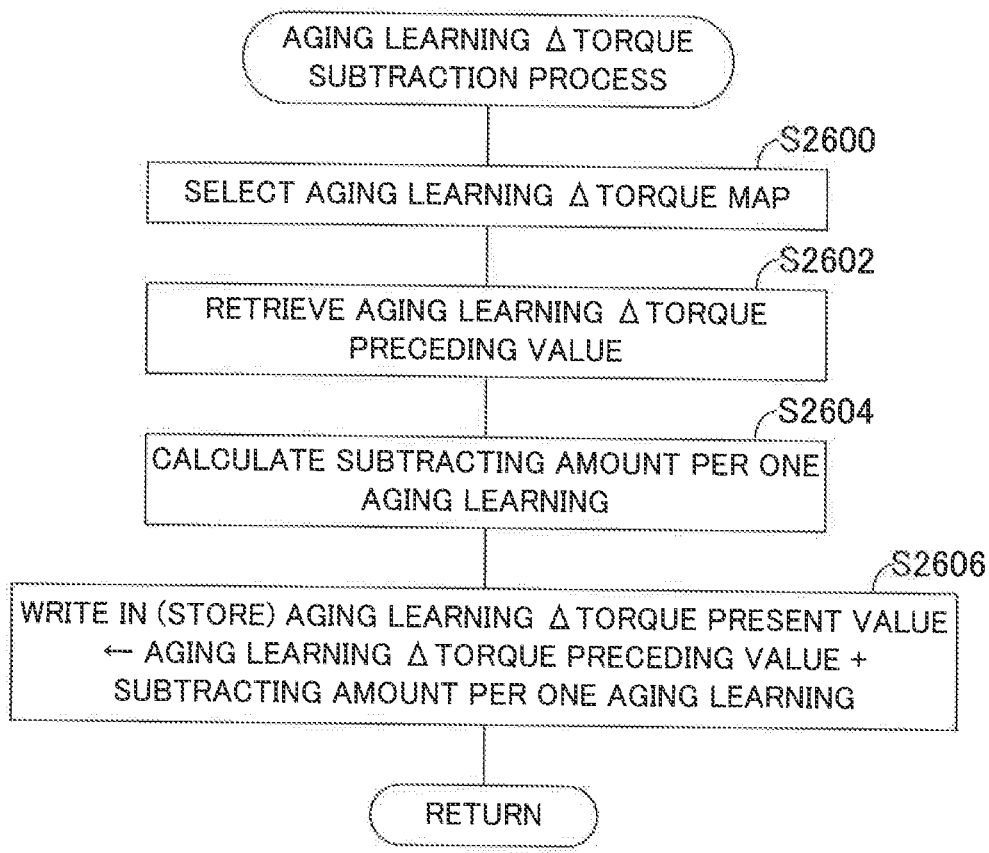
FIG. 40 is a subroutine flowchart showing an aging learning Δ torque subtraction process of the FIG. 35 flowchart.

FIG. 40 is a subroutine flowchart showing the process.

Figure 41:
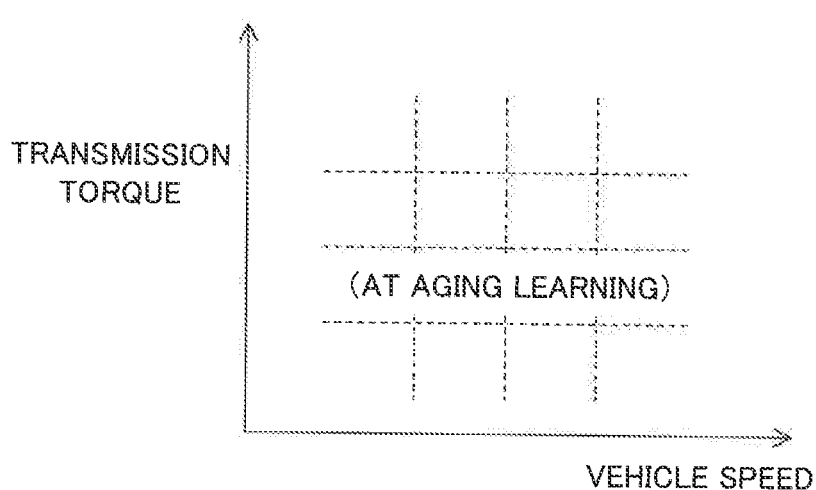
FIG. 41 is an explanatory view showing the characteristics of an aging learning Δ torque map used in the FIG. 40 flowchart.

In S2600, the aging learning Δ torque map corresponding to the desired gear is selected. FIG. 41 is an explanatory view for explaining the characteristics of the map. Similarly to the initial learning Δ torque map, the map like this is prepared in the RAM 86 separately for each gear position.

Next the program proceeds to S2602 in which a preceding value of an aging learning Δ torque is retrieved and to S2604 in which a subtracting amount per one aging learning is calculated. As mentioned above, the subtracting amount per one learning in the aging learning period is calculated to be smaller than that calculated in the initial learning period.

Next the program proceeds to S2606 in which the subtracting amount per one learning is added to the preceding value to calculate an aging learning Δ torque present value and the calculated present value is written (stored) in an appropriate area associated with a lattice point specified by the transmission torque and vehicle speed V.

On the other hand, when the result in S2322 is negative in the FIG. 35 flowchart, the program proceeds to S2328 in which it is determined whether the I phase initial G is equal to or less than the lower limit value of the aging learning threshold value and when the result is affirmative, the program proceeds to S2330 in which an aging learning Δ torque addition process is conducted, i.e., the learning Δ torque used for incrementally correcting, the desired clutch torque is calculated.

Figure 42:
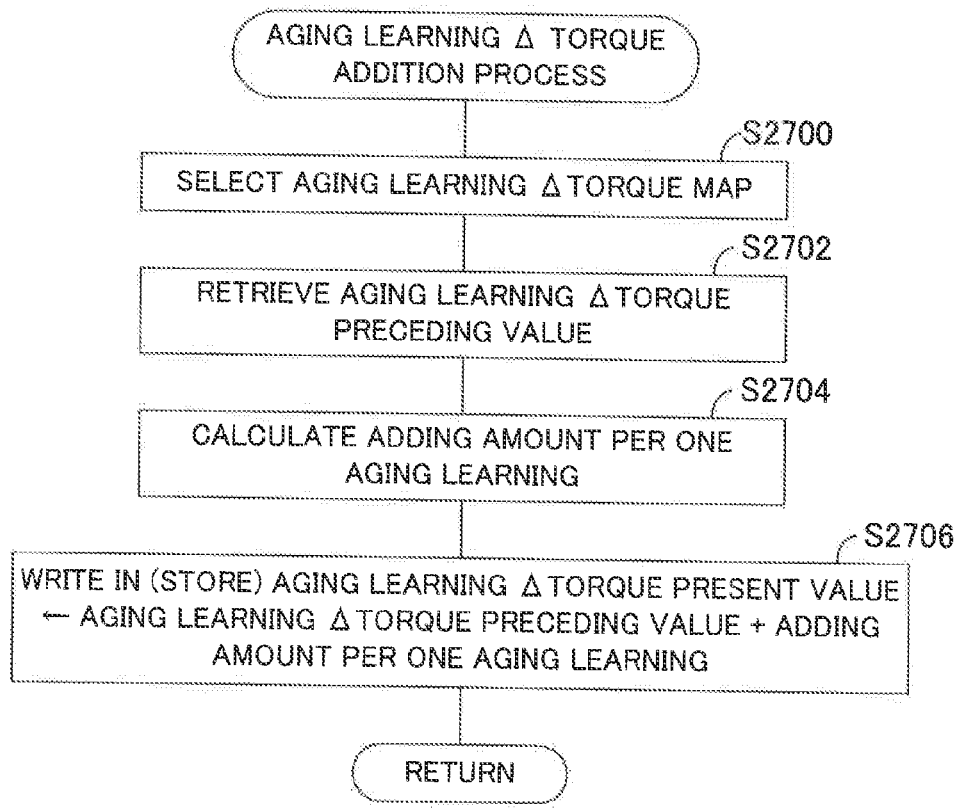
FIG. 42 is a subroutine flowchart showing an aging learning Δ torque addition process of the FIG. 35 flowchart.

FIG. 42 is a subroutine flowchart showing the process.

In S2700, the aforementioned aging learning Δ torque map corresponding to the desired gear is selected. The program proceeds to S2702 in which a preceding value of the aging learning Δ torque is retrieved similarly to S2502 in FIG. 39, to S2704 in which an adding amount per one aging learning is calculated similarly to S2504 in FIG. 39, and to S2706 in which the aging learning Δ torque present value is calculated. The calculated present value is written (stored) in an appropriate area associated with a lattice point specified by the transmission torque and vehicle speed V.

Subsequently, in the FIG. 35 flowchart, the program proceeds to S2326 or S2332 in which the limit process is conducted, and to S2334 in which the learning count up process is conducted in the same manner as in S2320.

Here, the explanation on estimation of the operation elapsed time in S2304 will be explained. It is estimated based on results of comparison of the I phase initial G with the upper and lower limit values of the initial learning threshold value and aging learning threshold value in S2308, S2314, S2322 and S2328.

More exactly, based on the number of times the I phase initial G is determined to be greater than the upper limit value of the threshold value in S2308 or S2322 or the number of times it is determined to be less than the lower limit value thereof in S2314 or S2328, in other words, based on the number of times counted in S2320 or S2334, the operation elapsed time of the transmission T is estimated.

Further, as indicated by an arrow in FIG. 36, based on a direction and amount of change of an average of statistical distribution of the I phase initial G, the operation elapsed time of the transmission T is estimated. Specifically, a direction indicating age deterioration (i.e., when the I phase initial G distribution exhibits change in this direction, it means age deterioration) is experimentally obtained beforehand and when a trend of change in that direction is seen, the operation elapsed time is estimated to be long.

Further, at least one of a total driving time and total driving distance of the vehicle on which the transmission T is mounted is calculated through a suitable method and based on the result, the operation elapsed time can be estimated.

Further, the operating condition of the vehicle on which the transmission T is mounted, the operation load condition (e.g., absorbed energy, oil temperature TATF) of each hydraulic clutch Cn or another parameter may be used to estimate the operation elapsed time.

Also a fact that the hydraulic clutch Cn or operating oil ATF is replaced is detected through a suitable method and based on the result, the operation elapsed time could be adjusted or reset.

Figure 43:
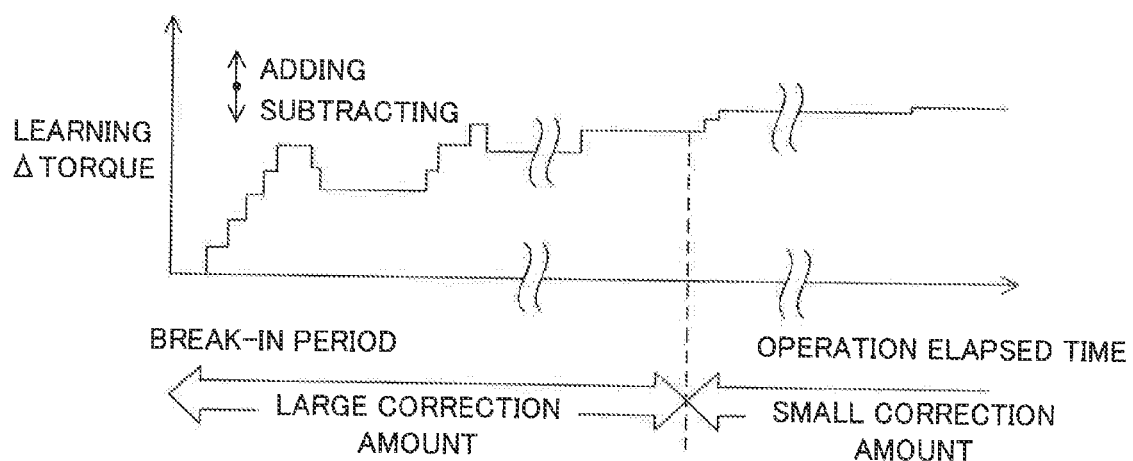
FIG. 43 is a time chart for explaining a learning correction of the FIG. 35 flowchart.

The aforementioned learning correction is again explained with reference to FIG. 43. For instance, as mentioned above, it is preferable to converge the control amount of the hydraulic clutch Cn to a desired value quickly when the operation elapsed time of the transmission T is short, and converge the control amount to the desired value slowly when it is long.

For the above intention, this embodiment is configured to replace the learning Δ torque (correction amount) in accordance with the operation elapsed time. As a result, it becomes possible to increase the learning Δ torque in the case of short operation elapsed time and consequently, the operation to correct the control amount of the hydraulic clutch Cn so that the I phase initial G falls within the predetermined range can be speeded up, while the learning Δ torque can be held or kept without change when needed.

More specifically, when the operation elapsed time is short, the manufacturing variance (variance that arises in manufacturing processes) in the hydraulic clutch Cn, i.e., the variance in clutch disk μ characteristics, characteristics of the relationship between the linear solenoid SLn and clutch hydraulic pressure, etc., is large and accordingly, it is preferable to converge the variance earlier. Since this embodiment is configured as mentioned above, it becomes possible to accelerate convergence and the learning can be appropriately carried out in accordance with the operation elapsed time.

On the other hand, as shown in FIG. 37, in the case of long operation elapsed time, the correction amount of the learning Δ torque can be decreased and consequently, the operation to correct the control amount of the hydraulic clutch Cn so that the I phase initial G falls within the predetermined range can be slowed.

Specifically, when the operation elapsed time is relatively long, variance in the hydraulic clutch Cn changes gradually because it is caused by age deterioration in the clutch disk μ characteristics, viscosity of the operating oil ATF, etc. Therefore, if the learning is continued in the same manner as the case of the short operation elapsed time, the convergence property may degrade. However, since this embodiment is configured as mentioned above, the stable and accurate correction can be achieved.

The remaining configuration of the sixth embodiment is the same as those in the foregoing embodiments, so it is not illustrated.

As stated above, in the sixth embodiment, it is configured to have an apparatus (ECU 80) for controlling an automatic transmission T that changes speed of an output of an engine E mounted on a vehicle, through a frictional engaging element (hydraulic clutch Cn), characterized by: input rotational speed detecting means (first rotational speed sensor 64, ECU 80) for detecting an input rotational speed NM of the automatic transmission; output rotational speed detecting means (second rotational speed sensor 66, ECU 80) for detecting an output rotational speed NC of the automatic transmission; output rotational speed change amount calculating means (S10) for calculating a change amount (ΔNC estimation value) of the output rotational speed; output rotational speed change amount average calculating means (S20, S308) for calculating an average (I phase initial average G) of the change amount of the output rotational speed over a predetermined period of an initial inertia (I) phase of shifting; vehicle acceleration average calculating means (S20, S312) for determining completion of the shifting based on a ratio (GRAM) of the input rotational speed NM to the output rotational speed NC and calculating an average (after-shift average G) of a vehicle acceleration after the completion of the shifting based on the change amount of the output rotational speed, assuming that the change amount (ΔNC estimation value) of the output rotational speed indicates the vehicle acceleration G; difference calculating means (S20, S314) for calculating a difference (I phase initial G) between the average of the change amount of the output rotational speed and the average of the vehicle acceleration; learning value calculating means (S20, S316, S500 to S516, S2300 to S2334) for calculating a learning value used for incrementally and decrementally correcting a desired value of transmission torque of the frictional engaging element such that the calculated difference falls within a predetermined range; incrementally and decrementally correcting means (S14 to S16) for incrementally and decrementally correcting the desired value of the transmission torque of the frictional engaging element with the calculated learning value; hydraulic supply control means (S18) for controlling supply of hydraulic pressure to the frictional engaging element such that it becomes the corrected desired value of the transmission torque; and operation elapsed time estimating means (S2304) for estimating an operation elapsed time of the automatic transmission, wherein the learning value calculating means replaces the learning value in accordance with the estimated operation elapsed time (S2306 to S2334). With this, it becomes possible to increase the correction amount in the case of short operation elapsed time of the transmission T while decreasing it in the case of long one, so that the learning can be appropriately carried out, i.e., variance can be effectively absorbed, in accordance with the operation elapsed time of the transmission T, i.e., depending on whether the variance is attributed to the manufacturing variance that arose in manufacturing processes or age deterioration.

To be specific, the product size tolerance of the hydraulic clutch Cn before shipping is set with a large margin so as to prevent the revving of the engine speed or lack of torque at shifting. Also, since the characteristics of the hydraulic clutch Cn are not fully stabilized during the early stage, a property to follow the desired control value in this stage is less satisfactory than that in the stable stage that comes after the early stage. Therefore, by setting the correction amount to be relatively large, it becomes possible to effectively absorb the variance. After the early stage, by setting the correction amount to be relatively small, the variance can be effectively absorbed as well, thereby achieving the stable and accurate correction.

Further, the correction amount is stored in the map (initial learning Δ torque map, aging learning Δ torque map) in which lattice points are defined by the predetermined parameters. With this, in addition to the above effects, in the case where no corresponding value exists in the map at the time the correction amount is read out, a substitute value obtained by interpolating an adjacent value can be applied, thereby enhancing the accuracy of learning correction against changes in torque and rotation.

Further, since the different map is used depending on the operation elapsed time, in addition to the above effects, the correction amount can be stored more appropriately and the learning correction accuracy can be further enhanced.

Further, the operation elapsed time estimating means estimates the operation elapsed time of the automatic transmission based on results of comparison of the calculated difference (I phase initial G) with upper and lower limit values of the convergence threshold value (S2304 to S2334). With this, in addition to the above effects, the operation elapsed time of the transmission T can be easily estimated.

Further, the operation elapsed time estimating means estimates the operation elapsed time of the automatic transmission based on at least one of the number of times the calculated difference is determined to be equal to or greater than the upper limit value of the threshold value or the number of times the calculated difference (I phase initial G) is determined to be equal to or less than the lower limit value of the threshold value (S2304 to S2334). With this, in addition to the above effects, the operation elapsed time of the transmission T can be reliably estimated.

Further, the operation elapsed time estimating means estimates the operation elapsed time of the automatic transmission based on a direction and amount of change of an average of statistical distribution of the calculated difference (S2304). With this, in addition to the above effects, the operation elapsed time of the transmission T can be reliably estimated.

Further, the operation elapsed time estimating means estimates the operation elapsed time of the automatic transmission based on at least one of a total driving time and total driving distance of the vehicle on which the automatic transmission is mounted. With this, in addition to the above effects, the operation elapsed time of the transmission T can be more reliably estimated.

Seventh Embodiment

Next a control apparatus for an automatic transmission according to a seventh embodiment of this invention, more exactly, the operation thereof will be explained.

The explanation is made with focus on the points of difference from the foregoing embodiments. In the seventh embodiment, it is determined whether the vehicle is running on a rough road and when the vehicle is determined to be running on a rough road, the calculation of the learning value is prohibited.

Figure 44:
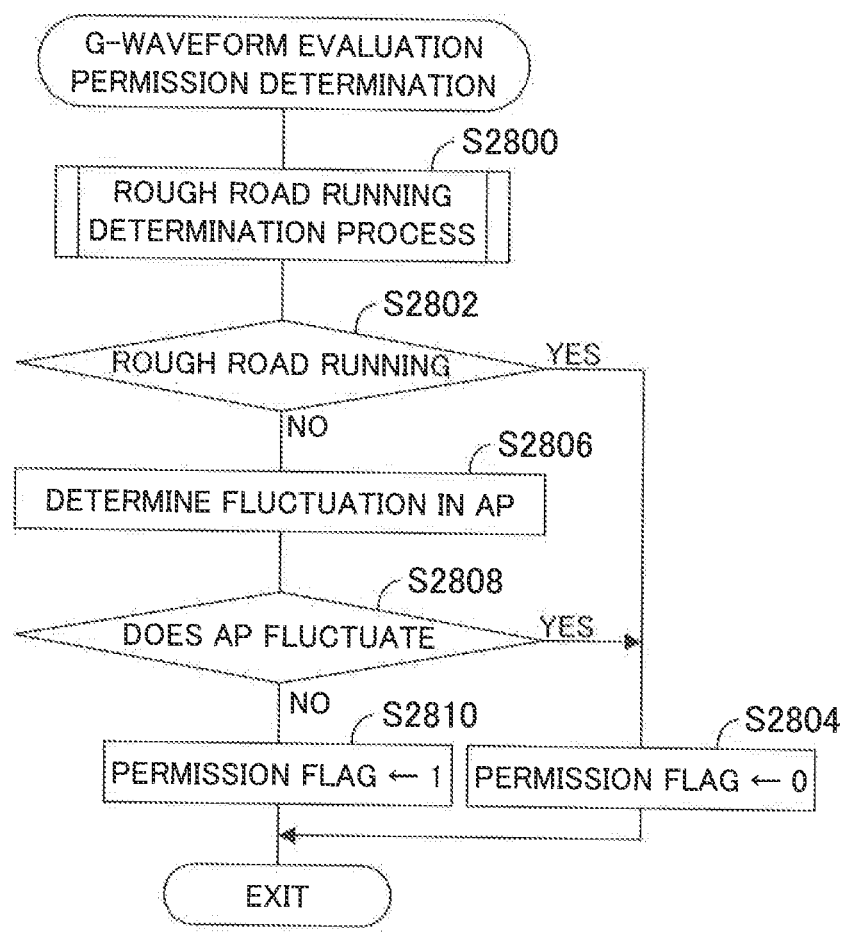
FIG. 44 is a flowchart showing the operation of a control apparatus for an automatic transmission according to a seventh embodiment of this invention, more exactly, showing a G-waveform evaluation permission determination process thereof.

FIG. 44 is a flowchart showing the operation of the apparatus according to the seventh embodiment, more exactly, showing a G-waveform evaluation permission determination process thereof.

First, in S2800, it is determined whether the vehicle is running on a rough road.

Figure 45:
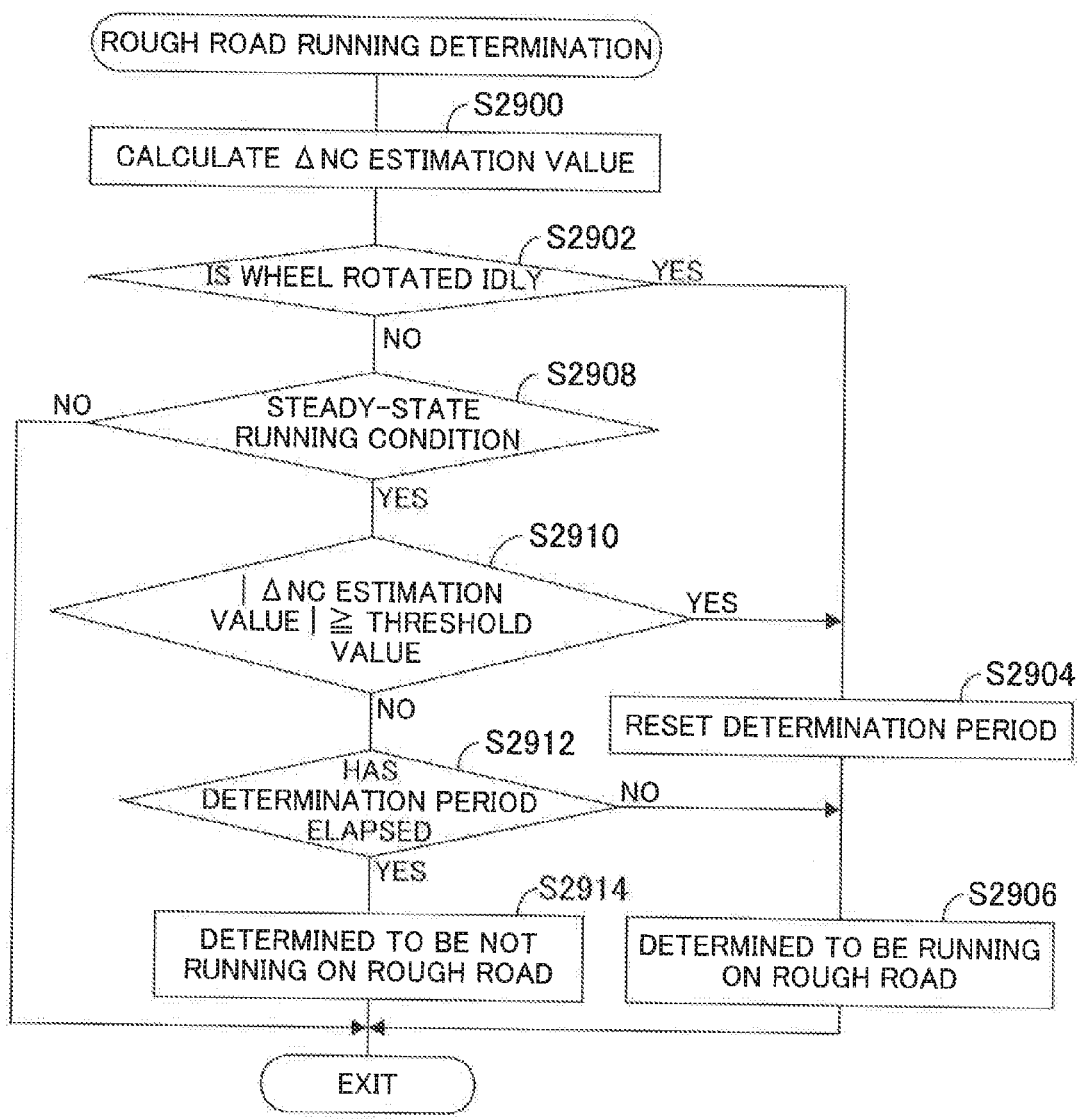
FIG. 45 is a subroutine flowchart showing a rough road running determination process of the FIG. 44 flowchart.

FIG. 45 is a subroutine flowchart showing the process.

In S2900, the ΔNC estimation value is calculated in the same manner as in the first embodiment. The program proceeds to S2902 in which it is determined whether a wheel(s) (tire(s)) is rotated idly. Specifically, wheel speed sensors (not illustrated in FIG. 1) are provided for the respective four wheels, i.e., the driven wheels W, W and free wheels, and outputs of the sensors are compared with each other, whereby it is determined whether at least one of the four wheels is rotated idly.

Figure 46:
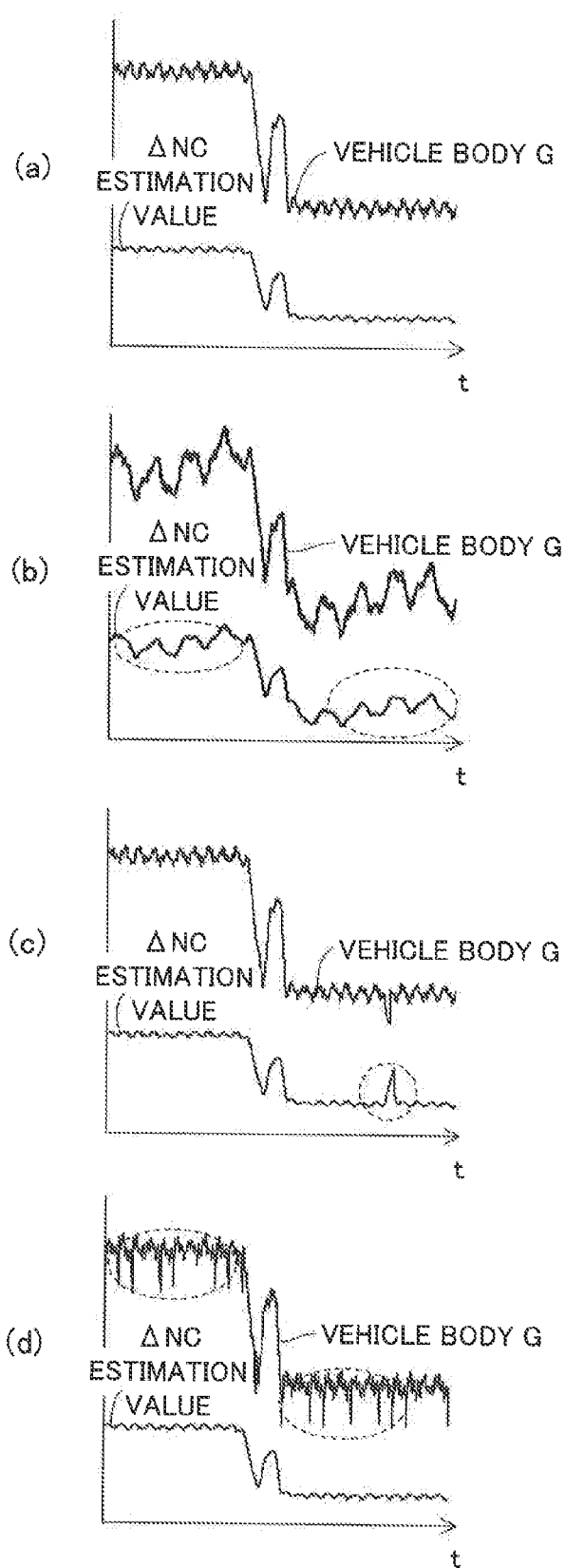
FIG. 46 is an explanatory view for explaining the process of the FIG. 45 flowchart.

Before continuing the explanation on FIG. 45, the rough road running determination in this embodiment will be explained with reference to FIG. 46. In this embodiment, the output of the second rotational speed sensor 66 is filtered through the low-pass filter to remove high-frequency noise and the thus-obtained ΔNC estimation value is utilized, and the ΔNC estimation value during steady-state, running is compared with an appropriately-set threshold value to determine whether the vehicle is running on a rough road.

Specifically, when amplitude is small as shown in FIG. 46(a), it is determined to be running on a not-rough road, while when it is as shown in FIG. 46(b), since amplitude of the estimation value is large and becomes equal to or greater than the threshold value (not shown), it is determined to be running on a rough pavement road (with continuous and random concaves and convexes).

When the wheel is rotated idly as shown in FIG. 46(c), it is determined that the vehicle is running on a road whose friction coefficient is low, such as a gravel road. Note that, as shown in FIG. 46(c), high-frequency fluctuation can be removed through the low-pass filter.

Based on the above premise, the explanation on FIG. 45 is resumed. When the result in S2902 is affirmative, the program proceeds to S2904 in which a determination period reset is conducted, i.e., a value corresponding to the determination period is set in a down-counter and the time measurement is started, and to S2906 in which it is determined that the vehicle is running on a rough road.

When the result in S2902 is negative, the program proceeds to S2908 in which it is determined whether the vehicle is under a steady-state running condition. When the result in S2908 is negative, the remaining steps are skipped, while when the result is affirmative, the program proceeds to S2910 in which the ΔNC estimation value is compared with the aforementioned threshold value to determine whether the ΔNC estimation value is equal to or greater than the threshold value.

When the result in S2910 is affirmative, the program proceeds to S2904 and S2906 in which the vehicle is determined to be running on a rough road, while when the result in S2910 is negative, the program proceeds to S2912 in which it is determined whether the determination period has elapsed, i.e., the value corresponding to the determination period set in S2904 has reached 0.

When the result in S2912 is negative, the program proceeds to S2906 in which the determination that the vehicle is running on a rough road is continuously made. Thus, after the vehicle is determined to be running on a rough road once, this determination is not canceled or is maintained until a predetermined period elapses.

This configuration is made for, for example, the following reason: Since the rough road running determination is not conducted when the vehicle is not under the steady-state running condition, even after it is determined as rough road running once and subsequently this determination is canceled, the road surface might be still rough.

On the other hand, when the result in S2912 is affirmative in the next and subsequent program loops, the program proceeds to S2914 in which it is not determined as the rough road running, i.e., the vehicle is not determined to be running on a rough road.

Returning to the explanation on FIG. 44, the program proceeds to S2802 in which it is determined whether the determination is made as the rough road running and when the result is affirmative, the program proceeds to S2804 in which the bit of a permission flag is reset to 0.

When the result in S2802 is negative, the program proceeds to S2806 and S2808 in which the same processing as in S412 and 5414 of the FIG. 8 flowchart in the first embodiment is conducted, and then to S2810 in which the bit of the permission flag is set to 1.

Next the processing similar to S300 to S318 of the FIG. 7 flowchart in the first embodiment is conducted and based on the result of the process of FIG. 44, it is determined whether the G-waveform learning is permitted. When it is permitted, the learning value write-in process is performed.

This, when the program proceeds to S2804 of FIG. 44, the learning value write-in process is not performed. In other words, in this embodiment, when the vehicle is determined to be running on a rough road, the learning value calculation is prohibited.

Figure 47:
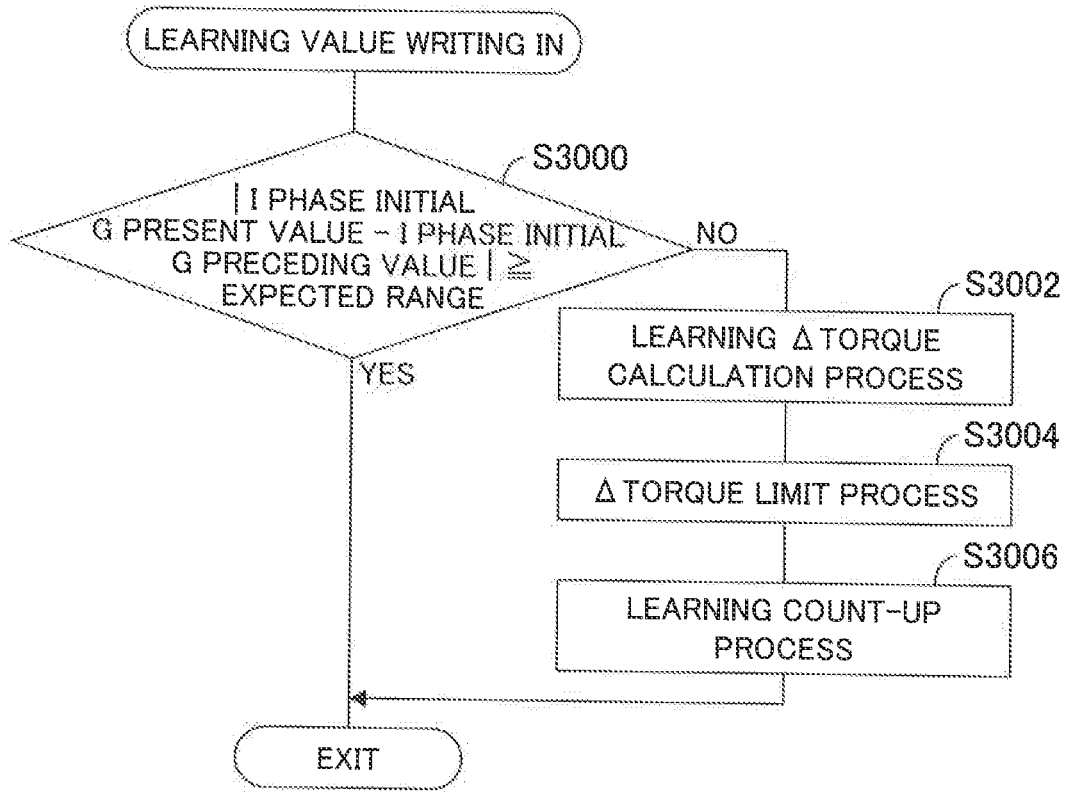
FIG. 47 is a subroutine flowchart showing a learning value write-in process in the seventh embodiment.

FIG. 47 is a subroutine flowchart showing the learning value write-in process.

In S3000, an absolute value of a difference between a present value of the I phase initial G and a preceding value thereof is within an expected range. The terms of "present value" and "preceding value" respectively mean values in the present program loop and any preceding program loop of the main flowchart similar to the FIG. 2 flowchart in the first embodiment.

When the result in S3000 is affirmative, the remaining steps are skipped, while when the result is negative, i.e., when it is determined that the difference is not out of the expected range, the program proceeds to S3002 in which the learning Δ torque is calculated, to S3004 in which the Δ torque limit process is conducted, and to S3006 in which the learning count up process is conducted.

Note that the processing in and after S3002 is the same as that in S504 to S516 of the FIG. 9 flowchart in the first embodiment and it is conducted based on the result of comparison of the I phase initial G with the upper and lower limit values of the threshold value.

Figure 48:
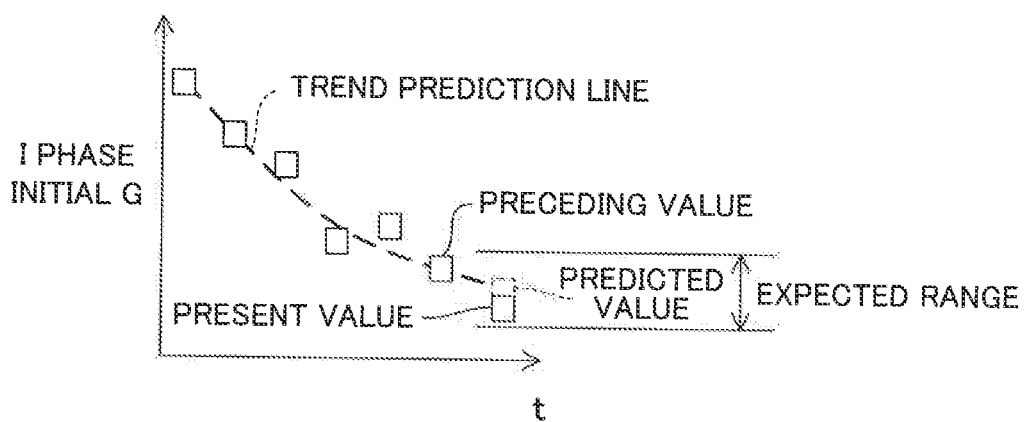
FIG. 48 is an explanatory view for explaining the process of the FIG. 47 flowchart.

The processing of S3000 is explained with reference to FIG. 48. Exactly speaking, the "preceding value" of the I phase initial G means a value obtained from a preceding value and a trend prediction line illustrated in the figure. The "expected range" means a permissible range applied when it is assumed that the desired value (desired clutch torque) of the transmission torque of the hydraulic clutch Cn is incrementally and decrementally corrected with the learning value calculated through the process similar to the FIG. 2 flowchart in the first embodiment.

Note that, because, in the rough road running determination process of FIG. 45, it is impossible to distinguish an influence on the ΔNC estimation value during shifting whether it is attributed to the desired clutch torque output or a rough road (uneven road surface), a concept of the expected range is applied here to exclude from the learning a case where fluctuation appears only during shifting by making the above determination.

The remaining configuration of the seventh embodiment is the same as those in the foregoing embodiments, so it is not illustrated.

As stated above, in the seventh embodiment, it is configured to have an apparatus (ECU 80) for controlling an automatic transmission T that changes speed of an output of an engine E mounted on a vehicle through a frictional engaging element (hydraulic clutch Cn), characterized by: input rotational speed detecting means (first rotational speed sensor 64, ECU 80) for detecting an input rotational speed NM of the automatic transmission; output rotational speed detecting means (second rotational speed sensor 66, ECU 80) for detecting an output rotational speed NC of the automatic transmission; output rotational speed change amount calculating means (S10) for calculating a change amount (ΔNC estimation value) of the output rotational speed; output rotational speed change amount average calculating means (S20, S308) for calculating an average (I phase initial average G) of the change amount of the output rotational speed over a predetermined period of an initial inertia (I) phase of shifting; vehicle acceleration average calculating means (S20, S312) for determining completion of the shifting based on a ratio (GRATIO) of the input rotational speed NM to the output rotational speed NC and calculating an average (after-shift average G) of a vehicle acceleration after the completion of the shifting based on the change amount of the output rotational speed, assuming that the change amount (ΔNC estimation value) of the output rotational speed indicates the vehicle acceleration G; difference calculating means (S20, S314) for calculating a difference (I phase initial G) between the average of the change amount of the output rotational speed and the average of the vehicle acceleration; learning value calculating means (S20, S316, S500 to S516, S3000 to S3006) for calculating a learning value used for incrementally and decrementally correcting a desired value of transmission torque of the frictional engaging element such that the calculated difference falls within a predetermined range; incrementally and decrementally correcting means (S14 to S16) for incrementally and decrementally correcting the desired value of the transmission torque of the frictional engaging element with the calculated learning value; hydraulic supply control means (S18) for controlling supply of hydraulic pressure to the frictional engaging element such that it becomes the corrected desired value of the transmission torque; and rough road running determining means (S2800, S2900 to S2914) for determining whether the vehicle is running on a rough road by comparing the change amount (ΔNC estimation value) of the output rotational speed of the automatic transmission with a threshold value, wherein the learning value calculating means prohibits calculation of the learning value (more precisely, during the predetermined period (determination period)) when the vehicle is determined to be running on the rough road (S2804, S300 to S318). With this, similarly to the foregoing embodiments, since the vehicle acceleration at shifting is estimated and evaluated and based thereon, variance in the transmission torque of the hydraulic clutch (frictional engaging element) Cn, etc., is learned more reliably, it becomes possible to fully exploit the potential of the hydraulic clutch, thereby improving a feel given to the vehicle occupant(s) at shifting while preventing incorrect learning.

Further, in the apparatus, the learning value calculating means prohibits calculation of the learning value when the difference (I phase initial G) between the average of the change amount of the output rotational speed and the average of the vehicle acceleration (i.e., a difference between the present and preceding values of the above difference) is out of a permissible range applied when it is assumed that the desired value of the transmission torque of the frictional engaging element is incrementally and decrementally corrected with the calculated learning value. With this, since, for example, it is determined whether the difference between the present value and preceding value of the I phase initial G is out of the permissible range, in addition to the above effects, it becomes possible to prevent incorrect learning more reliably.

It should be noted that, although the first to seventh embodiments are explained in the foregoing, any two of the embodiments may be combined. For instance, the seventh embodiment can be combined with any of the first to sixth embodiments and the same can be said for the other embodiments.

It should also be noted that, although the parallel-axis type automatic transmission is exemplified, this invention can be applied to a planetary type automatic transmission.

Industrial Applicability

According to this invention, in a control apparatus for an automatic transmission, it is configured to calculate a change amount (ΔNC estimation value) of an output rotational speed of the transmission; calculate an average (I phase initial average G) of the change amount of the output rotational speed over a predetermined period of an initial inertia (I) phase of shifting; calculate a difference (I phase initial G) between the average of the change amount of the output rotational speed and the average of the vehicle acceleration; incrementally and decrementally correct the desired value of the transmission torque of the frictional engaging element such that the calculated difference falls within a predetermined range; and control supply of hydraulic pressure to the frictional engaging element such that it becomes the corrected desired value. With this, since the vehicle acceleration at shifting is estimated and evaluated and based thereon, variation in the transmission torque of the frictional engaging element, etc., is learned, it becomes possible to fully exploit the potential of the frictional engaging element, thereby improving a feel given to the vehicle occupant(s) at shifting.

Description Of Symbols

T Automatic transmission (Transmission), E Engine (Internal combustion engine), O Hydraulic circuit, L Lockup mechanism, 12 Torque converter, 14, 16, 18, 20, 22, 24, 28, 30, 32, 34, 36, 42 Gear, Cn Hydraulic clutch (Frictional engaging element), 55 DBW mechanism, 58 Vehicle speed sensor, 60 Crank angle sensor, 62 Manifold absolute pressure sensor, 64, 66 Rotational speed sensor, 76 Accelerator opening sensor, 80 Electronic control unit (ECU)

The invention claimed is:

1. An apparatus for controlling an automatic transmission that changes speed of an output of an engine mounted on a vehicle through a frictional engaging element, comprising:
an input rotational speed detector adapted to detect an input rotational speed of the automatic transmission;
an output rotational speed detector adapted to detect an output rotational speed of the automatic transmission;
an output rotational speed change amount calculator adapted to calculate a change amount of the output rotational speed;
an output rotational speed change amount average calculator adapted to calculate an average of the change amount of the output rotational speed over a predetermined period of an initial inertia phase of shifting defined based on a ratio of the detected input rotational speed to the detected output rotational speed;
a steady state determiner that determines whether the vehicle is in a steady state;
a vehicle acceleration average calculator adapted to:
determine completion of the shifting based on a ratio of the input rotational speed to the output rotational speed, and
calculate an average of a vehicle acceleration after the completion of the shifting based on the change amount of the output rotational speed, when the change amount of the output rotational speed indicates the vehicle acceleration and the vehicle is in the steady state;
a difference calculator adapted to calculate a difference between the average of the change amount of the output rotational speed and the average of the vehicle acceleration;
a learning value calculator adapted to calculate a learning value used for incrementally or decrementally correcting a desired value of transmission torque of the frictional engaging element such that the calculated difference falls within a predetermined range;
a corrector adapted to incrementally or decrementally correct the desired value of the transmission torque of the frictional engaging element with the calculated learning value; and
a hydraulic supply controller adapted to control supply of hydraulic pressure to the frictional engaging element such that the transmission torque becomes the corrected desired value.

2. The apparatus according to claim 1, further including:
an engine torque down demand calculator adapted to calculate a torque down demand of the engine based on the corrected desired value of the transmission torque; and
an engine torque decreasing unit adapted to decrease a torque of the engine in accordance with the calculated torque down demand.

3. The apparatus according to claim 2, wherein the engine torque down demand calculator calculates the torque down demand of the engine when a shifting time exceeds a desired shifting time by a predetermined value or more.

4. The apparatus according to claim 1, wherein the corrector corrects the desired value of the transmission torque of the frictional engaging element such that the calculated difference falls within the predetermined range when the vehicle is in a predetermined running condition.

5. The apparatus according to claim 1, further including:
an input torque calculator adapted to calculate an input torque to the automatic transmission;
a vehicle weight estimator adapted to estimate a weight of the vehicle based on at least the input torque before the shifting, the input torque after the shifting, and the change amount of the output rotational speed, wherein the change amount of the output rotational speed is obtained by subtracting a preceding output rotational speed from a present output rotational speed; and
a learning value corrector adapted to correct the learning value using the estimated weight of the vehicle.

6. The apparatus according to claim 5, wherein the learning value corrector prohibits learning when the estimated weight of the vehicle exceeds a threshold value.

7. The apparatus according to claim 5, wherein the vehicle weight estimator estimates the weight of the vehicle based on the input torques before and after the shifting and the change amount of the output rotational speed when running resistance acting on the vehicle does not change during the shifting.

8. The apparatus according to claim 1, further including:
a calorific value calculator adapted to calculate a calorific value of the frictional engaging element at the shifting;
a second learning value corrector adapted to correct the learning value so as to decrementally correct at least the engine torque, when the calculated calorific value of the frictional engaging element at the shifting exceeds a threshold value; and
an engine torque decreasing unit adapted to decrease the engine torque such that the engine torque becomes a decrementally-corrected engine torque.

9. The apparatus according to claim 8, wherein the second learning value corrector incrementally corrects the transmission torque when a correction amount of the decrementally-corrected engine torque exceeds a limit value.

10. The apparatus according to claim 8, wherein the second learning value corrector decrementally corrects the engine torque when the shifting time exceeds a desired shifting time by the predetermined value or more.

11. The apparatus according to claim 1, further including:
an operation elapsed time estimator adapted to estimate a total operating time of the automatic transmission based on the calculated difference,
wherein the learning value calculator replaces the learning value in accordance with the estimated total operating time.

12. The apparatus according to claim 1, further including:
a rough road running determiner adapted to determine whether the vehicle is running on a rough road by comparing the change amount of the output rotational speed of the automatic transmission with a threshold value,
wherein the learning value calculator prohibits calculation of the learning value when the vehicle is determined to be running on the rough road.

13. The apparatus according to claim 12, wherein the learning value calculator prohibits calculation of the learning value when the difference between the average of the change amount of the output rotational speed and the average of the vehicle acceleration is out of a permissible range applied when the desired value of the transmission torque of the frictional engaging element is incrementally or decrementally corrected with the calculated learning value.

14. A method for controlling an automatic transmission that changes speed of an output of an engine mounted on a vehicle through a frictional engaging element, via at least one processor, comprising the steps of:
   detecting an input rotational speed of the automatic transmission;
   detecting an output rotational speed of the automatic transmission;
   calculating a change amount of the output rotational speed;
   calculating, via the at least one processor, an average of the change amount of the output rotational speed over a predetermined period of an initial inertia phase of shifting defined based on a ratio of the detected input rotational speed to the detected output rotational speed;
   determining, via the at least one processor, completion of the shifting based on a ratio of the input rotational speed to the output rotational speed and calculating an average of a vehicle acceleration after the completion of the shifting based on the change amount of the output rotational speed, when the change amount of the output rotational speed indicates the vehicle acceleration and the vehicle is in a steady state;
   calculating, via the at least one processor, a difference between the average of the change amount of the output rotational speed and the average of the vehicle acceleration;
   calculating, via the at least one processor, a learning value used for incrementally or decrementally correcting a desired value of transmission torque of the frictional engaging element such that the calculated difference falls within a predetermined range;
   incrementally or decrementally correcting the desired value of the transmission torque of the frictional engaging element with the calculated learning value; and
   controlling supply of hydraulic pressure to the frictional engaging element such that the transmission torque becomes the corrected desired value.

15. The method according to claim 14, further including the steps of:
   calculating a torque down demand of the engine based on the corrected desired value of the transmission torque; and
   decreasing a torque of the engine in accordance with the calculated torque down demand.

16. The method according to claim 15, wherein the step of torque down demand calculating calculates the torque down demand of the engine when a shifting time exceeds a desired shifting time by a predetermined value or more.

17. The method according to claim 14, wherein the step of incrementally or decrementally correcting corrects the desired value of the transmission torque of the frictional engaging element such that the calculated difference falls within the predetermined range when the vehicle is in a predetermined running condition.

18. The method according to claim 14, further including the steps of:
   calculating an input torque to the automatic transmission;
   estimating a weight of the vehicle based on at least the input torque before the shifting, the input torque after the shifting, and the change amount of the output rotational speed; and
   correcting the learning value using the estimated weight of the vehicle.

19. The method according to claim 18, wherein the step of correcting the learning value prohibits learning when the estimated weight of the vehicle exceeds a threshold value.

20. The method according to claim 18, wherein the step of estimating the weight of the vehicle estimates the weight of the vehicle based on the input torques before and after the shifting and the change amount of the output rotational speed when running resistance acting on the vehicle does not change during the shifting.

21. The method according to claim 14, further including the steps of:
   calculating a calorific value of the frictional engaging element at the shifting;
   correcting the learning value so as to decrementally correct at least the engine torque, when the calculated calorific value of the frictional engaging element at the shifting exceeds a threshold value; and
   decreasing the engine torque such that the engine torque becomes a decrementally-corrected engine torque.

22. The method according to claim 21, wherein the step of correcting the learning value incrementally corrects the transmission torque when a correction amount of the decrementally-corrected engine torque exceeds a limit value.

23. The method according to claim 21, wherein the step of correcting the learning value decrementally corrects the engine torque when the shifting time exceeds the desired shifting time by the predetermined value or more.

24. The method according to claim 14, further including the step of:
   estimating a total operating time of the automatic transmission based on the calculated difference,
   wherein the step of calculating the learning value includes replacing the learning value in accordance with the estimated total operating time.

25. The method according to claim 14, further including the step of:
   determining whether the vehicle is running on a rough road by comparing the change amount of the output rotational speed of the automatic transmission with a threshold value,
   wherein the step of calculating the learning value includes prohibiting calculation of the learning value when the vehicle is determined to be running on the rough road.

26. The method according to claim 25, wherein the step of calculating the learning value prohibits calculation of the learning value when the difference between the average of the change amount of the output rotational speed and the average of the vehicle acceleration is out of a permissible range applied when the desired value of the transmission torque of the frictional engaging element is incrementally or decrementally corrected with the calculated learning value.

* * * * *